(12) United States Patent
Dale et al.

(10) Patent No.: US 12,010,992 B2
(45) Date of Patent: Jun. 18, 2024

(54) DRY POWDERED COMPOSITIONS AND METHODS AND USES THEREOF

(71) Applicant: Neozyme International, Inc., Costa Mesa, CA (US)

(72) Inventors: Parker David Dale, Newport Beach, CA (US); Jay Johnston, Pottsville, PA (US)

(73) Assignee: Neozyme International, Inc., Costa Mesa, CA (US)

( * ) Notice: Subject to any disclaimer, the term of this patent is extended or adjusted under 35 U.S.C. 154(b) by 185 days.

(21) Appl. No.: 17/240,919

(22) Filed: Apr. 26, 2021

(65) Prior Publication Data

US 2021/0329913 A1 Oct. 28, 2021

Related U.S. Application Data

(60) Provisional application No. 63/015,637, filed on Apr. 26, 2020.

(51) Int. Cl.
*A01N 25/10* (2006.01)
*A01N 63/32* (2020.01)

(52) U.S. Cl.
CPC ............ *A01N 25/10* (2013.01); *A01N 63/32* (2020.01)

(58) Field of Classification Search
CPC ................................ A01N 25/10; A01N 63/32
See application file for complete search history.

(56) References Cited

U.S. PATENT DOCUMENTS

| | | |
|---|---|---|
| 3,635,797 A | 1/1972 | Battistoni et al. |
| 4,052,858 A | 10/1977 | Jeppson |
| 4,541,986 A | 9/1985 | Schwab et al. |
| 4,666,606 A | 5/1987 | Heinicke |
| 4,758,353 A | 7/1988 | Spence et al. |
| 4,804,478 A | 2/1989 | Tamir |
| 5,071,765 A | 12/1991 | Wiatr |
| 5,075,008 A | 12/1991 | Chigusa et al. |
| 5,139,945 A | 8/1992 | Liu |
| 5,179,003 A | 1/1993 | Wolf et al. |
| 5,227,067 A | 7/1993 | Runyon |
| 5,284,844 A | 2/1994 | Lorenz et al. |
| 5,308,449 A | 5/1994 | Fuentes et al. |
| 5,326,477 A | 7/1994 | Fuqua et al. |
| 5,369,031 A | 11/1994 | Middleditch et al. |
| 5,407,577 A | 4/1995 | Nghiem |
| 5,462,868 A | 10/1995 | Britt et al. |
| 5,500,306 A | 3/1996 | Hsu et al. |
| 5,616,479 A | 4/1997 | Marchal et al. |
| 5,654,192 A | 8/1997 | Ducreux et al. |
| 5,736,209 A | 4/1998 | Andersen et al. |
| 5,807,464 A | 9/1998 | Jobbins et al. |
| 5,820,758 A | 10/1998 | Dale et al. |
| 5,849,566 A | 12/1998 | Dale et al. |
| 5,866,376 A | 2/1999 | Rocha et al. |
| 5,879,913 A | 3/1999 | Marchal et al. |
| 5,879,928 A | 3/1999 | Dale et al. |
| 5,885,590 A | 3/1999 | Hunter et al. |
| 5,885,950 A | 3/1999 | Dale et al. |
| 6,001,218 A | 12/1999 | Hsu et al. |
| 6,699,391 B2 | 3/2004 | Baldridge et al. |
| 6,783,679 B1 | 8/2004 | Rozich |
| 6,841,572 B2 | 1/2005 | Horst et al. |
| 6,884,351 B1 | 4/2005 | Lytal |
| 7,165,561 B2 | 1/2007 | Baldridge et al. |
| 7,476,529 B2 | 1/2009 | Podella et al. |
| 7,645,730 B2 | 1/2010 | Baldridge et al. |
| 7,658,848 B2 | 2/2010 | Baldridge et al. |
| 7,659,237 B2 | 2/2010 | Baldridge et al. |
| 7,759,301 B2 | 7/2010 | Baldridge et al. |
| 7,922,906 B2 | 4/2011 | Baldridge et al. |
| 8,188,028 B2 | 5/2012 | Baldridge et al. |
| 8,389,459 B2 | 3/2013 | Baldridge et al. |
| 8,735,338 B2 | 5/2014 | Baldridge et al. |
| 8,821,646 B1 | 9/2014 | Miller et al. |
| 8,835,152 B2 | 9/2014 | Podella |
| 8,871,682 B2 | 10/2014 | Podella et al. |
| 8,871,698 B2 | 10/2014 | Podella et al. |
| 8,894,861 B2 | 11/2014 | Podella et al. |
| 9,051,535 B2 | 6/2015 | Goldfeld et al. |
| 9,617,178 B2 | 4/2017 | Dale |
| 10,334,856 B2 | 7/2019 | Dale et al. |

(Continued)

FOREIGN PATENT DOCUMENTS

| | | |
|---|---|---|
| CA | 1124459 A | 6/1982 |
| CN | 101557249 A | 10/2009 |

(Continued)

OTHER PUBLICATIONS

Tucker et al. Surfactant/biosurfactant mixing: Adsorption of saponin/nonionic surfactant mixtures at the air-water interface. Journal of Colloid and Interface Science. Available online Apr. 20, 2020 (Year: 2020).*
Liu et al. (CN 109706093 A, Published: May 3, 2019). Translated (Year: 2019).*
Chaichi et al., "Surfactant Application on Yield and Irrigation Water Use Efficiency in Corn under Limited Irrigation", Crop Sci. 55(1): 386 (2015).
CNIPA, Second Office Action for Chinese Patent Application Serial No. 201680061816.2, pp. 9 (dated Mar. 15, 2021).
Desai, et al., "Microbial Production of Surfactants and Their Commercial Potential", Microbiol. Mol. Biol. Rev., 1997, 61(1): 47-64.
EPO, Extended Search Report for European Patent Application Serial No. EP13796699.0, pp. 12 (dated Jul. 12, 2016).
EPO, Extended Search Report for European Patent Application Serial No. EP16839956.6, pp. 12 (dated Jan. 14, 2019).

(Continued)

*Primary Examiner* — Robert A Wax
*Assistant Examiner* — John Seungjai Kwon
(74) *Attorney, Agent, or Firm* — UltimatEdge IP Law Group, P.C.; Dean G. Stathakis

(57) ABSTRACT

The present specification discloses compositions, articles of manufacture, containers or kits comprising such compositions, and methods and uses to control a causal agent of a plant disease, increasing plant growth and/or food production and/or improving performance of an irrigation system(s).

20 Claims, No Drawings

(56) References Cited

U.S. PATENT DOCUMENTS

| | | | |
|---|---|---|---|
| 2002/0187220 A1 | 12/2002 | Luhadiya | |
| 2003/0121868 A1 | 7/2003 | Barak | |
| 2004/0180411 A1 | 9/2004 | Podella et al. | |
| 2005/0164355 A1 | 7/2005 | Vlasenko et al. | |
| 2005/0171275 A1 | 8/2005 | De et al. | |
| 2005/0266036 A1 | 12/2005 | Awada et al. | |
| 2006/0151387 A1 | 7/2006 | Yost et al. | |
| 2006/0205042 A1 | 9/2006 | Aehle et al. | |
| 2007/0029264 A1 | 2/2007 | Bowe | |
| 2007/0224249 A1* | 9/2007 | Kelly | C11D 3/38 424/443 |
| 2007/0257127 A1 | 11/2007 | Iverson | |
| 2008/0138327 A1 | 6/2008 | Kelly | |
| 2008/0293813 A1 | 11/2008 | Agvald et al. | |
| 2009/0152196 A1 | 6/2009 | Podella | |
| 2009/0186761 A1 | 7/2009 | Arbogast et al. | |
| 2010/0078307 A1 | 4/2010 | Dale et al. | |
| 2010/0273495 A1 | 10/2010 | Onggosanusi et al. | |
| 2011/0052514 A1 | 3/2011 | Juesten et al. | |
| 2012/0100236 A1 | 4/2012 | Asolkar et al. | |
| 2012/0172219 A1 | 7/2012 | Podella et al. | |
| 2013/0104264 A1 | 4/2013 | Schoonneveld-Bergmans et al. | |
| 2013/0281328 A1 | 10/2013 | Podella et al. | |
| 2013/0344554 A1 | 12/2013 | Bleyer et al. | |
| 2014/0056853 A1 | 2/2014 | Marrone et al. | |
| 2014/0248373 A1 | 9/2014 | Michalow et al. | |
| 2015/0045220 A1 | 2/2015 | Michalow et al. | |
| 2015/0072917 A1 | 3/2015 | Baldridge et al. | |
| 2015/0141311 A1 | 5/2015 | Podella et al. | |
| 2015/0191748 A1 | 7/2015 | Dale | |
| 2015/0267151 A1 | 9/2015 | Goldfeld et al. | |
| 2016/0100587 A1 | 4/2016 | Bywater-Ekegard et al. | |
| 2016/0298056 A1 | 10/2016 | Baldridge et al. | |
| 2016/0353746 A1 | 12/2016 | Dale | |
| 2016/0362834 A1 | 12/2016 | Dale | |
| 2017/0156343 A1 | 6/2017 | Michalow et al. | |
| 2019/0021366 A1* | 1/2019 | McNeff | A61K 36/8965 |

FOREIGN PATENT DOCUMENTS

| | | | |
|---|---|---|---|
| CN | 101951686 A | 1/2011 | |
| CN | 104452385 A | 3/2015 | |
| CN | 109706093 A * | 5/2019 | |
| EP | 375615 A2 | 6/1990 | |
| EP | 1721966 A1 | 11/2006 | |
| KR | 20100088758 A | 8/2010 | |
| WO | 1992011381 A1 | 7/1992 | |
| WO | 1994012718 A1 | 6/1994 | |
| WO | 1996000811 A1 | 1/1996 | |
| WO | 1997016381 A1 | 5/1997 | |
| WO | 1997028092 A1 | 8/1997 | |
| WO | 1998005212 A1 | 2/1998 | |
| WO | 1998023813 A1 | 6/1998 | |
| WO | 00/024879 A1 | 4/2000 | |
| WO | 2001079450 A1 | 10/2001 | |
| WO | 02/26041 A2 | 4/2002 | |
| WO | 2003031536 A1 | 4/2003 | |
| WO | 03/035972 A1 | 5/2003 | |
| WO | 2003037066 A2 | 5/2003 | |
| WO | 2005019527 A1 | 3/2005 | |
| WO | 2005054475 A1 | 6/2005 | |
| WO | 2005/067531 A2 | 7/2005 | |
| WO | 2005069849 A2 | 8/2005 | |
| WO | 2006119052 A2 | 11/2006 | |
| WO | 2008111613 A1 | 9/2008 | |
| WO | 2010115021 A1 | 10/2010 | |
| WO | 2010148535 A1 | 12/2010 | |
| WO | 2011016008 A1 | 2/2011 | |
| WO | 2012051328 A2 | 4/2012 | |
| WO | 2013180756 A1 | 12/2013 | |
| WO | 2017035099 A1 | 3/2017 | |
| WO | 2017035100 A1 | 3/2017 | |
| WO | 2017035101 A1 | 3/2017 | |
| WO | WO-2017035101 A1 * | 3/2017 | A01N 25/10 |

OTHER PUBLICATIONS

EPO, Extended Search Report for European Patent Application Serial No. EP16839957.4, pp. 11 (dated Apr. 17, 2019).

EPO, Extended Search Report for European Patent Application Serial No. EP16839958.2, pp. 12 (dated Sep. 30, 2019).

EPO, Extended Search Report for European Patent Application Serial No. EP19160826.4, pp. 5 (dated Apr. 3, 2019).

Frolund, et al., "Enzymatic Activity in the Activated-Sludge Floc Matrix", Appl. Microbiol. Biotechnol., 1995, 43(3): 755-561.

Goel, "Enzyme Activities under Anaerobic and Aerobic Conditions in Activated Sludge Sequencing Batch Reactor", Water Research, 1998, 32(7): 2081-2088.

Ito, et al., "Sophorolipids from Torulopsis bombicola: Possible Relation to Alkane Update", Appl. Environ, Micobiol., 1982, 43(6): 1278-1283.

JPO, Office Action for Japanese Patent Application Serial No. 2018-528937, pp. 2 (dated Jul. 13, 2021).

JPO, Office Action for Japanese Patent Application Serial No. 2018-528938, pp. 4 (dated Aug. 17, 2021).

Kastner, "Formation of Bound Residues during Microbial Degradation of [14C]Anthracene in Soil", Appl. Environ. Microbiol., 1999, 65(5): 1834-1842.

Sensient Flavors LLC, "Tastone 154, Technical Information", 2010.

Sukumaran, et al., "Microbial Celluloses—Production, Applications, and Challenges", J. Sci. Indus. Res., 2005, 64: 832-844.

WIPO, PCT Form IB373, International Preliminary Report on Patentability for International Patent Application Serial No. PCT/US2013/000140, pp. 12 (dated Dec. 2, 2014).

WIPO, PCT Form IB373, International Preliminary Report on Patentability for International Patent Application Serial No. PCT/US2016/048092, pp. 6 (dated Mar. 8, 2018).

WIPO, PCT Form IB373, International Preliminary Report on Patentability for International Patent Application Serial No. PCT/US2016/048093, pp. 5 (dated Mar. 8, 2018).

WIPO, PCT Form IB373, International Preliminary Report on Patentability for International Patent Application Serial No. PCT/US2016/048094, pp. 5 (dated Mar. 8, 2018).

WIPO, PCT Form ISA210, International Search Report for International Patent Application Serial No. PCT/US2013/000140, pp. 2 (dated Jul. 22, 2013).

WIPO, PCT Form ISA210, International Search Report for International Patent Application Serial No. PCT/US2016/048092, pp. 10 (dated Nov. 15, 2016).

WIPO, PCT Form ISA210, International Search Report for International Patent Application Serial No. PCT/US2016/048093, pp. 8 (dated Oct. 24, 2016).

WIPO, PCT Form ISA210, International Search Report for International Patent Application Serial No. PCT/US2016/048094, pp. 7 (dated Nov. 4, 2016).

WIPO, PCT Form ISA237, Written Opinion for International Patent Application Serial No. PCT/US2013/000140, pp. 11 (dated Jul. 22, 2013).

WIPO, PCT Form ISA237, Written Opinion for International Patent Application Serial No. PCT/US2016/0048093, pp. 4 (dated Oct. 24, 2016).

WIPO, PCT Form ISA237, Written Opinion for International Patent Application Serial No. PCT/US2016/048092. pp. 5 (dated Nov. 15, 2016).

WIPO, PCT Form ISA237, Written Opinion for International Patent Application Serial No. PCT/US2016/048094, pp. 4 (dated Nov. 4, 2016).

Witek-Krowiak, et al., "Ultrafiltrative Separation of Rhamnolipid from Culture Medium", World J. Microbiol. Biotechnol., 2011, 27: 1961-1964.

Xu, et al., "Biosurfactants for Microbubble Preparation and Application", Int. J. Mol. Sci., 2011, 12: 462-475.

Xu, et al., "Research Review of Wastewater Treatment Technology with Hydrolytic Enzymes", J. Chongqing Univ. Sci. Technol. 12(6), 2010, 156-161.

U.S. Appl. No. 14/404,917, filed May 24, 2013, US 2015/019174, U.S. Pat. No. 9,617,178.

(56) References Cited

OTHER PUBLICATIONS

U.S. Appl. No. 15/243,957, filed Aug. 22, 2016, US 2016/0360758, U.S. Pat. No. 10,334,856.
U.S. Appl. No. 15/243,958, filed Aug. 22, 2016, US 2016/0362834, U.S. Pat. No. 10,557,234.
U.S. Appl. No. 15/243,961, filed Aug. 22, 2016, US 2016/0353746, U.S. Pat. No. 10,681,914.
U.S. Appl. No. 15/444,093, filed Feb. 27, 2017, US 2017/0166467, U.S. Pat. No. 10,683,222.
U.S. Appl. No. 16/446,583, filed Jun. 19, 2019, US 2019/0307130, U.S. Pat. No. 11,116,224.
U.S. Appl. No. 16/729,236, filed Dec. 27, 2019, US 2020/0131701.
U.S. Appl. No. 16/729,240, filed Dec. 27, 2019, US 2020/0138037.
U.S. Appl. No. 16/729,243, filed Dec. 27, 2019, US 2020/0140304.
U.S. Appl. No. 17/240,925, filed Apr. 26, 2021, US 2021/0331017.
U.S. Appl. No. 17/446,961, filed Sep. 4, 2021.

* cited by examiner

DRY POWDERED COMPOSITIONS AND METHODS AND USES THEREOF

This application claims the benefit of priority and is entitled to the filing date pursuant to 35 U.S.C. § 119(e) of U.S. Provisional Patent Application 63/015,637, filed Apr. 26, 2020, which is hereby incorporated by reference in its entirety.

Agriculture is of the utmost importance to the world. Not only is agriculture essential to providing foodstuffs worldwide, but it is also of critical economic importance to the economy of most, if not all countries. Three factors that can impact the yields of agricultural crops are plant disease, unfavorable growth conditions and cultivation inefficiency.

Losses from infectious plant diseases can have catastrophic humanitarian impact, where crop losses result in hunger, famine, and starvation. In addition, losses from plant diseases also can have a significant economic impact, causing decreased revenue for crop producers and distributors resulting in higher prices for consumers. In situations where infectious plant disease-control methods are absent or limited, annual losses of 30% to 50% are common for major crops. Conventional plant agent technologies based on agricultural chemicals have improved agricultural productivity. However, agricultural chemical use has fallen into disfavor due to its negative consequences such as, e.g., increased cost to consumers and decreased revenue for crop producers and distributors. In addition, there is increasing public concerns regarding the negative impacts of agricultural chemicals on the environment. Despite this, protection of agriculturally important crops from plant diseases is crucial in improving crop yields.

Crop plants in different ecosystems around the world are also exposed to unfavorable growing conditions that negatively affect the health and vigor of the plants. These less-than-ideal conditions are typically due to soil or weather conditions, or various stresses including extremes of temperature, disadvantageous relationships between moisture and oxygen, toxic substances in the soil or atmosphere, and an excess or deficiency of an essential mineral. Such factors can reduce productivity of the crops to a greater or lesser degree, even under good growing conditions. As such, improving growing conditions of agriculturally important crops is important in improving crop yields.

Lastly, increased global population growth together with a concomitant decrease in land used for agriculture has increased the pressure to not only optimized crop productivity but also increase cultivation efficiency. In addition, demand for enhanced crop yields will only increase as both increases world-wide population growth and decreases in agriculture land used continues. As such, enhanced productivity of agriculturally important crops is vital in improving crop yields.

Accordingly, there is a great need for environmentally friendly treatments that will increase the health and vigor of plants, whether the plants are stressed by plant disease, by poor growing conditions, or even when the plants are healthy and/or grown under favorable conditions, but increased cultivation efficiency and productivity is needed. Such treatments should also reduce the amounts of, if not completely dispense with, agricultural chemicals in order to safeguard human welfare and the environment.

SUMMARY

Aspects of the present specification disclose compositions, including dry powdered compositions and liquid compositions and methods and uses of the dry powdered and liquid compositions. A dry powered composition disclosed herein comprises a dried treated microbial supernatant and one or more dried non-ionic surfactants or one or more biosurfactants. The dried treated fermented microbial supernatant includes bio-nutrients, minerals and amino acids but lacks any active enzymes, activatable pro-enzymes, or any enzymatic activity. A dried treated fermented microbial supernatant disclosed herein can further lack live microorganisms such as yeast or bacteria. The disclosed compositions may further comprise one or more anionic surfactants. The disclosed compositions are biodegradable and non-toxic to humans, mammals, plants, and the environment. A liquid composition is a dry powdered composition disclosed herein that is dissolved using a solvent.

Aspects of the present specification disclose a kit. The disclosed kit comprises a dry powdered composition disclosed herein and instructions for how to use the dry powdered composition, an optionally a solvent. Exemplary instructions provide that a dry powdered composition disclosed herein is dissolved in a solvent to form a liquid composition. An exemplary solvent includes water or a water-based solution.

Aspects of the present specification disclose methods of controlling a plant disease. Additional aspects of the present specification disclose uses of a dry powdered composition disclosed herein for controlling a plant disease. The disclosed methods and uses comprise the steps of dissolving a dry powdered composition disclosed herein with a solvent to form a liquid composition and applying an effective amount of the liquid composition to one or more plants and/or one or more locations a causal agent of a plant disease will be exposed to the liquid composition. Such application results in controlling a plant disease. Exemplary locations where such applications can take place include, but are not limited to, a house, a lawn, a garden, an agricultural field, a farm, a greenhouse, a nursery, a silo, an agricultural storage site, a water irrigation system, or a seedling box, for example.

Aspects of the present specification disclose methods of increasing plant growth and/or fruit production. Additional aspects of the present specification disclose uses of a dry powdered composition disclosed herein for increasing plant growth and/or fruit production. The disclosed methods and uses comprise the steps of dissolving a dry powdered composition disclosed herein with a solvent to form a liquid composition and applying an effective amount of the liquid composition to one or more plants and/or one or more locations where increased plant growth and/or fruit production is desired. Such application results in increased in plant growth and/or increased in crop production. Exemplary locations where such applications can take place include, but are not limited to, a house, a lawn, a garden, an agricultural field, a farm, a greenhouse, a nursery, a silo, an agricultural storage site, n water irrigation system, or a seedling box, for example.

Aspects of the present specification disclose methods of maintaining or improving the efficiency of an irrigation system. Additional aspects of the present specification disclose uses of a dry powdered composition disclosed herein for maintaining or improving the efficiency of an irrigation system. The disclosed methods and uses comprise the steps of diluting a dry powdered composition disclosed herein with a solvent to form a liquid composition and applying an effective amount of a liquid composition disclosed herein to one or more pipes in a pipeline network of the irrigation system where dissolving, disbursement, or removal of one or more components blocking and/or impeding the flow of water is desired. Such application results in adequate removal of one or more components blocking one or more pipeline networks of an irrigation system.

DETAILED DESCRIPTION

A plant becomes diseased when it is continuously disturbed by some causal agent that results in an abnormal physiological process that disrupts a plant's normal structure, growth, function, or other activities. This interference with one or more of a plant's essential physiological or biochemical systems elicits characteristic pathological conditions or symptoms. Plant diseases are caused by a pathogenic organism such as a fungus, bacterium, mycoplasma, virus, viroid, nematode, or parasitic flowering plant. An infectious agent is transmissible, being capable of reproducing within or on its host and spreading from one susceptible host to another. Plant diseases can be broadly classified according to the nature of their primary causal agent. Such primary causal agents include viruses, microorganisms like fungi and bacteria, and animals like nematodes. However, one difficulty in treating a plant disease caused by such primary causal agents is that they are typically protected from the environment by some sort of structure. These protective structures not only essential in maintaining the health of these causal agents, but also helpful in shielding these causal agents from compounds designed to destroy them.

A complete virus particle, known as a virion, consists of nucleic acid surrounded by a protective coat of protein called a capsid. The capsid encloses the genetic material of the virus and consists of several oligomeric structural subunits made of protein called protomers. Some viruses are enveloped, meaning that the capsid is coated with a lipid membrane known as the viral envelope. The envelope is acquired by the capsid from an intracellular membrane in the virus' host; examples include the inner nuclear membrane, the Golgi membrane, and the cell's outer membrane.

Microorganisms such as, e.g., bacterium, mycoplasma (bacteria without a cell wall) and certain fungi, secrete a polymeric conglomeration of biopolymers, generally composed of extracellular nucleic acids, proteins, and polysaccharides, that form a matrix of extracellular polymeric substance (EPS). The EPS matrix embeds the cells causing the cells to adhere to each other as well as to any living (biotic) or non-living (abiotic) surface to form a sessile community of microorganisms referred to as a biofilm or slime layer. A biofilm colony can also form on solid substrates submerged in or exposed to an aqueous solution, or form as floating mats on liquid surfaces.

There are five stages of biofilm development, initial attachment, irreversible attachment, maturation I, maturation II, and dispersion. Biofilm formation initially begins with the attachment of free-floating planktonic microorganisms to a surface. These first colonists adhere to the surface initially through weak, reversible adhesion via van der Waals forces. If not immediately separated from the surface, these first colonists become permanently anchored through secretion of the EPS matrix and formation of cell adhesion structures such as pili (irreversible attachment). Once colonization has begun, the biofilm grows through a combination of cell division of embedded microorganisms and new recruitment (Maturation I and II). In addition to the extracellular biopolymers secreted by the microorganisms, a biofilm can also incorporate material from the surrounding environment, including but not limited to minerals, soil particles, and biological components. Maturation I and II is where the biofilm is established and may only change in shape and size. The final stage of biofilm formation is known as dispersion, where microorganisms are released from the biofilm to enter the planktonic growth phase in order to spread and colonize new surfaces.

Microorganisms living in a biofilm are physiologically distinct and have significantly different properties from free-floating planktonic microorganisms of the same species. One reason for these differences is because the biofilm protects the microorganisms from the environment and allows them to cooperate and interact in various ways. For example, a biofilm increased the resistance of microorganisms to detergents and antibiotics. In addition, lateral gene transfer is greatly facilitated in biofilms and leads to a more stable biofilm structure. Microorganisms within a biofilm can also communicate with each other via quorum sensing (QS) using products such as N-acyl homoserine lactone (AHL). As such, biofilms play essential and critical roles in protecting microorganisms by insulating them from potentially harmful interactions with the environment.

Larger organisms also are protected from the environment by some sort of structure. Nematodes have a cuticle, a polymerized, proteinaceous extracellular matrix. The cuticle of nematodes is formed when a mostly syncial epidermal cell layer, termed hypodermis, secretes various proteins from its apical membranes that are then extensively cross-linked by peroxidases on the outer surface of the hypodermis to form a cuticle. The major component of this flexible cuticle are members of the collagen superfamily and cuticlins, a highly cross-linked insoluble class of proteins. Overlying the cuticle is the lipid-rich, trilaminar epicuticle that is itself overlaid by a loosely associated, glycoprotein-rich, negatively charged surface coat (or glycocalyx). This multi-functional extracellular structure creates a highly impervious barrier that protects nematodes from desiccation and pathogenic infection as well as creates a structural framework that maintains its body morphology and integrity, prevents mechanical damage by environmental insults, and enables locomotion via attachments to body-wall muscles. As such, the nematode cuticle plays essential and critical roles in preserving the integrity of the animal and its interactions with the environment.

Thus, protective structures present in primary causal agents of plant diseases, such as, e.g., viruses, bacteria, fungi, and nematodes are not only essential for the survival of these agents, but also protects them from the environment. Thus, a treatment that disrupts or otherwise destroys a protective structure of a primary causal agents of plant diseases would be of great benefit.

Plants, or green plants, are multicellular eukaryotes of the kingdom Plantae that form the clade Viridiplantae. Green plants includes the flowering plants, conifers and other gymnosperms, ferns, clubmosses, hornworts, liverworts, mosses, and the green algae, but exclude the red and brown algae, the fungi, archaea, bacteria, and animals. Plants are characterized by obtaining most of their energy from sunlight via photosynthesis using chloroplasts. Chloroplasts contain chlorophylls a and b, which gives them their green color. Plants are also characterized by having a thick cell wall of cellulose, a central vacuole for storage, plastids for storage of pigments, sexual reproduction, modular and indeterminate growth, and an alternation of generations, although asexual reproduction is also common.

A typical plant is structurally organized into two primary divisions, the root system, and the shoot system. The root system is usually underground and comprises primary and lateral roots as well as modified stem structures such as tubers and rhizomes. This system functions to anchor a plant in the soil, absorb water and nutrients from the ground, transport water and nutrients throughout a plant, store food produce certain hormones. The shoot system is usually above ground and comprises stems, leaves and the reproductive organs. This system functions to elevate a plant above the soil, conduct photosynthesis, conduct reproduction, transport water and nutrients throughout a plant, store food and produce hormones.

Plants containing vascular tissues which distribute resources throughout plant are referred to as vascular plants. Vascular plants, also known as tracheophytes, are defined as those land plants that have lignified vascular tissues (the xylem) for conducting water and minerals throughout a plant and specialized non-lignified vascular tissues (the phloem) to conduct products of photosynthesis. Vascular plants include the clubmosses, horsetails, ferns, gymnosperms (including conifers) and angiosperms (flowering plants). Scientific names for the group include Tracheophyta and Tracheobionta.

Xylem is a vascular tissue that on maturity is composed of dead cells. Xylem provides unidirectional transport of xylem sap from the roots up to and throughout a plant. Xylem sap includes water, soluble mineral nutrients, and inorganic ions, although it can contain a number of organic chemicals as well. Movement of xylem sap through xylem is passive, relying on capillary action to provide the force that establishes an equilibrium configuration that counteracts gravity. This capillary action is achieved principally through two mechanisms, transpirational pull and root pressure. Transpirational pull is due to a surface tension created by evaporation of water from the surfaces of cells in the leaves which causes a negative pressure in the xylem that generates enough force to pulls xylem sap upwards from the roots and soil. Root pressure is due to osmosis created by the more negative water potential of the root cells relative to the soil due to higher solute concentrations which causes a positive pressure that forces xylem sap up the xylem towards the leaves.

Phloem comprises living vascular tissue composed of 1) conducting cells called sieve elements that form tubes; 2) parenchyma cells, including both specialized companion cells or albuminous cells and unspecialized cells; and 3) supportive cells, such as fibres and sclereids that provide mechanical support. Sieve elements lack a nucleus and have very few organelles, so they rely on companion cells or albuminous cells for most of their metabolic needs. Phloem provides multi-directional transport of photosynthate (or sap) made by the photosynthetic areas of a plant (principally the leaves) to all other parts of a plant where needed, especially the non-photosynthetic parts of a plant, such as the roots, or into storage structures, such as tubers or bulbs. Photosynthate is a water-based solution rich is sugars and other soluble organic nutrients made during photosynthesis. Movement of photosynthate through the phloem is driven by positive hydrostatic pressures. This process is termed translocation and is accomplished by a process called phloem loading and unloading. Cells in a sugar source "load" a sieve-tube element by actively transporting solute molecules into it. This causes water to move into the sieve-tube element by osmosis, creating pressure that pushes the sap down the tube. In sugar sinks, cells actively transport solutes out of the sieve-tube elements, producing the opposite effect.

The root system is the organ of a plant that typically lies below the surface of the soil. Structurally, a root is composed of an epidermis, a cortex, an endodermis, a pericycle and a vascular system. The epidermis is the outer layer of cells. The cortex is the primary structural tissue of the root bound on the outside by the epidermis and on the inside by the endodermis. The endodermis separates the cortex from the pericycle, the tissue from which lateral (or branch) roots arise from. In the center of a root is the vascular tissue comprised of xylem and phloem. A root system comprises a primary root, lateral roots and root hairs and can be divided into three regions of growth. A zone of maturation is the portion of the root system that comprises the mature portion of the primary root, lateral roots and root hairs that is absorbing water and nutrients from the soil and transporting them through the xylem into the shoot system. The zone of elongation is where newly divided cells are enlarging. The meristematic zone is composed of the root tip meristem and the root cap and is the zone where cell division and new cell growth occurs.

Root hairs are absorptive unicellular extensions of epidermal cells of a root. These tiny, hair-like structures function as the major site of water and mineral uptake. There are beneficial microorganisms associated with root hairs which form a beneficial, symbiotic relationship with a plant. Mycorrhizae are soil fungi that appear to expand the root's contact with the soil profile, enhancing water and nutrient uptake. *Rhizobium* is a soil bacterium that make atmospheric nitrogen available to plants, typically by forming nodules on the roots of plants.

The proper transportation of both xylem sap and photosynthate is essential for a plant's survival. As such, facilitation of this transportation process will benefit the health of a plant. For example, improved absorption at the root hairs results in increased amounts of water, minerals, and other nutrients needed by a plant for growth. Likewise, better xylem sap and photosynthate flow through the vascular tissue ensures for effective and efficient synthesis of compounds and energy needed to sustain and continue plant growth.

On the other hand, any impediment that disrupts or halts the movement of xylem sap and photosynthate affects the health of a plant. For example, disturbance of transpirational pull due to high temperatures, high humidity, darkness, or drought dramatically decrease the negative water pressure in the xylem resulting in poor flow of xylem sap. Likewise, disturbance of root pressure due to poor water and nutrient absorption by root hairs due to unfavorable environmental conditions can significantly reduce the positive water pressure in the xylem resulting in poor flow of xylem sap. As another example, disruption of photosynthate flow in phloem results in poor distribution of nutrients. In any of these cases, such flow disruptions can result in wilting, withering, stunted growth, and reduced reproduction as well as increased susceptibility to plant diseases and unfavorable environmental conditions. With respect to agricultural, such flow disruptions ultimately result in reduced yields of crops. Thus, a treatment that facilitates, maintains, or enhances xylem sap and photosynthate flow in xylem and phloem respectively would be of great benefit.

Irrigation is the artificial application of water to the land or soil. It is used to assist in the growing of agricultural crops, maintenance of landscapes, and revegetation of disturbed soils in dry areas and during periods of inadequate rainfall. Irrigation also has a few other uses in crop production, which include protecting plants against frost, suppressing weed growth and preventing soil consolidation. In contrast, agriculture that relies only on direct rainfall is referred to as rain-fed or dryland farming.

The goal of irrigation is to supply an entire field uniformly with water, so that each plant has the amount of water it needs, neither too much nor too little. Overhead or sprinkler irrigation is a system where water is distributed under high pressure through a piped network to one or more central locations within a field and distributed by overhead sprinklers or guns. Sprinklers can also be mounted on platforms that can be manually or automatically moved to different regions of the field. Center pivot, traveling sprinkler, lateral move and wheel line irrigation are types of overhead irrigation methods. Localized irrigation is a system where water is distributed under low pressure through a piped network, in a pre-determined pattern, and applied as a small discharge to each plant or adjacent to it. Drip, spray or micro-sprinkler and bubbler irrigation are types of localized irrigation methods. Localized irrigation methods can be the most water-efficient methods of irrigation because they deliver only the amount of water needed and minimize evaporation and runoff.

Most commercial and residential irrigation systems are "in ground" systems, meaning that everything is buried in the ground. With the pipes, sprinklers, emitters (drippers), and irrigation valves being hidden, it makes for a cleaner, more presentable landscape without garden hoses or other items having to be moved around manually. This does, however, create some drawbacks in the maintenance of a completely buried system.

Irrigation can lead to a number of problems. For example, the piped network of overhead and localized irrigation systems can become clogged due to growth of algae and other microorganisms creating biofilms, leading to aberrant water distribution. Such poor water distribution can cause unfavorable growing conditions that negatively affect the health and vigor of a plant. For example, inconsistent water distribution leads to an under or over irrigation of portions of a field due to unequal uniformity in distribution, increase soil salinity with consequent toxic salt build-up on soil surface due to under irrigation, crop failure due to under or over irrigation and increased prevalence of plant diseases. Thus, a treatment that facilitates, maintains, or enhances water flow in localized and overhead irrigation systems would be of great benefit.

Without wishing to be limited by its theory, a dry powdered composition and a liquid composition disclosed herein and their associated methods and uses disclosed herein dissolves, disperses, or otherwise disrupts one or more components of the protective structures present on the causal agents of plant diseases, like viruses, bacteria, fungi and nematodes, resulting in their death through disruption of one or more essential physiological processes. This mechanism of action is tied to the ability of a dry powdered composition and a liquid composition disclosed herein and their associated methods and uses disclosed herein to breach or otherwise rupture the capsid of viruses, the biofilms of microorganisms and the lipid-based membrane epicuticle layer of a nematode's cuticle.

In addition, without wishing to be limited by its theory, a dry powdered composition and a liquid composition disclosed herein and their associated methods and uses disclosed herein improves absorption by root hairs, improves xylem sap flow through xylem and improves photosynthate flow in phloem, resulting in improved transport of water and nutrients that will maintain and/or enhance the health and vigor of plants. This mechanism of action is tied to the ability of a dry powdered composition and a liquid composition disclosed herein and their associated methods and uses disclosed herein to increase a plant's ability to uptake of water, minerals, and other nutrients from the soil, increase the capillary action and/or hydrostatic pressure in xylem, and/or increase synthesis of compounds and energy, resulting in sustained and continued plant growth and/or enhanced health and vigor of a plant.

Similarly, without wishing to be limited by its theory, a dry powdered composition and a liquid composition disclosed herein and their associated methods and uses disclosed herein dissolves, disperses, or otherwise removes one or more components that disrupt xylem sap flow in xylem and/or photosynthate flow in phloem, resulting in improved transport of water and nutrients that will maintain and/or enhance the health and vigor of plants. This mechanism of action is tied to the ability of a dry powdered composition and a liquid composition disclosed herein and their associated methods and uses disclosed herein to dissolve or otherwise remove one or more components blocking the channels of xylem and phloem.

Furthermore, without wishing to be limited by its theory, a dry powdered composition and a liquid composition disclosed herein and their associated methods and uses disclosed herein dissolves, disperses, or otherwise removes one or more components that disrupt water flow in a pipeline network of an irrigation system, resulting in improved water distribution that will maintain and/or enhance the health and vigor of plants. This mechanism of action is tied to the ability of a dry powdered composition and a liquid composition disclosed herein and their associated methods and uses disclosed herein to dissolve or otherwise remove one or more components blocking the pipeline network.

Regardless of the theory of operation, a dry powdered composition, a liquid composition, a method, and use disclosed herein offer an alternative means that does not rely on chemicals toxic to humans or the environment. Rather, a dry powdered composition, a liquid composition, a method, and use disclosed herein act by exploiting an inherent process to improve raw material absorption and transport as well as improve synthesis of growth-sustaining compounds and energy. Similarly, a dry powdered composition, a liquid composition, a method, and use disclosed herein act by exploiting a natural vulnerability of the causal agent to its environment, one or more components blocking xylem sap and/or photosynthate flow in a plant, or one or more components blocking water flow in an irrigation system. In addition, a dry powdered composition, a liquid composition, a method, and use disclosed herein been proven to be substantially non-toxic to man and domestic animals and which have minimal adverse effects on wildlife and the environment.

Aspects of the present specification disclose, in part, a composition. A composition disclosed herein comprises a treated fermented microbial supernatant and one or more non-ionic surfactants. The treated fermented microbial supernatant includes bio-nutrients, minerals, and amino acids but lacks any active enzymes, activatable pro-enzymes, or any enzymatic activity. In aspects of this embodiment, a treated fermented microbial supernatant disclosed herein lacks live microorganisms such as yeast or bacteria. Additionally, a composition itself lacks any active enzymes, activatable pro-enzymes, or any enzymatic activity. In aspects of this embodiment, a composition disclosed herein lacks live microorganisms such as yeast or bacteria. As disclosed herein, a composition disclosed herein can be a solid formulation, a liquid formulation, or a colloidal formulation. A solid formulation includes a dry powdered composition, a liquid formulation includes a liquid composition and a paste composition, and a colloidal formulation includes a colloidal composition such as, e.g., a foam, an aerosol, an emulsion, a gel, or a sol. A composition disclosed herein can be produced in a concentrated form requiring dilution before use or in a ready-to-used form.

Aspects of the present specification disclose, in part, a dry powered composition. A dry powered composition disclosed herein comprises a dried treated microbial supernatant and one or more dried non-ionic surfactants. The dried treated fermented microbial supernatant includes bio-nutrients, minerals, and amino acids but lacks any active enzymes, activatable pro-enzymes, or any enzymatic activity. In aspects of this embodiment, a dried treated fermented microbial supernatant disclosed herein lacks live microorganisms such as yeast or bacteria.

In aspects of this embodiment, a dry powdered composition disclosed herein comprises, e.g., about 5% to about 15% by weight of dried treated fermented microbial supernatant and about 75% to about 95% by weight of one or more non-ionic surfactants. In other aspects of this embodiment, a composition disclosed herein comprises, e.g., about 7% to about 12% by weight of a dried treated fermented microbial supernatant and about 80% to about 90% by weight of one or more non-ionic surfactants. In yet other aspects of this embodiment, a dry powdered composition disclosed herein comprises, e.g., about 8% to about 10% by weight of dried treated fermented microbial supernatant and about 85% to about 90% by weight of one or more non-ionic surfactants. In still other aspects of this embodiment, a dry powdered composition disclosed herein comprises, e.g., about 9% to about 10% by weight of a dried treated fermented microbial supernatant and about 87% to about 90% by weight of one or more non-ionic surfactants. In other aspects of this embodiment, a dry powdered composition disclosed herein comprises, e.g., about 9% to about 10% by weight of a dried treated fermented microbial supernatant and about 89% to about 90% of one or more non-ionic surfactants. In yet other aspects of this embodiment, a dry powdered composition disclosed herein comprises, e.g., about 9% to about 9.2% by weight of dried treated fermented microbial supernatant and about 89% to about 89.9% by weight of one or more non-ionic surfactants.

In some embodiments, a dry powered composition disclosed herein comprises a dried treated microbial supernatant and one or more dried non-ionic biosurfactants. The dried treated fermented microbial supernatant includes bio-nutrients, minerals, and amino acids but lacks any active enzymes, activatable pro-enzymes, or any enzymatic activity. In aspects of this embodiment, a dried treated fermented microbial supernatant disclosed herein lacks live microorganisms such as yeast or bacteria.

In aspects of this embodiment, a dry powdered composition disclosed herein comprises, e.g., about 5% to about 15% by weight of dried treated fermented microbial supernatant and about 75% to about 95% by weight of one or more non-ionic biosurfactants. In other aspects of this embodiment, a composition disclosed herein comprises, e.g., about 6% to about 14% by weight of a dried treated fermented microbial supernatant and about 80% to about 95% by weight of one or more non-ionic biosurfactants. In yet other aspects of this embodiment, a dry powdered composition disclosed herein comprises, e.g., about 6% to about 12% by weight of dried treated fermented microbial supernatant and about 85% to about 95% by weight of one or more non-ionic biosurfactants. In still other aspects of this embodiment, a dry powdered composition disclosed herein comprises, e.g., about 7% to about 11% by weight of a dried treated fermented microbial supernatant and about 87% to about 93% by weight of one or more non-ionic biosurfactants. In other aspects of this embodiment, a dry powdered composition disclosed herein comprises, e.g., about 8% to about 10% by weight of a dried treated fermented microbial supernatant and about 89% to about 91% of one or more non-ionic biosurfactants. In yet other aspects of this embodiment, a dry powdered composition disclosed herein comprises, e.g., about 9% to about 9.2% by weight of dried treated fermented microbial supernatant and about 89% to about 89.9% by weight of one or more non-ionic biosurfactants.

Aspects of the present specification disclose, in part, a fermented microbial supernatant. A fermented microbial supernatant disclosed herein can be prepared by culturing a yeast strain, a bacterial strain, or a combination of both a yeast strain and a bacterial strain in a fermenting medium comprising a sugar source, a malt, and a magnesium salt. In an aspect of this embodiment, only a single yeast strain is used in a fermenting medium. In another aspect of this embodiment, two or more different yeast strains are used in a fermenting medium. In yet another aspect of this embodiment, only a single bacterial strain is used in a fermenting medium. In still another aspect of this embodiment, two or more different bacterial strains are used in a fermenting medium. In another aspect of this embodiment, one or more different yeast strains are used in conjunction with one or more different bacteria in a fermenting medium. In yet another aspect of this embodiment, two, three, four, five or more different yeast strains are used in conjunction with two, three, four, five or more different bacteria in a fermenting medium.

A sugar source includes, without limitation, sucrose from molasses, raw cane sugar, soybeans or mixtures thereof. Molasses generally contains up to about 50% sucrose in addition to reducing sugars such as glucose and maltase as well as ash, organic non-sugars, and some water. The presence of the sugars of the type found in the molasses is important in encouraging the activity of the enzymes and the yeast bacteria by which they are produced. Although the untreated cane blackstrap molasses is preferred, other molasses such as beet molasses, barrel molasses and the like may also be used as a natural source of the materials required for the enzymatic fermentation. The amount of molasses useful in preparing a fermenting medium disclosed herein is between 40% and about 80% by weight, and preferably between about 55% and about 75% by weight. It will be appreciated that specific amounts of the molasses utilized may be varied to yield optimum compositions desired.

Raw cane sugar is a sugar product which has not been refined and which contains residual molasses as well as other natural impurities. Although it is not clearly understood, it has been found that the presence of raw sugar in the fermentation reaction yields significantly improved properties as compared to the use of refined sugars which contain residual chemicals used in the decolorization and final purification and refinement which may have some deleterious effect on the yeast and malt enzymes. It has been found that optimum biological and enzymatic properties of the disclosed fermenting medium are improved where a portion of the fermentable materials present in the mixture comprises raw sugar. The amount of raw cane sugar useful in preparing a fermenting medium disclosed herein may be about 10% and about 40% by weight, and preferably between about 10% and about 30% by weight. It will be appreciated that specific amounts of the raw cane sugar utilized may be varied to yield optimum compositions desired.

The essential enzymes which advantageously contribute to the fermentation reaction are provided by the malt and the yeast and/or bacteria. The specific malt utilized is preferably a diastatic malt which contains enzymes including diastase, maltase, and amylase. The malt also is believed to improve the activity of the yeast and/or bacteria in addition to contributing to the overall potency and activity of the enzymatic composition within the final product mixture. The amount of malt useful in preparing a fermenting medium disclosed herein may be between about 3% and about 15% by weight, and preferably between about 7% and about 12% by weight. It will be appreciated that specific amounts of the malt utilized may be varied to yield optimum compositions desired.

Fermentation is a metabolic process that results in the breakdown of carbohydrates and other complex organic substances into simpler substances like sugars, acids, gases or alcohol. Fermentation can occur in yeast, bacteria, and mold. Fermentation includes ethanol fermentation and lactic acid fermentation. Lactic acid fermentation includes homo-lactic fermentation and heterolactic fermentation.

A yeast refers to any fermentation fungi that can be produce the needed enzymes for a fermentation reaction that results in, for example the conversion of carbohydrates into carbon dioxide and alcohols. A number of enzymes are produced by the active yeast during the fermentation reaction and include both hydrolytic and oxidative enzymes such as invertase, catalase, lactase, maltase, carboxylase and others. Yeast include yeast strains useful in food processing fermentation, such as, e.g., bean-based fermentation, dough-based fermentation, grain-based fermentation, vegetable-based fermentation, fruit-based fermentation, honey-based fermentation, dairy-based fermentation, fish-based fermentation, meat-based fermentation and tea-based fermentation. A non-exhaustive list of particular yeast genera useful in a fermentation reaction disclosed herein include, but is not limited, *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Pediococcus, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces* and *Zygotorulaspora*. Species of yeast useful in a fermentation reaction disclosed herein belong to, without limitation A non-exhaustive list of particular yeast species useful in a fermentation reaction disclosed herein includes, but is not limited, *B. anomalus, B. bruxellensis, B. claussenii, B. custersianus, B. naardenensis, B. nanus, C. colliculosa, C. exiguous, C. humicola, C. kefyr, C. krusei, C. milleri, C. mycoderma, C. pelliculosa, C. rugose, C. stellate, C. tropicalis, C. utilis, C. valida, C. vini, C. zeylanoides, Cb. mrakii, Cs. infirmominiatum, D. hansenii, D. kloeckeri, Dk. anomala, Dk. bruxellensis, F. domesticum, G. candidum, I. orientalis, K. exigua, K. unispora, Kl. africana, Kl. apis, Kl. javanica, Ku. lactis, Ku. marxianus, Ku. marxianus, L. lecanfi, M. hiemalis, M. plumbeus, M. racemosus, M. racemosus, N. intermedia, P. cerevisiae, Pn. album, Pn. camemberti, Pn. caseifulvum, Pn. chrysogenum, Pn. commune, Pn. nalgiovense, Pn. roqueforti, Pn. solitum, Pi. fermentans, R. microspores, Rs. infirmominiatum, Rt. glutinis, Rt. minuta, Rt. rubra, S. bayanus, S. boulardii, S. carlsbergensis, S. cerevisiae, S. eubayanus, S. paradoxus, S. pastorianus, S. rouzii, S. uvarum, Sc. pombe, Th. beigelii, T. delbrueckii, T. franciscae, T. pretoriensis, T. microellipsoides, T. globosa, T. indica, T. maleeae, T. quercuum, To. versatilis, V. lecanfi, Y. lipolytica, Z. bailiii, Z. bisporus, Z. cidri, Z. fermentati, Z. florentinus, Z. kombuchaensis, Z. lentus, Z. meffis, Z. microeffipsoides, Z. mrakii, Z. pseudorouxii* and *Z. rouxii* and *Zt. florentina*. A preferred yeast is *Saccharomyces cerevisiae* commonly available as baker's yeast.

Bacteria refer to any fermentation bacteria that can be produce the needed enzymes for a fermentation reaction that results in, for example the production of alcohols like ethanol or acids like acetic acid, lactic acid and/or succinic acid. A non-exhaustive list of particular bacterial genera useful in a fermentation reaction disclosed herein include, but is not limited, *Acetobacter, Arthrobacter, Aerococcus, Bacillus, Bifidobacterium, Brachybacterium, Brevibacterium, Barnobacterium, Carnobacterium, Corynebacterium, Enterococcus, Escherichia, Gluconacetobacter, Gluconobacter, Hafnia, Halomonas, Kocuria, Lactobacillus, Lactococcus, Leuconostoc, Macrococcus, Microbacterium, Micrococcus, Neisseria, Oenococcus, Pediococcus, Propionibacterium, Proteus, Pseudomonas, Psychrobacter, Salmonella, Sporolactobacillus, Staphylococcus, Streptococcus, Streptomyces, Tetragenococcus, Vagococcus, Weissells* and *Zymomonas*. A non-exhaustive list of particular bacterial species useful in a fermentation reaction disclosed herein includes, but is not limited, *A. aceti, A. fabarum, A. lovaniensis, A. malorum, A. orientalis, A. pasteurianus, A. pasteurianus, A. pomorum, A. syzygii, A. tropicalis, Ar. arilaitensis, Ar. Bergerei, Ar. Globiformis, Ar. nicotianae, Ar. variabilis, B. cereus, B. coagulans, B. licheniformis, B. pumilus, B. sphaericus, B. stearothermophilus, B. subtilis, B. adolescentis, B. animalis, B. bifidum, B. breve, B. infantis, B. lactis, B. longum, B. pseudolongum, B. thermophilum, Br. alimentarium, Br. alimentarium, Br. tyrofermentans, Br. tyrofermentans, By. aurantiacum, By. casei, By. linens, C. divergens, C. maltaromaticum, C. piscicola, C. ammoniagenes, Co. casei, Co. fiavescens, Co. mooreparkense, Co. variabile, E. faecalis, E. faecium, G. azotocaptans, G. diazotrophicus, G. entanii, G. europaeus, G. hansenii, G. johannae, G. oboediens, G. xylinus, Gl. oxydans, H. alvei, Hl. elongate, K. rhizophila, K. rhizophila, K. varians, K. varians, L. acetotolerans, L. acidifarinae, L. acidipiscis, L. alimentarius, L. brevis, L. bucheri, L. cacaonum, L. casei, L. cellobiosus, L. collinoides, L. composti, L. coryniformis, L. crispatus, L. curvatus, L. delbrueckii, L. dextrinicus, L. diolivorans, L. fabifermentans, L. farciminis, L. fermentum, L. gasseri, L. ghanensis, L. hammesii, L. harbinensis, L. helveticus, L. hilgardii, L. homohiochii, L. jensenfi, L. johnsonii, L. kefiranofaciens, L. kefiri, L. kimchi, L. kisonensis, L. kunkeei, L. mali, L. manihotivorans, L. mindensis, L. mucosae, L. nagelii, L. namuresis, L. nantesis, L. nodensis, L. oeni, L. otakiensis, L. panis, L. parabrevis, L. parabuchneri, L. paracasei, L. parakefiri, L. paralimentarius, L. paraplantarum, L. pentosus, L. perolens, L. plantarum, L. pobuzihii, L. pontis, L. rapi, L. reuteri, L. rhamnosus, L. rossiae, L. sakei, L. salivarius, L. sanfranciscensis, L. satsumensis, L. secaliphilus, L. senmaizukei, L. siliginis, L. similis, L. spicheri, L. suebicus, L. sunkii, L. tucceti, L. vaccinostercus, L. versmoldesis, L. yamanashiensis, Lc. lactis, Lc. raffinolactis, Le. carnosum, Le. citreum, Le. fallax, Le. holzapfelii, Le. inhae, Le. kimchi, Le. lactis, Le. mesenteroides, Le. palmae, Le. Pseudomesenteroides, M. caseolyticus, Mb. foliorum, Mb gubbeenense, Mc. luteus, Mc. lylae, P. acidilactici, P. pentosaceus, P. acidipropionici, P. freudenreichii, P. jensenfi, P. thoenii, Pr. vulgaris, Ps. fluorescens, Py. celer, S. carnosus, S. condiment, S. equorum, S. fieurettii, S. piscifermentans, S. saphrophyticus, S. sciuri, S. simulans, S. succinus, S. vitulinus, S. warneri, S. xylosus, St. cremoris, St. gallolyticus, St. salivarius, St.*

*thermophiles, St. griseus, T. halophilus, T. koreensis, W. beninensis, W. cibaria, W. fabaria, W. ghanesis, W. koreensis, W. paramesenteroides, W. thailandensis*, and *Z. mobilis*.

Mold refers to any fermentation mold that can be produce the needed enzymes for a fermentation reaction that results in, for example the production of alcohols like ethanol or acids like acetic acid, lactic acid and/or succinic acid. A non-exhaustive list of particular mold genera useful in a fermentation reaction disclosed herein include, but is not limited, *Aspergillus*. A non-exhaustive list of particular mold species useful in a fermentation reaction disclosed herein includes, but is not limited, *A. acidus, A. fumigatus, A. niger, A. oryzae*, and *A. sojae*.

It will be appreciated that actual amounts of the various types of enzymes produced will be dependent on a number of factors including the types of molasses and sugar used in preparing the fermentation mixture. However, again it is believed that, in utilizing the molasses and raw sugar, optimum enzyme yields and activity are obtained. In an embodiment, the amount of yeast useful in preparing a fermenting medium disclosed herein may be between about 0.2% and about 5% by weight, and preferably between about 1% and about 3% by weight. It will be appreciated that specific amounts of the yeast utilized may be varied to yield optimum compositions desired.

The presence of a small amount of inorganic catalyst such as a magnesium salt enhances the activity of the enzymes not only during the fermentation reaction but thereafter in the product composition in attacking and decomposing the organic waste materials. A preferred magnesium salt is magnesium sulfate. The amount of magnesium salt useful in preparing a fermenting medium disclosed herein may be between about 0.1% and about 5% by weight, and preferably between about 1% and about 3% by weight. It will be appreciated that specific amounts of the magnesium salt utilized may be varied to yield optimum compositions desired.

To prepare a fermented microbial supernatant, the molasses, sucrose and magnesium salt are added to a suitable amount of warm water. Although the specific amount of water used is not particularly critical, typically suitable amounts of water are from about 2 to about 20 times the total weight of the other ingredients of the fermenting medium used in the fermentation reaction. This amount of water is sufficient to facilitate easy admixture as well as to activate the yeast, bacterial and/or mold and dissolve the other materials. In addition, the temperature of the water cannot be too hot such that the heat inactivates the malt and yeast enzymes needed for fermentation. Thus, for example, water temperatures greater than about 65° C. must be avoided and preferred temperatures are between about 25° C. to about 45° C. The use of cold water may result in unduly slow fermentation reaction rates and, thus, should also be avoided where increased reaction rates are desired. After the molasses, sugar and magnesium salt are effectively mixed and dissolved, the malt and the yeast are added, the mixture stirred and allowed to set until fermentation is essentially complete. The reaction time may be between about 2 and about 5 days at temperatures between about 20° C. and about 45° C. Completion may be readily ascertained by noting that the effervescence of the reacting mixture has substantially subsided. At the end of the fermentation reaction, the fermented microbial culture is centrifuged to remove the "sludge" formed during the fermentation. The resulting fermentation supernatant (typically about 90% to about 98% by weight) is collected for subsequent treatment.

A fermented microbial supernatant contains bio-nutrients, minerals, and amino acids. Bio-nutrients are typically present in an amount of from about 0.01% to about 1% of the total weight of fermented microbial supernatant. Each individual bio-nutrient is typically present in an amount of from about 0.00001% to about 0.01% of the total weight of fermented microbial supernatant. Examples of bio-nutrients include, without limitation, biotin, folic acid, glucans like α-glucan and β-glucan, niacin, insotil, pantothenic acid, pyridoxine, riboflavin, and thiamine. In aspects of this embodiment, a fermented microbial supernatant disclosed herein comprises, e.g., about 0.00001% to about 0.0011% of biotin, about 0.0006% to about 0.016% of folic acid, about 0.005% to about 15% of niacin, about 0.01% to about 1% of insotil, about 0.00017% to about 0.017% of pantothenic acid, about 0.0006% to about 0.016% of pyrodoxine, about 0.002% to about 0.023% of riboflavin and about 0.001% to about 0.02% of thiamine. In other aspects of this embodiment, a fermented microbial supernatant disclosed herein comprises, e.g., about 0.00006% to about 0.0006% of biotin, about 0.001% to about 0.011% of folic acid, about 0.01% to about 0.1% of niacin, about 0.08% to about 0.18% of insotil, about 0.002% to about 0.012% of pantothenic acid, about 0.001% to about 0.011% of pyrodoxine, about 0.007% to about 0.017% of riboflavin, about 0.003% to about 0.013% of thiamine. In yet other aspects of this embodiment, a fermented microbial supernatant disclosed herein comprises, e.g., about 0.00012% to about 0.0006% of biotin, about 0.001% to about 0.011% of folic acid, about 0.01% to about 0.1% of niacin, about 0.08% to about 0.18% of insotil, about 0.003% to about 0.013% of pantothenic acid, about 0.001% to about 0.011% of pyrodoxine, about 0.008% to about 0.017% of riboflavin, about 0.003% to about 0.013% of thiamine. In still other aspects of this embodiment, a fermented microbial supernatant disclosed herein comprises, e.g., about 0.00009% to about 0.0003% of biotin, about 0.004% to about 0.008% of folic acid, about 0.03% to about 0.07% of niacin, about 0.11% to about 0.15% of insotil, about 0.006% to about 0.01% of pantothenic acid, about 0.004% to about 0.008% of pyrodoxine, about 0.01% to about 0.014% of riboflavin, about 0.006% to about 0.010% of thiamine.

Minerals are typically present in an amount of from about 0.1% to about 20% of the total weight of fermented microbial supernatant. Each individual mineral is typically present in an amount of from about 0.0001% to about 5% of the total weight of fermented microbial supernatant. Examples of minerals include, without limitation, calcium, chromium, copper, iron, magnesium, phosphate, potassium, sodium, and zinc. In aspects of this embodiment, a fermented microbial supernatant disclosed herein comprises, e.g., about 0.02% to about 0.3% of calcium, about 0.000002% to about 0.0016% of chromium, about 0.000009% to about 0.0014% of copper, about 0.00005% to about 0.02% of iron, about 0.001% to about 1.3% of magnesium, about 0.2% to about 14% of phosphate, about 0.4% to about 16% of potassium, about 0.2% to about 15% of sodium and about 0.08% to about 13% of zinc. In other aspects of this embodiment, a fermented microbial supernatant disclosed herein comprises, e.g., about 0.07% to about 0.21% of calcium, about 0.000007% to about 0.0011% of chromium, about 0.00004% to about 0.0009% of copper, about 0.0001% to about 0.015% of iron, about 0.005% to about 0.9% of magnesium, about 0.7% to about 9% of phosphate, about 0.9% to about 11% of potassium, about 0.7% to about 10% of sodium and about 0.3% to about 8% of zinc. In yet other aspects of this embodiment, a fermented microbial supernatant disclosed herein comprises, e.g., about 0.05% to about 1% of calcium, about 0.0001% to about 0.0009% of chromium, about 0.00006% to about 0.0007% of copper, about 0.0001% to about 0.013% of iron, about 0.005% to about 1% of magnesium, about 0.1% to about 7% of phosphate, about 0.5% to about 9% of potassium, about 0.5% to about 8% of sodium and about 0.5% to about 6% of zinc. In still other aspects of this embodiment, a fermented microbial supernatant disclosed herein comprises, e.g., about 0.12% to about 0.16% of calcium, about 0.0002% to about 0.0006% of chromium, about 0.00009% to about 0.0004% of copper, about 0.0006% to about 0.01% of iron, about 0.01% to about 0.4% of magnesium, about 1% to about 4% of phosphate, about 2% to about 6% of potassium, about 1% to about 5% of sodium and about 0.8% to about 3% of zinc.

Amino acids are typically present in an amount of from about 20% to about 60% of the total weight of fermented microbial supernatant. Each individual amino acid is typically present in an amount of from about 0.1% to about 15% of the total weight of fermented microbial supernatant. Examples of minerals include, without limitation, alanine, arginine, aspartic acid, cysteine, glutamic acid, glycine, lysine, methionine, phenylalanine, proline, serine, and threonine. In aspects of this embodiment, a fermented microbial supernatant disclosed herein comprises, e.g., about 0.2% to about 16% of alanine, about 0.09% to about 15% of arginine, about 0.4% to about 18% of aspartic acid, about 0.003% to about 5% of cysteine, about 0.5% to about 20% of glutamic acid, about 0.09% to about 15% of glycine, about 0.09% to about 15% of lysine, about 0.002% to about 5% of methionine, about 0.09% to about 15% of phenylalanine, about 0.09% to about 15% of proline, about 0.09% to about 15% of serine and about 0.09% to about 15% of threonine. In other aspects of this embodiment, a fermented microbial supernatant disclosed herein comprises, e.g., about 0.7% to about 11% of alanine, about 0.5% to about 10% of arginine, about 0.9% to about 13% of aspartic acid, about 0.008% to about 1.2% of cysteine, about 1% to about 15% of glutamic acid, about 0.5% to about 10% of glycine, about 0.8% to about 12% of lysine, about 0.2% to about 1.6% of methionine, about 0.5% to about 10% of phenylalanine, about 0.5% to about 10% of proline, about 0.5% to about 10% of serine and about 0.5% to about 10% of threonine. In yet other aspects of this embodiment, a fermented microbial supernatant disclosed herein comprises, e.g., about 0.5% to about 9% of alanine, about 0.5% to about 8% of arginine, about 1% to about 11% of aspartic acid, about 0.01% to about 2% of cysteine, about 3% to about 13% of glutamic acid, about 0.5% to about 8% of glycine, about 1% to about 10% of lysine, about 0.3% to about 3% of methionine, about 0.5% to about 7% of phenylalanine, about 0.5% to about 7% of proline, about 0.5% to about 7% of serine and about 0.5% to about 7% of threonine. In sill other aspects of this embodiment, a fermented microbial supernatant disclosed herein comprises, e.g., about 2% to about 6% of alanine, about 1% to about 5% of arginine, about 4% to about 8% of aspartic acid, about 0.03% to about 0.7% of cysteine, about 6% to about 10% of glutamic acid, about 1% to about 5% of glycine, about 3% to about 7% of lysine, about 0.7% to about 1.1% of methionine, about 1% to about 5% of phenylalanine, about 1% to about 5% of proline, about 1% to about 5% of serine and about 1% to about 5% of threonine.

Aspects of the present specification disclose, in part, a fermented microbial supernatant that is treated. A treated fermented microbial supernatant is one that is processed in a manner that denatures, kills or otherwise destroys any remaining live microbes, active enzymes contributed by the microbes and malt as well as any other microorganism or enzymes contributed by another source present in a fermented microbial supernatant disclosed herein. Non-limiting examples, of useful treatment procedures include a boiling process using high temperatures, an autoclaving process using high temperatures and high pressure or an irradiation process by exposing the supernatant to ionizing radiation, or any other sterilization process that denatures, kills or otherwise destroys any remaining live yeast, active enzymes contributed by the yeast and malt as well as any other microorganism or enzymes contributed by another source present in a fermented microbial supernatant disclosed herein. Furthermore, the above treatment processes could be used alone, in combination with one another, or in combination with a pasteurization process, a chemical sterilization process and a sterile filtration process to denature, kill or otherwise destroys proteins such as enzymes and microorganisms such as yeast, bacteria and/or mold present the fermentation supernatant disclosed herein. All the methods discussed above are processes known to a person of ordinary skilled in the art as these are routinely used in the food preparation and/or sterilization arts.

The treated fermented microbial supernatant can then be stored in liquid form for subsequent use. Alternatively, the treated fermented microbial supernatant can be processed to create a dried treated fermented microbial supernatant, e.g., by methods known in the art to produce a dry powder. The dry powder form can also be stored for subsequent use. Commercially available dried treated fermented microbial supernatant are produced, including, without limitation, TASTONE® 154, TASTONE® 210, or TASTONE® 900.

Any amount of treated fermented microbial supernatant disclosed herein may be used in a disclosed composition, with the proviso that the amount is useful to practice the methods and uses disclosed herein. Factor used in determining an appropriate amount include, e.g., whether the treated fermented microbial supernatant is in liquid or powder form, the particular commercial source of the treated fermented microbial supernatant, the particular method used to produce the treated fermented microbial supernatant, whether a composition is produced as a concentrate or as a ready as is product, and the dilution factor desired when preparing composition from a concentrate. Typically, a larger amount of a liquid form of the treated fermented microbial supernatant will be required relative to a dry powder form.

Any amount of dried treated fermented microbial supernatant disclosed herein may be used in a dry powdered composition disclosed herein, with the proviso that the amount is useful to practice the methods and uses disclosed herein. In some embodiments, a dry powdered composition disclosed herein comprises about 5% to about 15% by weight of dried treated fermented microbial supernatant. In aspects of these embodiments, a dry powdered composition comprises a dried treated, fermented yeast supernatant in an amount of, e.g., about 5.0% by weight, about 6.0% by weight, about 7.0% by weight, about 7.5% by weight, about 8.0% by weight, about 9.0% by weight, about 10.0% by weight, about 11.0% by weight, about 12.0% by weight, about 13.0% by weight, about 14.0% by weight or about 15.0% by weight. In other aspects of these embodiments, a dry powdered composition comprises a dried treated, fermented yeast supernatant in an amount of, e.g., at least 5.0% by weight, at least 6.0% by weight, at least 7.0% by weight, at least 7.5% by weight, at least 8.0% by weight, at least 9.0% by weight, at least 10.0% by weight, at least 11.0% by weight, at least 12.0% by weight, at least 13.0% by weight, at least 14% by weight or at least 15.0% by weight. In yet other aspects of these embodiments, a dry powdered composition comprises a dried treated, fermented yeast supernatant in an amount of, e.g., at most 5.0% by weight, at most 6.0% by weight, at most 7.0% by weight, at most 8% by weight, at most 9.0% by weight, at most 10.0% by weight or at most 11.0% by weight, at most 12.0% by weight, at most 13.0% by weight, at most 14% by weight or at most 15% by weight. In still other aspects of these embodiments, a dry powdered composition comprises a dried treated, fermented yeast supernatant in an amount of, e.g., about 5.0% to about 15.0% by weight, about 6.0% to about 14.0% by weight, about 7.0% to about 13.0% by weight, about 8.0% to about 12.0% by weight, about 8.5% to about 11.0% by weight, about 9.0% to about 10.0% by weight, about 9.1% to about 9.7% by weight or about 9.2% to about 9.5% by weight or about 9.2% by weight.

In still other aspects of these embodiments, a dry powdered composition comprises a dried treated, fermented yeast supernatant in an amount of, e.g., about 5.0% to about 6.0% by weight, about 5.0% to about 7.0% by weight, about 5.0% to about 8.0% by weight, about 5.0% to about 9.0% by weight, about 5.0% to about 10.0% by weight, about 5.0% to about 11.0% by weight, about 5.0% to about 12.0% by weight, about 5.0% to about 13.0% by weight, about 5.0% to about 14.0% by weight, about 5.0% to about 15.0% by weight, about 6.0% to about 7.0% by weight, about 6.0% to about 8.0% by weight, about 6.0% to about 9.0% by weight, about 6.0% to about 10.0% by weight, about 6.0% to about 11.0% by weight, about 6.0% to about 12.0% by weight, about 6.0% to about 13.0% by weight, about 6.0% to about 14.0% by weight, about 6.0% to about 15.0% by weight, about 7.0% to about 8.0% by weight, about 7.0% to about 9.0% by weight, about 7.0% to about 10.0% by weight, about 7.0% to about 11.0% by weight, 7.0% to about 12.0% by weight, about 7.0% to about 13.0% by weight, about 7.0% to about 14.0% by weight, about 7.0% to about 15.0% by weight, about 8.0% to about 9.0% by weight, about 8.0% to about 10.0% by weight, about 8.0% to about 11.0% by weight, 8.0% to about 12.0% by weight, about 8.0% to about 13.0% by weight, about 8.0% to about 14.0% by weight, about 8.0% to about 15.0% by weight, about 9.0% to about 10.0% by weight, about 9.0% to about 11.0% by weight, 9.0% to about 12.0% by weight, about 9.0% to about 13.0% by weight, about 9.0% to about 14.0% by weight, about 9.0% to about 15.0% by weight, about 10.0% to about 11.0% by weight, about 11.0% to about 12.0% by weight, about 11.0% to about 13.0% by weight, about 11.0% to about 14.0% by weight, about 11.0% to about 15.0% by weight, about 12.0% to about 13.0% by weight, about 12.0% to about 14.0% by weight, about 12.0% to about 15.0% by weight, about 13.0% to about 14.0% by weight, about 13.0% to about 15.0% by weight, or about 14.0% to about 15.0% by weight.

Aspects of the present specification disclose, in part, a surfactant. Surfactants are compounds that lower the surface tension of a liquid, allowing easier spreading, and lowering of the interfacial tension between two liquids, or between a liquid and a solid. Either a single surfactant may be mixed with the composition disclosed herein, or a plurality of surfactants may be mixed with a composition disclosed herein. Useful surfactants include, without limitation, ionic surfactants, zwitterionic (amphoteric) surfactants, non-ionic surfactants, or any combination therein.

Ionic surfactants include anionic surfactants. Anionic surfactants include ones based on permanent functional groups attached to the head, such as, e.g., sulfate, sulfonate, phosphate carboxylates) or pH dependent anionic surfactants. Anionic surfactants include, without limitation, alkane sulfonates like sodium caprylyl sulfonate (BIO-TERGE® PAS-85), alkyl sulfates like ammonium lauryl sulfate and sodium lauryl sulfate (SDS); alkyl ether sulfates like sodium laureth sulfate and sodium myreth sulfate; docusates like dioctyl sodium sulfosuccinate; sulfonate fluorosurfactants like perfluorooctanesulfonate (PFOS) and perfluorobutanesulfonate; alkyldiphenyloxide Disulfonates like DOWFAX™ 2A1 (Disodium Lauryl Phenyl Ether Disulfonate), DOWFAX™ 3B2 (Disodium Decyl Phenyl Ether Disulfonate), DOWFAX™ C10L (Disodium Decyl Phenyl Ether Disulfonate), DOWFAX™ 2EP, and DOWFAX™ 8390 (Disodium Cetyl Phenyl Ether Disulfonate); potassium phosphate polyether esters like TRITON™ H-55 and TRITON™ H-66; alkyl benzene sulfonates; alkyl aryl ether phosphates; alkyl ether phosphates; alkyl carboxylates like fatty acid salts and sodium stearate; sodium lauroyl sarcosinate; carboxylate fluorosurfactants like perfluorononanoate and perfluorooctanoate; and Sodium Hexyldiphenyl Ether Sulfonate (DOWFAX™ C6L).

Ionic surfactants also include cationic surfactants. Cationic surfactants include ones based on permanent or pH dependent cationic surfactants, such as, e.g., primary, secondary, or tertiary amines. Cationic surfactants include, without limitation, alkyltrimethylammonium salts like cetyl trimethylammonium bromide (CTAB) and cetyl trimethylammonium chloride (CTAC); cetylpyridinium chloride (CPC); polyethoxylated tallow amine (POEA); benzalkonium chloride (BAC); benzethonium chloride (BZT); 5-Bromo-5-nitro-1,3-dioxane; dimethyldioctadecylammonium chloride; and dioctadecyldimethylammonium bromide (DODAB), as well as pH-dependent primary, secondary or tertiary amines like surfactants where the primary amines become positively charged at pH greater than 10, or the secondary amines become charged at pH less than 4, like octenidine dihydrochloride. Other useful anionic surfactants include bio-based anionic surfactants, including, without limitation, STEPONOL® AM 30-KE, an ammonium lauryl sulfate, and STEPONOL® EHS, a sodium 2-ethyl hexyl sulfate. Such bio-based surfactants are not synthetic molecules, but instead are anionic biosurfactants derived from organic matter such as plants.

Zwitterionic surfactants are based on primary, secondary, or tertiary amines or quaternary ammonium cation with a sulfonate, a carboxylate, or a phosphate. Zwitterionic surfactants include, without limitation, 3-[(3-Cholamidopropyl)dimethylammonio]-1-propanesulfonate (CHAPS); sultaines like cocamidopropyl hydroxysultaine; betaines like cocamidopropyl betaine; or lecithins.

Non-ionic surfactants are less denaturing and as such are useful to solubilize membrane proteins and lipids while retaining protein-protein interactions. Nonionic surfactants include polyether nonionic surfactants, polyhydroxyl nonionic surfactants and biosurfactants. Nonionic surfactants include alcohol ethoxylates, alkylphenol ethoxylates, phenol ethoxylates, amide ethoxylates, glyceride ethoxylates, fatty acid ethoxylates, fatty amine ethoxylates, and alkene amides. A nonionic surfactant disclosed herein may have the general formula of $H(OCH_2CH_2)_xOC_6H_4R^1$, $H(OCH_2CH_2)_xOR^2$, or $H(OCH_2CH_2)_xOC(O)R^2$, wherein x represents the number of moles of ethylene oxide added to an alkyl phenol and/or a fatty alcohol or a fatty acid, $R^1$ represents a long chain alkyl group and, $R^2$ represents a long chain aliphatic group. In aspects of this embodiment, $R^1$ is a $C_7$-$C_{10}$ alkyl group and/or $R^2$ is a $C_{12}$-$C_{20}$ aliphatic group.

Non-limiting examples of non-ionic surfactants include polyoxyethylene glycol sorbitan alkyl esters (or ethoxylated sorbital esters) like polysorbate 20 sorbitan monooleate (TWEEN® 20), polysorbate 40 sorbitan monooleate (TWEEN® 40), polysorbate 60 sorbitan monooleate (TWEEN® 60), polysorbate 61 sorbitan monooleate (TWEEN® 61), polysorbate 65 sorbitan monooleate (TWEEN® 65), polysorbate 80 sorbitan monooleate (TWEEN® 80), polysorbate 81 sorbitan monooleate (TWEEN® 81) and polysorbate 85 sorbitan monooleate (TWEEN® 85); sorbital esters like sorbitan monooleate, sorbitan monolaurate, sorbitan monopalmitate, sorbitan monostearate and sorbitan tristearate; polyglycerol esters like glycerol monooleate, glycerol monolaurate, glycerol monopalmitate, glycerol monostearate, glycerol trioleate, glycerol ricinoleate, glycerol tristearate, mono diglycerides and glycerol triacetate; ethoxylated polyglycerol esters; alkyl glucosides like arachidyl glucoside, $C_{12-20}$ alkyl glucoside, caprylyl/capryl glucoside, cetearyl glucoside, coco-glucoside, ethyl glucoside and lauryl glucoside. decyl glucoside; ethoxylated alkyl glucosides; sucrose esters like sucrose monooleate, sucrose monolaurate, sucrose monopalmitate, sucrose monostearate, sucrose trioleate, sucrose ricinoleate, sucrose tristearate, sucrose diglycerides and sucrose triacetate; ethoxylated sucrose ester; amine oxides; ethoxylated alcohols; ethoxylated aliphatic alcohols; alkylamines; ethoxylated alkylamines; ethoxylated alkyl phenols like ethoxylated nonyl phenol and ethoxylated octyl phenol; alkyl polysaccharides; ethoxylated alkyl polysaccharides; ethoxylated fatty acids like ethoxylated castor oil; ethoxylated fatty alcohols like ethoxylated ceto-oleyl alcohol, ethoxylated ceto-stearyl alcohol, ethoxylated decyl alcohol, ethoxylated dodecyl alcohol and ethoxylated tridecyl alcohol; ethoxylated fatty amines; poloxamers (polyethylene-polypropylene copolymers), like Poloxamer 124 (PLURONIC® L44), Poloxamer 181 (PLURONIC® L61), Poloxamer 182 (PLURONIC® L62), Poloxamer 184 (PLURONIC® L64), Poloxamer 188 (PLURONIC® F68), Poloxamer 237 (PLURONIC® F87), Poloxamer 338 (PLURONIC® L108), and Poloxamer 407 (PLURONIC® F127); linear secondary alcohol ethoxylates like TERGITOL™ 15-S-5, TERGITOL™ 15-S-7, TERGITOL™ 15-S-9, TERGITOL™ 15-S-12, TERGITOL™ 15-S-15, TERGITOL™ 15-S-20, TERGITOL™ 15-S-30 and TERGITOL™ 15-S-40; $C_{2-20}$ alkene di-substituted amides like STEPOSOL® MET-10U; alkyl phenol polyglycol ethers; polyethylene glycol alkyl aryl ethers; polyoxyethylene glycol alkyl ethers, like octaethylene glycol monododecyl ether, pentaethylene glycol monododecyl ether, BRIJ® 30, and BRIJ® 35; 2-dodecoxyethanol (LUBROL®-PX); polyoxyethylene glycol octylphenol ethers like polyoxyethylene (4-5) p-t-octyl phenol (TRITON® X-45) and polyoxyethylene octyl phenyl ether (TRITON® X-100); polyoxyethylene glycol alkylphenol ethers like Nonoxynol-9; phenoxypolyethoxylethanols like nonylphenoxypolyethoxylethanol and octylphenoxypolyethoxylethanol (IGEPAL® CA-630 or NONIDET™ P-40); glucoside alkyl ethers like octyl glucopyranoside; maltoside alkyl ethers like dodecyl maltopyranoside; thioglucoside alkyl ethers like heptyl thioglucopyranoside; digitonins; glycerol alkyl esters like glyceryl laurate; alkyl aryl polyether sulfates; alcohol sulfonates; sorbitan alkyl esters; cocamide ethanolamines like cocamide monoethanolamine and cocamide diethanolamine; sucrose monolaurate; dodecyl dimethylamine oxide, and sodium cholate. Other non-limiting examples of surfactants useful in the compositions, methods and uses disclosed herein can be found in, e.g., Winslow, et al., Methods and Compositions for Simultaneously Isolating Hemoglobin from Red Blood Cells and Inactivating Viruses, U.S. 2008/0138790; Pharmaceutical Dosage Forms and Drug Delivery Systems (Howard C. Ansel et al., eds., Lippincott Williams & Wilkins Publishers, $7^{th}$ ed. 1999); Remington: The Science and Practice of Pharmacy (Alfonso R. Gennaro ed., Lippincott, Williams & Wilkins, 20th ed. 2000); Goodman & Gilman's The Pharmacological Basis of Therapeutics (Joel G. Hardman et al., eds., McGraw-Hill Professional, $10^{th}$ ed. 2001); and Handbook of Pharmaceutical Excipients (Raymond C. Rowe et al., APhA Publications, $4^{th}$ edition 2003), each of which is hereby incorporated by reference in its entirety.

Other useful non-ionic surfactants include non-ionic biosurfactants. Such bio-based surfactants are not synthetic molecules, but instead are non-ionic biosurfactants derived from organic matter such as plants. Exemplary nonionic biosurfactants include saponins. Found throughout the plant kingdom, saponins are a diverse group of amphipathic glycosides having one or more hydrophilic glycoside moieties combined with a lipophilic triterpene (triterpenoid saponins) or steroid aglycone (steroidal saponins or steroid glycosides) backbone called a sapogenin. A triterpenoid saponin includes, without limitation, a tetracyclic triterpenoid saponin and a pentacyclic triterpenoid saponin. Non-limiting examples of a tetracyclic triterpenoid saponin include a cucurbitane, a cycloartane, a cycloartenol, a dammarane, a euphane, a lanostane and a tirucallane. Non-limiting examples of a pentacyclic triterpenoid saponin include an enoxolone, a hederagenin, a hopane, a lupane, a maslinic acid, an oleanane, an ursane, and a taraxasterane. Non-limiting examples of a steroidal saponin include a diosgenin, an eleutheroside, a ginsenoside, a sarsasapogenin, and a yamogenin. Soap bark tree (*Quillaja saponaria*), fenugreek (*Trigonella foenum-graceum*), alfalfa (*Medicago sativa*), horse chestnut (*Aesculus hippocastanum*), licorice (*Glycyrrhiza* species such as *Glycyrrhiza glabra*), soapwort (*Saponaria officinaux*), Mojave yucca (*Yucca schidigera*), gypsophila genus (such as *Gypsophila paniculata*), sarsaparilla (*Smilax regelii* and other closely related species of *Smilax* genus) and ginseng (*Panax* genus) are the main plant sources of saponins used in health and industrial applications. Additional examples of saponins are described in Güçlü-Üstündağ; and Mazza, Saponins: Properties, Applications and Processing. 2007 Crit. Rev. Food Sci. Nutr. 47(3): 231-58 (2007); Kregiel, et al., Saponin-Based, Biological-Active Surfactants from Plants, In Application and characterization of surfactants, pp. 183-205 (InTech, 2017), each of which is hereby incorporated by reference in its entirety.

Saponins useful for the disclosed dry powdered compositions are commercially manufactured and available, including, without limitation, Yucca SD Powder, a *Yucca schidigera* saponin extract (Desert King International, San Diego, California, USA), Yucca Ag-Aide Powder, a *Yucca schidigera* saponin extract (Desert King International, San Diego, California, USA), Quillaja Extract Powder, a *Quillaja saponaria* saponin extract (Garuda International Inc., Exeter, California, USA), Quillaja Powder QP 100%, a *Quillaja saponaria* saponin extract (Desert King International, San Diego, California, USA), Quillaja Dry 100 NP, a *Quillaja saponaria* saponin extract (Desert King International, San Diego, California, USA), and QL Agri 100%, a *Quillaja saponaria* saponin extract (Desert King International, San Diego, California, USA).

Non-ionic surfactants act synergistically to enhance the action of the treated fermented microbial supernatant. In addition, it has been established that the non-ionic surfactants used in a composition disclosed herein are compatible with enhance chemical reactions. In some embodiments, a dry powdered composition disclosed herein comprises one or more dried nonionic surfactants. In aspects of these embodiments, a dry powdered composition disclosed herein comprises, e.g., two or more dried non-ionic surfactants, three or more dried non-ionic surfactants, four or more dried non-ionic surfactants, or five or more dried non-ionic surfactants. In other aspects of these embodiments, a dry powdered composition disclosed herein comprises, e.g., two dried non-ionic surfactants, three dried non-ionic surfactants, four dried non-ionic surfactants, or five dried non-ionic surfactants.

In some embodiments, a dry powdered composition disclosed herein comprises one or more dried nonionic biosurfactants. In aspects of these embodiments, a dry powdered composition disclosed herein comprises, e.g., two or more dried non-ionic biosurfactants, three or more dried non-ionic biosurfactants, four or more dried non-ionic biosurfactants, or five or more dried non-ionic biosurfactants. In other aspects of these embodiments, a dry powdered composition disclosed herein comprises, e.g., two dried non-ionic biosurfactants, three dried non-ionic biosurfactants, four dried non-ionic biosurfactants, or five dried non-ionic biosurfactants.

In some embodiments, a dry powdered composition disclosed herein comprises one or more dried nonionic saponins. In aspects of these embodiments, a dry powdered composition disclosed herein comprises, e.g., two or more dried non-ionic saponins, three or more dried non-ionic saponins, four or more dried non-ionic saponins, or five or more dried non-ionic saponins. In other aspects of these embodiments, a dry powdered composition disclosed herein comprises, e.g., two dried non-ionic saponins, three dried non-ionic saponins, four dried non-ionic saponins, or five dried non-ionic saponins.

In embodiment, a composition disclosed herein contains one or more nonionic surfactants but no ionic surfactants or zwitterionic (amphoteric) surfactants. In another embodiment, a composition disclosed herein contains one or more nonionic surfactants and one or more anionic surfactants. In another embodiment, a composition disclosed herein does not contain any cationic surfactants. In another embodiment, a composition disclosed herein does not contain any cationic surfactants or zwitterionic surfactants. In another embodiment, a composition disclosed herein does not contain any ionic surfactants. In another embodiment, a composition disclosed herein does not contain any ionic surfactants or zwitterionic surfactants.

Any amount of dried non-ionic surfactant disclosed herein may be used in a dry powdered composition disclosed herein, with the proviso that the amount is useful to practice the methods and uses disclosed herein. In some embodiments, a dry powdered composition disclosed herein comprises, e.g., about 75% to about 95% by weight of one or more dried non-ionic surfactants. In aspects of these embodiments, a dry powdered composition comprises one or more dried non-ionic surfactants in an amount of, e.g., about 75% by weight, about 80% by weight, about 85% by weight, about 90% by weight, about 95% by weight. In other aspects of these embodiments, a dry powdered composition comprises one or more dried non-ionic surfactants in an amount of, e.g., at most 75% by weight, at most 80% by weight, at most 85% by weight, at most 90% by weight, at most 95% by weight. In yet other aspects of these embodiments, a dry powdered composition comprises one or more dried non-ionic surfactants in an amount of, e.g., at least 75% by weight, at least 80% by weight, at least 85% by weight, at least 90% by weight, at least 95% by weight. In still other aspects of these embodiments, a dry powdered composition comprises one or more dried non-ionic surfactants in an amount of, e.g., about 80% to about 90% by weight, about 85% to about 90% by weight, about 87% to about 90% by weight, about 89% to about 90% by weight, or about 89% to about 89.9% by weight. In other aspects of these embodiments, a dry powdered composition comprises one or more dried non-ionic surfactants in an amount of, e.g., about 75% to about 80% by weight, about 75% to about 85% by weight, about 75% to about 90% by weight, about 75% to about 95% by weight, about 80% to about 85% by weight, about 80% to about 90% by weight, about 80% to about 95% by weight, about 85% to about 90% by weight, about 85% to about 95% by weight, or about 90% to about 95% by weight.

In some embodiments, a dry powdered composition disclosed herein comprises, e.g., about 75% to about 95% by weight of one or more dried non-ionic biosurfactants. In aspects of these embodiments, a dry powdered composition comprises one or more dried non-ionic biosurfactants in an amount of, e.g., about 75% by weight, about 80% by weight, about 85% by weight, about 90% by weight, about 95% by weight. In other aspects of these embodiments, a dry powdered composition comprises one or more dried non-ionic biosurfactants in an amount of, e.g., at most 75% by weight, at most 80% by weight, at most 85% by weight, at most 90% by weight, at most 95% by weight. In yet other aspects of these embodiments, a dry powdered composition comprises one or more dried non-ionic biosurfactants in an amount of, e.g., at least 75% by weight, at least 80% by weight, at least 85% by weight, at least 90% by weight, at least 95% by weight. In still other aspects of these embodiments, a dry powdered composition comprises one or more dried non-ionic biosurfactants in an amount of, e.g., about 80% to about 90% by weight, about 85% to about 90% by weight, about 87% to about 90% by weight, about 89% to about 90% by weight, or about 89% to about 89.9% by weight. In other aspects of these embodiments, a dry powdered composition comprises one or more dried non-ionic biosurfactants in an amount of, e.g., about 75% to about 80% by weight, about 75% to about 85% by weight, about 75% to about 90% by weight, about 75% to about 95% by weight, about 80% to about 85% by weight, about 80% to about 90% by weight, about 80% to about 95% by weight, about 85% to about 90% by weight, about 85% to about 95% by weight, or about 90% to about 95% by weight.

In some embodiments, a dry powdered composition disclosed herein comprises, e.g., about 75% to about 95% by weight of one or more dried non-ionic saponins. In aspects of these embodiments, a dry powdered composition comprises one or more dried non-ionic saponins in an amount of, e.g., about 75% by weight, about 80% by weight, about 85% by weight, about 90% by weight, about 95% by weight. In other aspects of these embodiments, a dry powdered composition comprises one or more dried non-ionic saponins in an amount of, e.g., at most 75% by weight, at most 80% by weight, at most 85% by weight, at most 90% by weight, at most 95% by weight. In yet other aspects of these embodiments, a dry powdered composition comprises one or more dried non-ionic saponins in an amount of, e.g., at least 75% by weight, at least 80% by weight, at least 85% by weight, at least 90% by weight, at least 95% by weight. In still other aspects of these embodiments, a dry powdered composition comprises one or more dried non-ionic saponins in an amount of, e.g., about 80% to about 90% by weight, about 85% to about 90% by weight, about 87% to about 90% by weight, about 89% to about 90% by weight, or about 89% to about 89.9% by weight. In other aspects of these embodiments, a dry powdered composition comprises one or more dried non-ionic saponins in an amount of, e.g., about 75% to about 80% by weight, about 75% to about 85% by weight, about 75% to about 90% by weight, about 75% to about 95% by weight, about 80% to about 85% by weight, about 80% to about 90% by weight, about 80% to about 95% by weight, about 85% to about 90% by weight, about 85% to about 95% by weight, or about 90% to about 95% by weight. In other aspects of these embodiments, the one or more saponins include one or more triterpenoid saponins, one or more steroidal saponins, or a combination thereof.

In some embodiments, a dry powdered composition disclosed herein comprises a first dried non-ionic biosurfactant and a second dried non-ionic biosurfactant. In aspects of these embodiments, a dry powdered composition disclosed herein comprises a first dried nonionic biosurfactant in an amount of, e.g., about 5.0% by weight to about 6.0% by weight, about 5.0% by weight to about 7.0% by weight, about 5.0% by weight to about 8.0% by weight, about 5.0% by weight to about 9.0% by weight, about 5.0% by weight to about 10.0% by weight, about 5.0% by weight to about 11.0% by weight, about 5.0% by weight to about 12.0% by weight, about 5.0% by weight to about 13.0% by weight, about 5.0% by weight to about 14.0% by weight or about 5.0% by weight to about 15.0% by weight. In other aspects of these embodiments, a dry powdered composition disclosed herein comprises a second dried nonionic biosurfactant in an amount of, e.g., about 70% by weight to about 75% by weight, about 70% by weight to about 80% by weight, about 70% by weight to about 85% by weight, about 70% by weight to about 90% by weight, about 75% by weight to about 80% by weight, about 75% by weight to about 85% by weight, about 75% by weight to about 90% by weight, about 80% by weight to about 85% by weight, or about 80% by weight to about 90% by weight.

In aspects of these embodiments, a dry powdered composition disclosed herein comprises about 5% to about 15% of a first dried nonionic biosurfactant and about 70% to about 90% of a second dried nonionic biosurfactant. In other aspects of these embodiments, a dry powdered composition disclosed herein comprises about 5% to about 15% of a first dried nonionic biosurfactant and about 75% to about 85% of a second dried nonionic biosurfactant. In yet other aspects of these embodiments, a dry powdered composition disclosed herein comprises about 6% to about 12% of a first dried nonionic biosurfactant and about 73% to about 89% of a second dried nonionic biosurfactant. In still other aspects of these embodiments, a dry powdered composition disclosed herein comprises about 6% to about 12% of a first dried nonionic biosurfactant and about 78% to about 84% of a second dried nonionic biosurfactant.

In aspects of these embodiments, a dry powdered composition disclosed herein comprises about 7% to about 11% of a first dried nonionic biosurfactant and about 74% to about 88% of a second dried nonionic biosurfactant. In other aspects of these embodiments, a dry powdered composition disclosed herein comprises about 7% to about 11% of a first dried nonionic biosurfactant and about 79% to about 83% of a second dried nonionic biosurfactant. In yet other aspects of these embodiments, a dry powdered composition disclosed herein comprises about 8% to about 10% of a first dried nonionic biosurfactant and about 75% to about 87% of a second dried nonionic biosurfactant. In still other aspects of these embodiments, a dry powdered composition disclosed herein comprises about 8% to about 10% of a first dried nonionic biosurfactant and about 80% to about 82% of a second dried nonionic biosurfactant. In yet other aspects of these embodiments, a dry powdered composition disclosed herein comprises about 9% of a first dried nonionic biosurfactant and about 81% of a second dried nonionic biosurfactant.

In other aspects of these embodiments, a dry powdered composition disclosed herein comprises a first dried non-ionic biosurfactant and a second dried nonionic biosurfactant in a ratio of about 1:3 to about 1:20 relative to each other. In yet other aspects of these embodiments, a dry powdered composition disclosed herein comprises a ratio of about 1 part of a first dried nonionic biosurfactant to about 18 parts of a second dried nonionic biosurfactant, about 1 part of a first dried nonionic biosurfactant to about 17 parts of a second dried nonionic biosurfactant, about 1 part of a first dried nonionic biosurfactant to about 16 parts of a second dried nonionic biosurfactant, about 1 part of a first dried nonionic biosurfactant to about 15 parts of a second dried nonionic biosurfactant, about 1 part of a first dried nonionic biosurfactant to about 14 parts of a second dried nonionic biosurfactant, about 1 part of a first dried nonionic biosurfactant to about 13 parts of a second dried nonionic biosurfactant, about 1 part of a first dried nonionic biosurfactant to about 12 parts of a second dried nonionic biosurfactant, about 1 part of a first dried nonionic biosurfactant to about 11 parts of a second dried nonionic biosurfactant, about 1 part of a first dried nonionic biosurfactant to about 10 parts of a second dried nonionic biosurfactant, about 1 part of a first dried nonionic biosurfactant to about 9 parts of a second dried nonionic biosurfactant, about 1 part of a first dried nonionic biosurfactant to about 8 parts of a second dried nonionic biosurfactant, about 1 part of a first dried nonionic biosurfactant to about 7 parts of a second dried nonionic biosurfactant, about 1 part of a first dried nonionic biosurfactant to about 6 parts of a second dried nonionic biosurfactant, about 1 part of a first dried nonionic biosurfactant to about 5 parts of a second dried nonionic biosurfactant, or about 1 part of a first dried nonionic biosurfactant to about 4 parts of a second dried nonionic biosurfactant.

In some embodiments, a dry powdered composition disclosed herein comprises a first dried non-ionic saponin and a second dried non-ionic saponin. In aspects of these embodiments, a dry powdered composition disclosed herein comprises a first dried nonionic saponin in an amount of, e.g., about 5.0% by weight to about 6.0% by weight, about 5.0% by weight to about 7.0% by weight, about 5.0% by weight to about 8.0% by weight, about 5.0% by weight to about 9.0% by weight, about 5.0% by weight to about 10.0% by weight, about 5.0% by weight to about 11.0% by weight, about 5.0% by weight to about 12.0% by weight, about 5.0% by weight to about 13.0% by weight, about 5.0% by weight to about 14.0% by weight or about 5.0% by weight to about 15.0% by weight. In other aspects of these embodiments, a dry powdered composition disclosed herein comprises a second dried nonionic saponin in an amount of, e.g., about 70% by weight to about 75% by weight, about 70% by weight to about 80% by weight, about 70% by weight to about 85% by weight, about 70% by weight to about 90% by weight, about 75% by weight to about 80% by weight, about 75% by weight to about 85% by weight, about 75% by weight to about 90% by weight, about 80% by weight to about 85% by weight, or about 80% by weight to about 90% by weight. In other aspects of these embodiments, a first and second dried saponins include one or more triterpenoid saponins, one or more steroidal saponins, or a combination thereof.

In aspects of these embodiments, a dry powdered composition disclosed herein comprises about 5% to about 15% of a first dried nonionic saponin and about 70% to about 90% of a second dried nonionic saponin. In other aspects of these embodiments, a dry powdered composition disclosed herein comprises about 5% to about 15% of a first dried nonionic saponin and about 75% to about 85% of a second dried nonionic saponin. In yet other aspects of these embodiments, a dry powdered composition disclosed herein comprises about 6% to about 12% of a first dried nonionic saponin and about 73% to about 89% of a second dried nonionic saponin. In still other aspects of these embodiments, a dry powdered composition disclosed herein comprises about 6% to about 12% of a first dried nonionic saponin and about 78% to about 84% of a second dried nonionic saponin.

In aspects of these embodiments, a dry powdered composition disclosed herein comprises about 7% to about 11% of a first dried nonionic saponin and about 74% to about 88% of a second dried nonionic saponin. In other aspects of these embodiments, a dry powdered composition disclosed herein comprises about 7% to about 11% of a first dried nonionic saponin and about 79% to about 83% of a second dried nonionic saponin. In yet other aspects of these embodiments, a dry powdered composition disclosed herein comprises about 8% to about 10% of a first dried nonionic saponin and about 75% to about 87% of a second dried nonionic saponin. In still other aspects of these embodiments, a dry powdered composition disclosed herein comprises about 8% to about 10% of a first dried nonionic saponin and about 80% to about 82% of a second dried nonionic saponin. In yet other aspects of these embodiments, a dry powdered composition disclosed herein comprises about 9% of a first dried nonionic saponin and about 81% of a second dried nonionic saponin. In other aspects of these embodiments, a first dried and second dried saponins include one or more triterpenoid saponins, one or more steroidal saponins, or a combination thereof.

In other aspects of these embodiments, a dry powdered composition disclosed herein comprises a first dried nonionic saponin and a second dried nonionic saponin in a ratio of about 1:1 to about 1:20 relative to each other. In other aspects of these embodiments, a dry powdered composition disclosed herein comprises a ratio of about 1 part of a first dried nonionic saponin to about 18 parts of a second dried nonionic saponin, about 1 part of a first dried nonionic saponin to about 17 parts of a second dried nonionic saponin, about 1 part of a first dried nonionic saponin to about 16 parts of a second dried nonionic saponin, about 1 part of a first dried nonionic saponin to about 15 parts of a second dried nonionic saponin, about 1 part of a first dried nonionic saponin to about 14 parts of a second dried nonionic saponin, about 1 part of a first dried nonionic saponin to about 13 parts of a second dried nonionic saponin, about 1 part of a first dried nonionic saponin to about 12 parts of a second dried nonionic saponin, about 1 part of a first dried nonionic saponin to about 11 parts of a second dried nonionic saponin, about 1 part of a first dried nonionic saponin to about 10 parts of a second dried nonionic saponin, about 1 part of a first dried nonionic saponin to about 9 parts of a second dried nonionic saponin, about 1 part of a first dried nonionic saponin to about 8 parts of a second dried nonionic saponin, about 1 part of a first dried nonionic saponin to about 7 parts of a second dried nonionic saponin, about 1 part of a first dried nonionic saponin to about 6 parts of a second dried nonionic saponin, about 1 part of a first dried nonionic saponin to about 5 parts of a second dried nonionic saponin, or about 1 part of a first dried nonionic saponin to about 4 parts of a second dried nonionic saponin. In other aspects of these embodiments, a first dried and second dried saponins include one or more triterpenoid saponins, one or more steroidal saponins, or a combination thereof.

Aspects of the present specification disclose, in part, kits comprising one or more components useful to practice a method or use disclosed herein. Kits provide a convenient enclosure of components useful to practice a method or use disclosed herein to facilitate or enhance a commercial sale. For example, a kit may comprise a dry powdered composition disclosed herein and one or more other reagents useful to practice a method or use disclosed herein, such as, e.g., one or more diluents, one or more thickening agents, one or more dispersing agents, one or more binding agents, one or more foaming agents, one or more stabilizing agents, one or more film forming agents, and/or one or more preservatives.

Kits typically provide a suitable container, e.g., a box or other enclosed carrier that contain the one or more components useful to practice a method or use disclosed herein. In addition, kits disclosed herein will typically include separate containers, e.g., a bottle, a vial, a flask or other enclosed carrier that contains the one or more components. For example, a container for a dry powdered composition disclosed herein, and separate containers for one or more solvents and/or one or more diluents, one or more thickening agents, one or more dispersing agents, one or more binding agents, one or more foaming agents, one or more stabilizing agents, one or more film forming agents, and/or one or more preservatives disclosed herein. Kits can be portable, for example, able to be transported and used in a residential, commercial or industrial building, in an agricultural field or farm, or in a remote area.

A kit disclosed herein can comprise a delivery or application system. The delivery or application system of the kit are useful for applying a dry powdered or liquid composition disclosed herein to a site of interest. A delivery or application system disclosed herein, includes, without limitation, a mixing container, a granular dispenser, a liquid dispenser, or pellet dispenser, a storage container, or a combination thereof. A kit comprises a one or more delivery or application systems such as two or more, three or more, four or more, or five or more delivery or application system. Within the kit, the delivery or application system may be packaged individually, or in sets of 2 or more. The delivery or application system can be packaged such that it remains sterile until use. In certain embodiments, a delivery or application system disclosed herein can be packaged in plastic sheaths. Further, to prevent contamination, delivery or application system disclosed herein is preferably single-use, disposable delivery or application system.

The kit can also comprise a set of instructions. Instructions include information useful to the end user for employing any of the disclosed dry powdered or liquid compositions, and practicing any of the disclosed methods or uses. For example, instructions can include information on how to mix a dry powdered composition disclosed herein with a solvent disclosed herein to form a liquid composition disclosed herein as well as any dilution instructions. In addition, instructions can provide information on how to use a delivery or application system to apply a dry powdered or liquid composition disclosed herein. Such instructions can also include information indicating dosage amounts, dose frequency, duration of application, and timing criteria, such as that mixing should be done at a certain time before application, such as, e.g., just prior to use. Instructions can include information on how to apply a dry powdered or liquid composition disclosed herein directly to a site of interest, and in what order the individual components should be applied to such sites of interest. Instructions can include information on how to store a dry powdered, a liquid composition, and/or a kit disclosed herein. Instructions may contain warnings on potential hazards or situations where it would not be appropriate to use the components of the kit. Instructions can include information on the individual components and identifying manufacturer information, lot numbers, manufacturer location and date. Instructions can include information on a storage conditions of a kit disclosed herein. Instructions include "printed matter" or a computer readable medium, such as a disk (e.g., hard disk, flash memory), optical disk such as CD- or DVD-ROM/RAM, DVD, MP3, magnetic tape, or an electrical storage media such as RAM and ROM or hybrids of these such as magnetic/optical storage media, FLASH media or memory type cards.

Aspects of the present specification disclose, in part, a method of controlling a causal agent of a plant disease. A disclosed method of controlling a causal agent of a plant disease includes dissolving a dry powdered composition disclosed herein with a solvent to form a liquid composition and applying an effective amount of a liquid composition disclosed herein to one or more plants infested with a causal agent and/or applying an effective amount of a liquid composition disclosed herein to one or more locations where a causal agent will be exposed to the liquid composition. Another method of controlling a causal agent of a plant disease includes a step of adding a dry powdered composition disclosed herein directly to one or more plants and/or one or more locations in a manner where the dry powdered composition is subsequently dissolved in a liquid present on or in the one or more plants or one or more locations to form a liquid composition disclosed herein, where a causal agent will be exposed to the liquid composition. Such applications result in e.g., an adverse effect on the causal agent of a plant disease sought to be controlled.

Aspects of the present specification disclose, in part, use of a dry powdered composition disclosed herein. A disclosed use of a dry powdered composition disclosed herein can be to dissolve the dry powdered composition in a solvent to form a liquid composition and then applying an effective amount of a liquid composition disclosed herein to one or more plants and/or applying an effective amount of a liquid composition disclosed herein to one or more locations where a causal agent will be exposed to the liquid composition. Another disclosed use of a dry powdered composition disclosed herein can be to add the dry powdered composition directly to one or more plants and/or one or more locations where the dry powdered composition is subsequently dissolved in a liquid present on or in the one or more plants or one or more locations to form a liquid composition disclosed herein, where a causal agent will be exposed to the liquid composition. Such applications result in e.g., an adverse effect on the causal agent of a plant disease sought to be controlled.

Aspects of the present specification disclose, in part, methods of increasing plant growth and/or crop production. A disclosed method of increasing plant growth and/or crop production includes dissolving a dry powdered composition disclosed herein to form a liquid composition and applying an effective amount of a liquid composition disclosed herein to one or more plants and/or applying an effective amount of a liquid composition disclosed herein to one or more locations in a manner where the one or more plants will be exposed to the liquid composition where the one or more plants will be exposed to the liquid composition. Another method of increasing plant growth and/or crop production includes a step of adding a dry powdered composition disclosed herein directly to one or more plants and/or one or more locations where the dry powdered composition is subsequently dissolved in a liquid present on or in the one or more plants or one or more locations to form a liquid composition disclosed herein, where the one or more plants will be exposed to the liquid composition. Such applications result in e.g., improved absorption by root hairs, improve xylem sap flow through xylem and improve photosynthate flow in phloem, increased uptake of water, minerals, and other nutrients from the soil, increase the capillary action and/or hydrostatic pressure in xylem, and/or increase synthesis of compounds and energy and/or disruption of one or more components blocking xylem sap flow and/or photosynthate flow.

Aspects of the present specification disclose, in part, use of a dry powdered composition disclosed herein. A disclosed use of a dry powdered composition disclosed herein can be to dissolve the dry powdered composition in a solvent to form a liquid composition and then applying an effective amount of a liquid composition disclosed herein to one or more plants and/or applying an effective amount of a liquid composition disclosed herein to one or more locations where the liquid composition will be exposed to the one or more plants. Another disclosed use of a dry powdered composition disclosed herein can be to add the dry powdered composition directly to one or more plants and/or one or more locations in a manner where the dry powdered composition is subsequently dissolved in a liquid present on or in the one or more plants or one or more locations to form a liquid composition disclosed herein, where the one or more plants will be exposed to the liquid composition. Such applications result in e.g., improved absorption by root hairs, improve xylem sap flow through xylem and improve photosynthate flow in phloem, increased uptake of water, minerals, and other nutrients from the soil, increase the capillary action and/or hydrostatic pressure in xylem, and/or increase synthesis of compounds and energy and/or disruption of one or more components blocking xylem sap flow and/or photosynthate flow. In an embodiment, one or more components blocking xylem sap flow and/or photosynthate flow includes biofilm.

Aspects of the present specification disclose, in part, a method of maintaining or improving the efficiency of an irrigation system. A disclosed method of maintaining or improving the efficiency of an irrigation system includes dissolving a dry powdered composition disclosed herein with a solvent to form a liquid composition and applying an effective amount of a liquid composition disclosed herein to one or more pipes in a pipeline network of the irrigation system. Another disclosed method of maintaining or improving the efficiency of an irrigation system includes a step of adding a dry powdered composition disclosed herein directly to one or more pipes in a pipeline network of the irrigation system where the dry powdered composition is dissolved in the liquid flowing through the one or more pipes to form a liquid composition disclosed herein. Such applications result in e.g., adequate removal of one or more components blocking one or more pipeline networks of an irrigation system. In an embodiment, one or more components blocking one or more pipeline networks includes biofilm.

Aspects of the present specification disclose, in part, use of a dry powdered composition disclosed herein. A disclosed use of a dry powdered composition disclosed herein can be to dissolve the dry powdered composition in a solvent to form a liquid composition and then applying an effective amount of the liquid composition to one or more pipes in a pipeline network of the irrigation system. Another disclosed use of a dry powdered composition disclosed herein can be to add the dry powdered composition directly to one or more pipes in a pipeline network of the irrigation system where the dry powdered composition is dissolved in the liquid flowing through the one or more pipes to form a liquid composition disclosed herein. Such applications result in e.g., adequate removal of one or more components blocking one or more pipeline networks of an irrigation system. In an embodiment, one or more components blocking one or more pipeline networks includes biofilm.

Aspects of the present specification disclose, in part, dissolving a dry powdered composition disclosed herein with a solvent to provide a liquid composition. A solvent is a liquid substance capable of dissolving another substance, e.g., a solvent is used to dissolve a dry powered composition disclosed herein to form a liquid composition disclosed herein. A solvent disclosed herein can be water or a monophasic water-based solution, or a bi- or multiphasic water-based colloidal mixture including an aerosol, emulsion, gel, foam or sol. In some embodiments, a solvent can include other characteristics such as diluting, dispersing, and/or film forming properties. In some embodiments, a solvent can be combined with other components, such as, e.g., another solvent, a diluent, a thickening agent, a dispersing agent, a binding agent, a foaming agent, a stabilizing agent, a film forming agent, or a preservative or the like.

The amount of solvent added to a dry powdered composition disclosed herein is an amount sufficient to produce a liquid composition disclosed herein. In an embodiment, a ratio of dry powdered composition to solvent added to form a liquid composition disclosed herein is from 1:1 to 1:500. In aspects of this embodiment, a ratio of dry powdered composition to solvent added to form a liquid composition disclosed herein is, e.g., about 1:10, about 1:20, about 1:25, about 1:30, about 1:40, about 1:50, about 1:60, about 1:70, about 1:75, about 1:80, about 1:190, or about 1:100. In other aspects of this embodiment, a ratio of dry powdered composition to solvent added to form a liquid composition disclosed herein is, e.g., at least 1:10, at least 1:20, at least 1:25, at least 1:30, at least 1:40, at least 1:50, at least 1:60, at least 1:70, at least 1:75, at least 1:80, at least 1:190, or at least 1:100. In yet other aspects of this embodiment, a ratio of dry powdered composition to solvent added to form a liquid composition disclosed herein is, e.g., at most 1:10, at most 1:20, at most 1:25, at most 1:30, at most 1:40, at most 1:50, at most 1:60, at most 1:70, at most 1:75, at most 1:80, at most 1:190, or at most 1:100. In still other aspects of this embodiment, a ratio of dry powdered composition to solvent added to form a liquid composition disclosed herein is, e.g., about 1:10 to about 1:20, about 1:10 to about 1:30, about 1:10 to about 1:40, about 1:10 to about 1:50, about 1:10 to about 1:60, about 1:10 to about 1:70, about 1:10 to about 1:80, about 1:10 to about 1:90, about 1:10 to about 1:100, about 1:20 to about 1:30, about 1:20 to about 1:40, about 1:20 to about 1:50, about 1:20 to about 1:60, about 1:20 to about 1:70, about 1:20 to about 1:80, about 1:20 to about 1:90, about 1:20 to about 1:100, about 1:25 to about 1:35, about 1:25 to about 1:40, about 1:25 to about 1:50, about 1:30 to about 1:40, about 1:30 to about 1:50, about 1:30 to about 1:60, about 1:30 to about 1:70, about 1:30 to about 1:80, about 1:30 to about 1:90, about 1:30 to about 1:100, about 1:40 to about 1:50, about 1:40 to about 1:60, about 1:40 to about 1:70, about 1:40 to about 1:80, about 1:40 to about 1:90, about 1:40 to about 1:100, about 1:50 to about 1:60, about 1:50 to about 1:70, about 1:50 to about 1:80, about 1:50 to about 1:90, about 1:50 to about 1:100, about 1:60 to about 1:70, about 1:60 to about 1:80, about 1:60 to about 1:90, about 1:60 to about 1:100, about 1:70 to about 1:80, about 1:70 to about 1:90, about 1:70 to about 1:100, about 1:80 to about 1:90, about 1:80 to about 1:100, or about 1:90 to about 1:100.

In an embodiment, the percentage by weight of dry powdered composition added to a solvent to form a liquid composition disclosed herein is from 0.1% to 50%. In aspects of this embodiment, the percentage by weight of dry powdered composition added to a solvent to form a liquid composition disclosed herein is, e.g., about 0.1%, about 0.25%, about 0.5%, about 0.75%, about 1%, about 2%, about 3%, about 4%, about 5%, about 6%, about 7%, about 8%, about 9% to about 10%. In other aspects of this embodiment, the percentage by weight of dry powdered composition added to a solvent to form a liquid composition disclosed herein is, e.g., at least 0.1%, at least 0.25%, at least 0.5%, at least 0.75%, at least 1%, at least 2%, at least 3%, at least 4%, at least 5%, at least 6%, at least 7%, at least 8%, at least 9% to at least 10%. In yet other aspects of this embodiment, the percentage by weight of dry powdered composition added to a solvent to form a liquid composition disclosed herein is, e.g., at most 0.1%, at most 0.25%, at most 0.5%, at most 0.75%, at most 1%, at most 2%, at most 3%, at most 4%, at most 5%, at most 6%, at most 7%, at most 8%, at most 9% to at most 10%. In still other aspects of this embodiment, the percentage by weight of dry powdered composition added to a solvent to form a liquid composition disclosed herein is, e.g., about 0.1% to about 0.5%, about 0.1% to about 1%, about 0.1% to about 2%, about 0.1% to about 3%, about 0.1% to about 4%, about 0.1% to about 5%, about 0.1% to about 6%, about 0.1% to about 7%, about 0.1% to about 8%, about 0.1% to about 9%, about 0.1% to about 10%, about 0.5% to about 1%, about 0.5% to about 2%, about 0.5% to about 3%, about 0.5% to about 4%, about 0.5% to about 5%, about 0.5% to about 6%, about 0.5% to about 7%, about 0.5% to about 8%, about 0.5% to about 9%, about 0.5% to about 10%, about 1% to about 2%, about 1% to about 3%, about 1% to about 4%, about 1% to about 5%, about 1% to about 6%, about 1% to about 7%, about 1% to about 8%, about 1% to about 9%, about 1% to about 10%, about 2% to about 3%, about 2% to about 4%, about 2% to about 5%, about 2% to about 6%, about 2% to about 7%, about 2% to about 8%, about 2% to about 9%, about 2% to about 10%, about 3% to about 4%, about 3% to about 5%, about 3% to about 6%, about 3% to about 7%, about 3% to about 8%, about 3% to about 9%, about 3% to about 10%, about 4% to about 5%, about 4% to about 6%, about 4% to about 7%, about 4% to about 8%, about 4% to about 9%, about 4% to about 10%, about 5% to about 6%, about 5% to about 7%, about 5% to about 8%, about 5% to about 9%, about 5% to about 10%, about 6% to about 7%, about 6% to about 8%, about 6% to about 9%, about 6% to about 10%, about 7% to about 8%, about 7% to about 9%, about 7% to about 10%, about 8% to about 9%, about 8% to about 10%, or about 8% to about 10%.

Once a liquid composition disclosed herein is formed, it can be further formulated by adding one or more diluents, one or more thickening agents, one or more dispersing agents, one or more binding agents, one or more foaming agents, one or more stabilizing agents, one or more film forming agents, and/or one or more preservatives.

A diluent (also referred to as a diluting agent, dilutant, thinner or filler) is a substance that decreases the viscosity or density of a dry powdered composition or liquid composition disclosed herein. A liquid composition disclosed herein may be too viscous or dense to be effectively pumped, sprayed or otherwise applied to a structure or area or to flow from one particular point to another according to a method or use disclosed herein. A diluent is added to a liquid composition disclosed herein in order to reduce its viscosity or density. In some embodiments, a diluent is added to a liquid composition disclosed herein formulated as a concentrate that requires dilution before use. In some embodiments, a diluent can include characteristics of a solvent. In some embodiments, a diluent can be combined with other components, such as, e.g., a solvent, another diluent, a thickening agent, a dispersing agent, a binding agent, a foaming agent, a stabilizing agent, a film forming agent, or a preservative or the like. Non-limiting examples of a diluent includes water, a monophasic water-based solution, or a bi- or multiphasic water-based colloidal mixture, or the like or any combination thereof. In some embodiments one or more diluents, including two or more, three or more, four or more, or five or more diluents can be added individually or collectively to a composition disclosed herein in a total amount of 1% to about 75%, about 5% to about 60% by weight, about 10% to about 50%, or about 15% to about 40% by weight of each of the one or more diluents.

A thickening agent (also referred to as a thickener) is a substance that increases the viscosity or density of a liquid composition disclosed herein. A liquid composition disclosed herein may be too watery or unsticky to be effectively applied to a structure or environmental area according to a method or use disclosed herein. A thickening agent is added to a liquid composition disclosed herein in order to increase its viscosity or density. In some embodiments, a diluent is added to a dry powdered composition disclosed herein to bulk up a dry powdered composition disclosed herein In some embodiments, a diluent is added to a liquid composition disclosed herein to formulate a paste composition disclosed herein. In some embodiments, a thickening agent is a swellable thickening agent that aids in causing a foam to form a gel when a composition disclosed herein comes into contact with a polar hydrophilic liquid (e.g. alcohols, ketones etc.). In some embodiments, the thickening agent acts as a barrier towards the fuel vapors and liquids and prevents the foam blanket from breaking. In some embodiments, a thickening agent can be combined with other components, such as, e.g., a solvent, a diluent, another thickening agent, a dispersing agent, a binding agent, a foaming agent, a stabilizing agent, a film forming agent, or a preservative or the like. Thickening agents include gums and starches. Non-limiting examples of a thickening agent includes guar gum, diutan gum, rhamsam gum; welan gum, galactomannan gum, mannan gum, locust bean gum, carbomer, xanthan gum, gum Arabic, pectin (pectic ace), Acacia gum, insulin guar, karaya, agar, algin (alginic acid), carrageenan, furcellaran, curdlan, dextran, cellulon, pullulan, cornstarch, potato starch, tapioca, rice starch, cellulose, hydroxyethyl cellulose, carboxymethylcellulose (CMC), methylcellulose, cyclodextrins, polydextrose, glycogen, hyaluronic acid, chitin, or the like or any combination thereof. In some embodiments one or more thickening agents, including two or more, three or more, four or more, or five or more thickening agents can be added individually or collectively to a composition disclosed herein in a total amount of 0.01% to about 30%, about 0.1% to about 20% by weight, about 1% to about 10%, about 2% to about 5% or about 1% to about 3% by weight of each of the one or more thickening agents.

A dispersing agent (also known as a dispersant or a plasticizer) is a compound or mixture of compounds that is either a non-surface active polymer or a surface-active substance added to a dry powdered composition or a liquid composition to improve the separation of particles and to prevent settling or clumping. In some embodiments, a dispersing agent is added to a dry powdered composition disclosed herein to improve the separation of particles and to prevent settling or clumping. In some embodiments, a dispersing agent is added to a liquid composition disclosed herein formulated as a colloidal composition disclosed herein to improve the separation of particles and to prevent settling or clumping. In some embodiments, a dispersing agent can be combined with other components, such as, e.g., a solvent, a diluent, a thickening agent, another dispersing agent, a foaming agent, a stabilizing agent, a film forming agent, or a preservative or the like. Non-limiting examples of a dispersing agent includes a surfactant, an emulsifier, a clay, acrylic acid-based compounds, sodium bis(tridecyl) sulfosuccinate, di(2-ethyl hexyl) sodium sulfosuccinate, sodium dihexylsulfosuccinate, sodium dicyclohexyl sulfosuccinate, diamyl sodium sulfosuccinate, sodium diisobutyl sulfosuccinate, disodium iso-decyl sulfosuccinate, disodium ethoxylated alcohol half ester of sulfosuccinic acid, disodium alkyl amido polyethoxy sulfosuccinate, tetra-sodium N-(1,2-dicarboxyethyl)-N-octadecyl sulfosuccinamate, disodium N-octasulfosuccinamate, and sulfated ethoxylated nonylphenol, 2-amino-2-methyl-1-propanol, mono $C_{8-24}$ fatty acids, $C_{8-24}$ saturated fatty acids, and phthalate esters such as di-2-ethyl hexyl phthalate (DEHP), diisodecyl phthalate (DIDP), diisononyl phthalate (DINP), and benzyl-butylphthalate (BBP) or the like or any combination thereof. In some embodiments one or more dispersing agents, including two or more, three or more, four or more, or five or more dispersing agents can be added individually or collectively to a composition disclosed herein in a total amount of 0.01% to about 30%, about 0.1% to about 20% by weight, about 1% to about 10%, about 2% to about 5% or about 1% to about 3% by weight of each of the one or more dispersing agents.

A binding agent (also known as a binder) is a compound or mixture of compounds that improves the adherence and/or cohesion of one or more other components comprising a dry powdered or liquid composition disclosed herein together to form a cohesive whole mechanically, chemically, by adhesion or cohesion. In some embodiments one or more binding agents, including two or more, three or more, four or more, or five or more binding agents can be added individually or collectively to a composition disclosed herein in a total amount of 0.01% to about 30%, about 0.1% to about 20% by weight, about 1% to about 10%, about 2% to about 5% or about 1% to about 3% by weight of each of the one or more binding agents.

A foaming agent (also known as a blowing agent) is a compound or mixture of compounds that produces gas when hydrated under suitable conditions and gives a composition disclosed herein foaming properties and/or boost the foaming properties. For example, a foaming agent can facilitate formation of a foam by reducing the surface tension of a liquid composition disclosed herein or increasing the colloidal stability by inhibiting coalescence of bubbles of a liquid composition disclosed herein formulated as a colloidal composition disclosed herein. In some embodiments, a foaming agent can be combined with other components, such as, e.g., a solvent, a diluent, a thickening agent, a dispersing agent, a binding agent, another foaming agent, a stabilizing agent, a film forming agent, or a preservative or the like. Synthetic and protein-based forming agents. Synthetic forming agents include aqueous film forming foaming agents and alcohol-resistant aqueous film-forming foaming agents. Protein-based forming agents include animal protein-based forming agents, plant protein-based forming agents, fluoroprotein forming agents, film-forming fluoroprotein forming agents, alcohol-resistant fluoroprotein forming agents, alcohol-resistant film-forming fluoroprotein forming agents. Non-limiting examples of a foaming agent includes alfalfa extract, *Medicago sativa*, hydroxypropyl methylcellulose (HPMC), methylcellulose, non-ionic water-soluble polymers, ionic water-soluble polymers, hydrocarbon-based surfactants such as sodium alkyl sulfate, or the like or any combination thereof. In some embodiments one or more foaming agents, including two or more, three or more, four or more, or five or more foaming agents can be added individually or collectively to a composition disclosed herein in a total amount of 0.2% to about 15%, about 0.5% to about 10% by weight, or about 1% to about 5% by weight of each of the one or more foaming agents.

A stabilizing agent (also known as a stabilizer, emulsifier, or emulgent) is a compound or mixture of compounds that increases the stability of a dry powdered composition or a liquid composition disclosed herein including a paste or colloidal composition disclosed herein. In some embodiments, a stabilizing agent is added to a dry powdered composition disclosed herein to increase its stability. In some embodiments, a stabilizing agent is added to a liquid composition disclosed herein including a paste or colloidal composition disclosed herein to increase its stability. In some embodiments, a stabilizing agent can include characteristics of a solvent. In some embodiments, a stabilizing agent can be combined with other components, such as, e.g., a solvent, a diluent, a thickening agent, a dispersing agent, a binding agent, a foaming agent, another stabilizing agent, a film forming agent, or a preservative or the like. A stabilizing agent includes a foam stabilizing agent that extends the lifetime of a foam composition disclosed herein. Non-limiting examples of a stabilizing agent includes partially hydrolyzed protein, starches, polyvinyl resins such as polyvinyl alcohol, polyacrylamides, carboxyvinyl polymers, polypyrrolidine and poly(oxyethylene) glycol, ethylene glycol, propylene glycol, glycol ethers, including glycol monoethers like methyl, propyl, butyl or hexyl mono-ether, e.g., 2-butoxyethanol, or glycol diethers like diethylene glycol ethers (carbitols), butyl carbitol, hexylene glycol, lauryl alcohol, formaldehyde and alkyl hydroxy benzoates; preferably the preserving or stabilizing agents is a mixture of methyl and propyl hydroxy benzoates, or the like or any combination thereof. In some embodiments one or more stabilizing agents, including two or more, three or more, four or more, or five or more stabilizing agents can be added individually or collectively to a composition disclosed herein in a total amount of 0.1% to about 50%, about 0.5% to about 40% by weight, about 1% to about 30%, about 2% to about 30% or about 5% to about 25% by weight of each of the one or more stabilizing agents. In some embodiments one or more stabilizing agents, including two or more, three or more, four or more, or five or more stabilizing agents can be added individually or collectively to a composition disclosed herein in a total amount of 0.1% to about 10%, about 0.5% to about 8% by weight, about 1% to about 8% by weight, about 1% to about 6%, about 2% to about 6% or about 1% to about 5% by weight of each of the one or more stabilizing agents.

A film forming agent is a compound or mixture of compounds that facilitates a pliable, cohesive and continuous hydrophobic covering of a liquid composition disclosed herein over a surface. In some embodiments, a film forming agent can include characteristics of a solvent. In some embodiments, a diluent can be combined with other components, such as, e.g., a solvent, a diluent, a thickening agent, a dispersing agent, a binding agent, a foaming agent, a stabilizing agent, another film forming agent, or a preservative or the like. A film forming agent can be an alcohol-based film forming agent, an alcohol ether-based film forming agent, or an ester-based film forming agent. Non-limiting examples of a film forming agent include a water-soluble polymer, a propanediol ether, acetate, or the like or any combination thereof. In some embodiments one or more film forming agents, including two or more, three or more, four or more, or five or more film forming agents can be added individually or collectively to a composition disclosed herein in a total amount of 0.01% to about 4% by weigh, about 0.1% to about 2% by weight, about 0.25% to about 1.5% by weigh, about 0.25% to about 1.0% by weigh, or about 0.5% to about 1.0% by weight of each of the one or more film forming agents.

A preservative is a compound or mixture of compounds that prevents decomposition of a dry powdered composition or a liquid composition disclosed herein including a paste or colloidal composition disclosed herein. In some embodiments, a preservative is added to a dry powdered composition disclosed herein to prevent its decomposition. In some embodiments, a preservative is added to a liquid composition disclosed herein including a paste or colloidal composition disclosed herein to prevent its decomposition. In some embodiments, a preservative can include characteristics of a solvent. In some embodiments, a preservative can be combined with other components, such as, e.g., a solvent, a diluent, a thickening agent, a dispersing agent, a binding agent, a foaming agent, a stabilizing agent, a film forming agent, or another preservative or the like. Non-limiting examples of a preservative includes sodium benzoate, imidazolidinyl urea, diazolidinyl urea, calcium chloride, citric acid, ascorbic acid, tartaric acid, sodium hydroxymethylglycinate (Nuosept 44), or any combination thereof. In some embodiments one or more preservatives, including two or more, three or more, four or more, or five or more preservatives can be added individually or collectively to a composition disclosed herein in a total amount of 0.01% to about 4% by weigh, about 0.1% to about 2% by weight, about 0.25% to about 1.5% by weigh, about 0.25% to about 1.0% by weigh, or about 0.5% to about 1.0% by weight of each of the one or more preservatives.

Aspects of the present specification disclose, in part, a pH of a liquid composition disclosed herein. The final pH of a liquid composition is typically acidic as this contributes to the stability of the liquid composition. In aspects of this embodiment, the pH of a liquid composition disclosed herein is, e.g., about 2.0, about 2.5, about 3.0, about 3.5, about 4.0, about 4.5, about 5.0, about 5.5 or about 6.0. In other aspects of this embodiment, the pH of a liquid composition disclosed herein is, e.g., at least 2.0, at least 2.5, at least 3.0, at least 3.5, at least 4.0, at least 4.5, at least 5.0, at least 5.5 or at least 6.0. In yet other aspects of this embodiment, the pH of a liquid composition disclosed herein is, e.g., at most 2.0, at most 2.5, at most 3.0, at most 3.5, at most 4.0, at most 4.5, at most 5.0, at most 5.5 or at most 6.0. In still other aspects of this embodiment, the pH of a liquid composition disclosed herein is between, e.g., about 2.0 to about 3.0, about 2.0 to about 3.5, about 2.0 to about 4.0, about 2.0 to about 4.5, about 2.0 to about 5.0, about 2.0 to about 5.5, about 2.0 to about 6.0, about 2.5 to about 3.0, about 2.5 to about 3.5, about 2.5 to about 4.0, about 2.5 to about 4.5, about 2.5 to about 5.0, about 2.5 to about 5.5, about 2.5 to about 6.0, about 3.0 to about 3.5, about 3.0 to about 4.0, about 3.0 to about 4.2, about 3.0 to about 4.5, about 3.0 to about 4.7, about 3.0 to about 5.0, about 3.0 to about 5.2, about 3.0 to about 5.5, about 3.0 to about 6.0, about 3.5 to about 4.0, about 3.5 to about 4.2, about 3.5 to about 4.5, about 3.5 to about 4.7, about 3.5 to about 5.0, about 3.5 to about 5.2, about 3.5 to about 5.5, about 3.5 to about 6.0, about 3.7 to about 4.0, about 3.7 to about 4.2, about 3.7 to about 4.5, about 3.7 to about 5.2, about 3.7 to about 5.5 or about 3.7 to about 6.0.

Aspects of the present specification disclose, in part, directly adding a dry powdered composition disclosed herein to an area to form a liquid composition disclosed herein. Non-limiting examples of an area include one or more plants and/or one or more locations and/or one or more pipes in a pipeline network of the irrigation system. In these embodiments, the disclosed methods and uses rely on liquid already present in an area to dissolve a dry powdered composition disclosed herein. For example, a dry powdered composition can be added to one or more locations like soil and a solvent like water present in the soil can dissolve the dry powdered composition to form a liquid composition disclosed herein. In another example, a dry powdered composition can be added to one or more plants and/or one or more locations and then a solvent like water can be applied to the one or more plants and/or one or more locations, thereby dissolving the dry powdered composition to form a liquid composition disclosed herein. In yet another example, a dry powdered composition can be added to one or more pipes and a solvent like water present in the one or more pipes can dissolve the dry powdered composition to form a liquid composition disclosed herein. In methods and uses applying a dry powdered composition disclosed herein a resulting liquid composition disclosed herein must be formed as the dry powdered composition has no appreciable effect.

Upon application of a dry powdered composition or liquid composition disclosed herein using a method or use disclosed herein, the liquid composition disclosed herein results in an accelerated in situ chemical reactions of the molecular structures, particularly chemical bonds present in polysaccharide and lipid-based components, of 1) the one or more components present in the protective structure of a causal agent of a plant disease; 2) the one or more components blocking xylem sap and/or photosynthate flow in a plant; or 3) the one or more components blocking water flow in an irrigation system. These in situ chemical reactions dissolve, disperse, or otherwise disrupt 1) the one or more components of the protective structure of the causal agent, resulting in its death through disruption of one or more essential physiological processes; 2) the one or more components that block xylem sap flow in xylem and/or photosynthate flow in phloem, resulting in improved transport of water and nutrients that will maintain and/or enhance the health and vigor of plants; or 3) the one or more components that disrupt water flow in a pipeline network of an irrigation system, resulting in improved water distribution that will maintain and/or enhance the health and vigor of plants.

Without wishing to be limited by any theory, upon formation of a liquid composition disclosed herein, highly reactive, uniquely structured, ultra-fine microbubbles are spontaneously formed. These "functionalized" microbubbles comprise an outer "highly reactive" shell composed of one or more nonionic surfactants and components from the treated fermented microbial supernatant and an inner core containing air. The "highly reactive" shell enables a dramatic increase in the mass transfer of oxygen in an aqueous environment and an accelerated bio-catalysis of the molecular structures of compounds, which in combination provide a synergistic functionality. With respect to mass transfer of oxygen, this functionality increases transfer rates of oxygen and raises the level of dissolved oxygen in an aqueous environment which far exceeding the solubility limits anticipated by Henry's Law, and, are at levels that simply cannot be achieved through mechanical aeration systems. It appears that components from the treated fermented microbial supernatant interfere with the ability of the nonionic surfactants to create a well-organized micellar shell. The result is a loose molecular packing of these fermentation components and surfactants that "functionalized" the shell to be more gas permeable, thereby creating more favorable conditions for mass gas transfer. As such, this oxygen transfer function increases the availability of oxygen in an aqueous environment. With respect to accelerated bio-catalysis, this functionality lowers the transition of energy required for a catalytic reaction to occur by providing a reaction platform that increases localized concentrations of reactants, enables donation of electrons and facilitate chemical reactions at electron poor sites. As such, this bio-catalysis function mediates cleavage of chemical bonds, including glycosidic and ester bonds, present in a compound. As such, the "functionalized" shell of the microbubbles have catalytic activities that are like conventional enzyme systems, but without the need of any enzymes. Thus, application of a liquid composition disclosed herein creates "functionalized" microbubbles that increase oxygen dispersion resulting in higher dissolved oxygen levels and accelerate molecular interactions resulting in catalytic breakdown of compounds.

When in contact with a protective structure of a causal agent, the "functionalized" microbubbles chemically interacts with one or more components of the protective structure in a manner that enables donation of electrons or reactions at electron poor sites that mediates cleavage of chemical bonds, including glycosidic and ester bonds, present in the one or more components. Similarly, when in contact with one or more components blocking xylem sap and/or photosynthate flow in a plant, the "functionalized" microbubbles chemically interacts with one or more components in a manner that enables donation of electrons or reactions at electron poor sites that mediates cleavage of chemical bonds, including glycosidic and ester bonds, present in the one or more components. Likewise, when in contact with one or more components blocking water flow in an irrigation system, the "functionalized" microbubbles chemically interacts with one or more components in a manner that enables donation of electrons or reactions at electron poor sites that mediates cleavage of chemical bonds, including glycosidic and ester bonds, present in the one or more components. These interactions appear to be a form of hydrolysis using beta-oxidation where, in addition to relying on the "highly reactive" shell, oxygen present in the core of the microbubble is also utilized. Thus, the properties present in the "functionalized" microbubbles works synergistically with the oxygen transfer capabilities of the core to enhance the in situ breaking of chemical bonds, including glycosidic and ester bonds present in 1) the one or more components present in the protective structure of a causal agent of a plant disease; 2) the one or more components blocking xylem sap and/or photosynthate flow in a plant; and/or 3) the one or more components blocking water flow in an irrigation system.

In addition, when in contact with root hairs, "functionalized" microbubbles increase water absorption, increase nitrogen-fixation, increase gas exchange, increase capillary action and hydrostatic pressure in vascular tissue by making the membranes of the root hairs more permeable to water transfer and providing a better microbial environment for symbiotic organisms that enhance root hair function. Such interactions improve absorption by root hairs, improve xylem sap flow through xylem and improve photosynthate flow in phloem, resulting in improved transport of raw materials, growth components and energy that will be used to maintain and/or enhance the health and vigor of plants.

Application of a dry powdered composition or a liquid composition disclosed herein can be by any method that provides an effective amount of a liquid composition disclosed herein that exposes the one or more components present in the protective structure of a causal agent of a plant disease to the disclosed liquid compositions in a manner that provides adequate disruption of one or more components of the protective structure and subsequent death through disruption of one or more essential physiological processes. For example, exposure can be by direct application to the causal agent or by indirect application to a location where the causal agent will be exposed to a liquid composition herein disclosed.

Likewise, application of a dry powdered composition or a liquid composition disclosed herein can be by any method that provides an effective amount of a liquid composition disclosed herein that exposes the root hairs to the disclosed liquid compositions in a manner that provides increase uptake of water, minerals, and other nutrients from the soil, increase the capillary action and/or hydrostatic pressure in xylem, and/or increase synthesis of compounds and energy and subsequent improvement in root hair absorption, xylem sap flow through xylem and photosynthate flow in phloem. For example, exposure can be by direct application to one or more plants or by indirect application to a location where the one or more plants will be exposed to a liquid composition herein disclosed.

Similarly, application of a dry powdered composition or a liquid composition disclosed herein can be by any method that provides an effective amount of a liquid composition disclosed herein that exposes the one or more components that block xylem sap flow in xylem and/or photosynthate flow in phloem to the disclosed liquid compositions in a manner that provides adequate disruption of one or more components of the protective structure and subsequent improvement of transport of water and nutrients that will maintain and/or enhance the health and vigor of plants. For example, exposure can be by direct application to one or more plants or by indirect application to a location where the one or more plants will be exposed to a liquid composition herein disclosed.

In addition, application of a dry powdered composition or a liquid composition disclosed herein can be by any method that provides an effective amount of a liquid composition disclosed herein that exposes the one or more components that disrupt water flow in a pipeline network of an irrigation system to the disclosed liquid compositions in a manner that provides adequate disruption of one or more components of the protective structure and subsequent improvement of water distribution in the irrigation system that will maintain and/or enhance the health and vigor of plants. For example, exposure can be by direct application to one or more pipeline networks of the irrigation system or by indirect application to a location where the one or more pipeline networks of the irrigation system will be exposed to a liquid composition herein disclosed.

Application of a dry powdered composition or a liquid composition disclosed herein is in an effective amount. An effective amount of a disclosed dry powdered composition or liquid composition is an amount sufficient to cause the desired effect. An effective amount of a disclosed dry powdered composition or liquid composition can be 1) an amount sufficient to cause an adverse effect on the population of a causal agent of a plant disease sought to be controlled; 2) an amount sufficient to improve absorption by root hairs, improve xylem sap flow through xylem and improve photosynthate flow in phloem; 3) an amount sufficient to increase uptake of water, minerals, and other nutrients from the soil, increase the capillary action and/or hydrostatic pressure in xylem, and/or increase synthesis of compounds and energy; 4) an amount sufficient to cause adequate disruption of one or more components blocking xylem sap and/or photosynthate flow; and/or 5) an amount sufficient to cause adequate removal of one or more components blocking one or more pipeline networks of an irrigation system. The actual effective amount of a disclosed dry powdered composition or a liquid composition is determined by routine screening procedures employed to evaluate controlling activity and efficacy of a disclosed dry powdered composition or a liquid composition. Such screening procedures are well known by those skilled in the art. It is expected that a dry powdered composition or a liquid composition disclosed herein having a higher level of activity can be used in smaller amounts and concentrations, while those having a lower level of activity may require larger amounts or concentrations in order to achieve the same controlling effect.

An effective amount of a disclosed dry powdered composition or liquid composition can be an amount sufficient to cause an adverse effect to causal agents sought to be controlled. In aspects of this embodiment, an effective amount of a disclosed dry powdered composition or liquid composition is an amount sufficient to cause an adverse effect on, e.g., about 10%, about 15%, about 20'Y°, about 25'Y°, about 30%, about 35%, about 40%, about 45%, about 50%, about 55%, about 60%, about 65%, about 70%, about 75%, about 80%, about 85%, about 90% or about 95% of the causal agents in a population infecting a plant. In other aspects of this embodiment, an effective amount of a disclosed dry powdered composition or liquid composition is an amount sufficient to cause an adverse effect on, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95% of the causal agents in a population infecting a plant. In still other aspects of this embodiment, an effective amount of a disclosed dry powdered composition or liquid composition is an amount sufficient to cause an adverse effect on, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95% of the causal agents in a population infecting a plant. In yet other aspects of this embodiment, an effective amount of a disclosed dry powdered composition or liquid composition is an amount sufficient to cause an adverse effect on, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95% of the causal agents in a population infecting a plant. In other aspects of these embodiments, an adverse effect on the causal agents in a population infecting a plant include, without limitation, mortality of the causal agents sought to be controlled, size reduction of a population of a causal agent sought to be controlled, and deterring a population of a causal agent sought to be controlled from entering or infesting one or more locations.

An effective amount of a disclosed dry powdered composition or liquid composition can be an amount sufficient to improve absorption of water, minerals, and other nutrients from the soil by root hairs. In aspects of this embodiment, an effective amount of a disclosed dry powdered composition or liquid composition is an amount sufficient to improve absorption of water, minerals, and other nutrients from the soil by root hairs by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed dry powdered composition or liquid composition is an amount sufficient to improve absorption of water, minerals, and other nutrients from the soil by root hairs by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed dry powdered composition or liquid composition is an amount sufficient to improve absorption of water, minerals, and other nutrients from the soil by root hairs by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed dry powdered composition or liquid composition is an amount sufficient to improve absorption of water, minerals, and other nutrients from the soil by root hairs by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed dry powdered composition or liquid composition can be an amount sufficient to improve xylem sap flow through xylem, increase capillary action and/or hydrostatic pressure in xylem, improve photosynthate flow in phloem, dissolve, disperse, or otherwise remove one or more components that disrupt xylem sap flow in xylem, and/or dissolve, disperse, or otherwise remove one or more components that disrupt photosynthate flow in phloem. In aspects of this embodiment, an effective amount of a disclosed dry powdered composition or liquid composition is an amount sufficient to improve xylem sap flow through xylem, increase capillary action and/or hydrostatic pressure in xylem, improve photosynthate flow in phloem, dissolve, disperse, or otherwise remove one or more components that disrupt xylem sap flow in xylem, and/or dissolve, disperse, or otherwise remove one or more components that disrupt photosynthate flow in phloem by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed dry powdered composition or liquid composition is an amount sufficient to improve xylem sap flow through xylem, increase capillary action and/or hydrostatic pressure in xylem, improve photosynthate flow in phloem, dissolve, disperse, or otherwise remove one or more components that disrupt xylem sap flow in xylem, and/or dissolve, disperse, or otherwise remove one or more components that disrupt photosynthate flow in phloem by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed dry powdered composition or liquid composition is an amount sufficient to improve xylem sap flow through xylem, increase capillary action and/or hydrostatic pressure in xylem, improve photosynthate flow in phloem, dissolve, disperse, or otherwise remove one or more components that disrupt xylem sap flow in xylem, and/or dissolve, disperse, or otherwise remove one or more components that disrupt photosynthate flow in phloem by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed dry powdered composition or liquid composition is an amount sufficient to improve xylem sap flow through xylem, increase capillary action and/or hydrostatic pressure in xylem, improve photosynthate flow in phloem, dissolve, disperse, or otherwise remove one or more components that disrupt xylem sap flow in xylem, and/or dissolve, disperse, or otherwise remove one or more components that disrupt photosynthate flow in phloem by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed dry powdered composition or liquid composition can be an amount sufficient to increase uptake of water, minerals, and other nutrients from the soil, improve the transportation of raw materials through a plant, increase synthesis of compounds and energy in a plant, improve the synthesis of compounds and energy needed to sustain and continue plant growth, and/or maintain and/or enhance the health and vigor of a plant. In aspects of this embodiment, an effective amount of a disclosed dry powdered composition or liquid composition is an amount sufficient to increase uptake of water, minerals and other nutrients from the soil, improve the transportation of raw materials through a plant, increase synthesis of compounds and energy in a plant, improve the synthesis of compounds and energy needed to sustain and continue plant growth, and/or maintain and/or enhance the health and vigor of a plant by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed dry powdered composition or liquid composition is an amount sufficient to increase uptake of water, minerals, and other nutrients from the soil, improve the transportation of raw materials through a plant, increase synthesis of compounds and energy in a plant, improve the synthesis of compounds and energy needed to sustain and continue plant growth, and/or maintain and/or enhance the health and vigor of a plant by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed dry powdered composition or liquid composition is an amount sufficient to increase uptake of water, minerals, and other nutrients from the soil, improve the transportation of raw materials through a plant, increase synthesis of compounds and energy in a plant, improve the synthesis of compounds and energy needed to sustain and continue plant growth, and/or maintain and/or enhance the health and vigor of a plant by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed dry powdered composition or liquid composition is an amount sufficient to increase uptake of water, minerals, and other nutrients from the soil, improve the transportation of raw materials through a plant, increase synthesis of compounds and energy in a plant, improve the synthesis of compounds and energy needed to sustain and continue plant growth, and/or maintain and/or enhance the health and vigor of a plant by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95% or about 90% to about 95%.

An effective amount of a disclosed dry powdered composition or liquid composition can be an amount sufficient to dissolve, disperse, or otherwise remove one or more components that disrupt water flow in a pipeline network of an irrigation system and/or improve water transport throughout the pipeline network. In aspects of this embodiment, an effective amount of a disclosed dry powdered composition or liquid composition is an amount sufficient to dissolve, disperse, or otherwise remove one or more components that disrupt water flow in a pipeline network of an irrigation system and/or improve water transport throughout the pipeline network by, e.g., about 10%, about 15%, about 20%, about 25%, about 30%, about 35%, about 40%, about 45%, about 50%, about 55%, about 60%, about 65%, about 70%, about 75%, about 80%, about 85%, about 90% or about 95%. In other aspects of this embodiment, an effective amount of a disclosed dry powdered composition or liquid composition is an amount sufficient to dissolve, disperse, or otherwise remove one or more components that disrupt water flow in a pipeline network of an irrigation system and/or improve water transport throughout the pipeline network by, e.g., at least 10%, at least 15%, at least 20%, at least 25%, at least 30%, at least 35%, at least 40%, at least 45%, at least 50%, at least 55%, at least 60%, at least 65%, at least 70%, at least 75%, at least 80%, at least 85%, at least 90% or at least 95%. In still other aspects of this embodiment, an effective amount of a disclosed dry powdered composition or liquid composition is an amount sufficient to dissolve, disperse, or otherwise remove one or more components that disrupt water flow in a pipeline network of an irrigation system and/or improve water transport throughout the pipeline network by, e.g., at most 10%, at most 15%, at most 20%, at most 25%, at most 30%, at most 35%, at most 40%, at most 45%, at most 50%, at most 55%, at most 60%, at most 65%, at most 70%, at most 75%, at most 80%, at most 85%, at most 90% or at most 95%. In yet other aspects of this embodiment, an effective amount of a disclosed dry powdered composition or liquid composition is an amount sufficient to dissolve, disperse, or otherwise remove one or more components that disrupt water flow in a pipeline network of an irrigation system and/or improve water transport throughout the pipeline network by, e.g., about 10% to about 20%, about 10% to about 30%, about 10% to about 40%, about 10% to about 50%, about 10% to about 60%, about 10% to about 70%, about 10% to about 80%, about 10% to about 90%, about 10% to about 95%, about 20% to about 30%, about 20% to about 40%, about 20% to about 50%, about 20% to about 60%, about 20% to about 70%, about 20% to about 80%, about 20% to about 90%, about 20% to about 95%, about 30% to about 40%, about 30% to about 50%, about 30% to about 60%, about 30% to about 70%, about 30% to about 80%, about 30% to about 90%, about 30% to about 95%, about 40% to about 50%, about 40% to about 60%, about 40% to about 70%, about 40% to about 80%, about 40% to about 90%, about 40% to about 95%, about 50% to about 60%, about 50% to about 70%, about 50% to about 80%, about 50% to about 90%, about 50% to about 95%, about 60% to about 70%, about 60% to about 80%, about 60% to about 90%, about 60% to about 95%, about 70% to about 80%, about 70% to about 90%, about 70% to about 95%, about 80% to about 90%, about 80% to about 95%, 80% to about 95% or about 90% to about 95%.

In one embodiment, an effective amount of a liquid composition disclosed herein is a liquid composition (L) to area size ($m^2$) ratio of, e.g., about 1:1 to about 1:5,000,000. An area size is a surface area that a liquid composition disclosed herein is applied to achieve the desired effect of a method or use disclosed herein. An area includes without limitation, an area containing the one or more plants, one or more locations or one or more pipes in a pipeline network of the irrigation system to which a liquid composition disclosed herein is applied. The liquid composition to area size ratios are typically amounts that are an effective amount for the disclosed methods and uses of controlling a causal agent of a plant disease and for the disclosed methods and uses of increasing plant growth and/or crop production and uses of maintaining or improving the efficiency of an irrigation system.

In aspects of this embodiments, an effective amount of a liquid composition disclosed herein is a liquid composition (L) to area size ($m^2$) ratio of, e.g., about 1:10, about 1:25, about 1:50, about 1:75, about 1:100, about 1:125, about 1:150, about 1:175, about 1:200, about 1:225, about 1:250, about 1:275, about 1:300, about 1:325, about 1:350, about 1:375, about 1:400, about 1:425, about 1:450, about 1:475, about 1:500, about 1:525, about 1:550, about 1:575, about 1:600, about 1:700, about 1:800, about 1:900, about 1:1000, about 1:2000, about 1:3000, about 1:4000, about 1:5000, about 1:6000, about 1:7000, about 1:8000, about 1:9000, about 1:10000, about 1:20000, about 1:30000, about 1:40000, about 1:50000, about 1:60000, about 1:70000, about 1:80000, about 1:90000 or about 1:100000. In other aspects of this embodiment, an effective amount of a liquid composition disclosed herein is a liquid composition (L) to area size ($m^2$) ratio of, e.g., at least 1:10, at least 1:25, at least 1:50, at least 1:75, at least 1:100, at least 1:125, at least 1:150, at least 1:175, at least 1:200, at least 1:225, at least 1:250, at least 1:275, at least 1:300, at least 1:325, at least 1:350, at least 1:375, at least 1:400, at least 1:425, at least 1:450, at least 1:475, at least 1:500, at least 1:525, at least 1:550, at least 1:575, at least 1:600, at least 1:700, at least 1:800, at least 1:900, at least 1:1000, at least 1:2000, at least 1:3000, at least 1:4000, at least 1:5000, at least 1:6000, at least 1:7000, at least 1:8000, at least 1:9000, at least 1:10000, at least 1:20000, at least 1:30000, at least 1:40000, at least 1:50000, at least 1:60000, at least 1:70000, at least 1:80000, at least 1:90000 or at least 1:100000. In yet other aspects of this embodiment, an effective amount of a liquid composition disclosed herein is a liquid composition (L) to area size ($m^2$) ratio of, e.g., at most 1:10, at most 1:25, at most 1:50, at most 1:75, at most 1:100, at most 1:125, at most 1:150, at most 1:175, at most 1:200, at most 1:225, at most 1:250, at most 1:275, at most 1:300, at most 1:325, at most 1:350, at most 1:375, at most 1:400, at most 1:425, at most 1:450, at most 1:475, at most 1:500, at most 1:525, at most 1:550, at most 1:575, at most 1:600, at most 1:700, at most 1:800, at most 1:900, at most 1:1000, at most 1:2000, at most 1:3000, at most 1:4000, at most 1:5000, at most 1:6000, at most 1:7000, at most 1:8000, at most 1:9000, at most 1:10000, at most 1:20000, at most 1:30000, at most 1:40000, at most 1:50000, at most 1:60000, at most 1:70000, at most 1:80000, at most 1:90000 or at most 1:100000.

In other aspects of this embodiment, an effective amount of a liquid composition disclosed herein is a liquid composition (L) to area size ($m^2$) ratio of, e.g., about 1:1 to about 1:10, about 1:1 to about 1:25, about 1:1 to about 1:50, about 1:1 to about 1:75, about 1:1 to about 1:100, about 1:2 to about 1:10, about 1:2 to about 1:25, about 1:2 to about 1:50, about 1:2 to about 1:75, about 1:2 to about 1:100, about 1:10 to about 1:25, about 1:10 to about 1:50, about 1:10 to about 1:75, about 1:10 to about 1:100, about 1:10 to about 1:125, about 1:10 to about 1:150, about 1:10 to about 1:175, about 1:10 to about 1:200, about 1:10 to about 1:225, about 1:10 to about 1:250, about 1:50 to about 1:100, about 1:50 to about 1:200, about 1:50 to about 1:300, about 1:50 to about 1:400, about 1:50 to about 1:500, about 1:50 to about 1:600, about 1:50 to about 1:700, about 1:50 to about 1:800, about 1:50 to about 1:900, about 1:50 to about 1:1000, about 1:100 to about 1:200, about 1:100 to about 1:300, about 1:100 to about 1:400, about 1:100 to about 1:500, about 1:100 to about 1:600, about 1:100 to about 1:700, about 1:100 to about 1:800, about 1:100 to about 1:900, about 1:100 to about 1:1000, about 1:500 to about 1:1000, about 1:500 to about 1:2000, about 1:500 to about 1:3000, about 1:500 to about 1:4000, about 1:500 to about 1:5000, about 1:500 to about 1:6000, about 1:500 to about 1:7000, about 1:500 to about 1:8000, about 1:500 to about 1:9000, about 1:500 to about 1:10000, about 1:1000 to about 1:2000, about 1:1000 to about 1:3000, about 1:1000 to about 1:4000, about 1:1000 to about 1:5000, about 1:1000 to about 1:6000, about 1:1000 to about 1:7000, about 1:1000 to about 1:8000, about 1:1000 to about 1:9000, about 1:1000 to about 1:10000, about 1:5000 to about 1:10000, about 1:5000 to about 1:20000, about 1:5000 to about 1:30000, about 1:5000 to about 1:40000, about 1:5000 to about 1:50000, about 1:5000 to about 1:60000, about 1:5000 to about 1:70000, about 1:5000 to about 1:80000, about 1:5000 to about 1:90000, about 1:5000 to about 1:100000, about 1:10000 to about 1:20000, about 1:10000 to about 1:30000, about 1:10000 to about 1:40000, about 1:10000 to about 1:50000, about 1:10000 to about 1:60000, about 1:10000 to about 1:70000, about 1:10000 to about 1:80000, about 1:10000 to about 1:90000, or about 1:10000 to about 1:100000.

In aspects of this embodiment, an effective amount of a liquid composition disclosed herein has a final concentration by weight of, e.g., about 0.0001%, about 0.0002%, about 0.0003%, about 0.0004%, about 0.0005%, about 0.0006%, about 0.0007%, about 0.0008%, about 0.0009%, about 0.001%, about 0.002%, about 0.003%, about 0.004%, about 0.005%, about 0.006%, about 0.007%, about 0.008%, about 0.009%, about 0.01%, about 0.02%, about 0.03%, about 0.04%, about 0.05%, about 0.06%, about 0.07%, about 0.08%, about 0.09%, about 0.1%, about 0.2%, about 0.3%, about 0.4%, about 0.5%, about 0.6%, about 0.7%, about 0.8%, about 0.9%, about 1%, about 2%, about 3%, about 4%, about 5%, about 6%, about 7%, about 8%, about 9% or about 10%. In other aspects of this embodiment, an effective amount of a liquid composition disclosed herein has a final concentration by weight of, e.g., at least 0.0001%, at least 0.0002%, at least 0.0003%, at least 0.0004%, at least 0.0005%, at least 0.0006%, at least 0.0007%, at least 0.0008%, at least 0.0009%, at least 0.001%, at least 0.002%, at least 0.003%, at least 0.004%, at least 0.005%, at least 0.006%, at least 0.007%, at least 0.008%, at least 0.009%, at least 0.01%, at least 0.02%, at least 0.03%, at least 0.04%, at least 0.05%, at least 0.06%, at least 0.07%, at least 0.08%, at least 0.09%, at least 0.1%, at least 0.2%, at least 0.3%, at least 0.4%, at least 0.5%, at least 0.6%, at least 0.7%, at least 0.8%, at least 0.9%, at least 1%, at least 2%, at least 3%, at least 4%, at least 5%, at least 6%, at least 7%, at least 8%, at least 9% or at least 10%. In yet other aspects of this embodiment, an effective amount of a liquid composition disclosed herein has a final concentration by weight of, e.g., at most 0.0001%, at most 0.0002%, at most 0.0003%, at most 0.0004%, at most 0.0005%, at most 0.0006%, at most 0.0007%, at most 0.0008%, at most 0.0009%, at most 0.001%, at most 0.002%, at most 0.003%, at most 0.004%, at most 0.005%, at most 0.006%, at most 0.007%, at most 0.008%, at most 0.009%, at most 0.01%, at most 0.02%, at most 0.03%, at most 0.04%, at most 0.05%, at most 0.06%, at most 0.07%, at most 0.08%, at most 0.09%, at most 0.1%, at most 0.2%, at most 0.3%, at most 0.4%, at most 0.5%, at most 0.6%, at most 0.7%, at most 0.8%, at most 0.9%, at most 1%, at most 2%, at most 3%, at most 4%, at most 5%, at most 6%, at most 7%, at most 8%, at most 9% or at most 10%. In still other aspects of this embodiment, an effective amount of a liquid composition disclosed herein has a final concentration by weight of, e.g., about 0.0001% to about 0.0005%, about 0.0001% to about 0.001%, about 0.0001% to about 0.005%, about 0.0001% to about 0.01%, about 0.0001% to about 0.05%, about 0.0001% to about 0.1%, about 0.0001% to about 0.5%, about 0.0001% to about 1%, about 0.0001% to about 5%, about 0.0001% to about 10%, about 0.0005% to about 0.001%, about 0.0005% to about 0.005%, about 0.0005% to about 0.01%, about 0.0005% to about 0.05%, about 0.0005% to about 0.1%, about 0.0005% to about 0.5%, about 0.0005% to about 1%, about 0.0005% to about 5%, about 0.0005% to about 10%, about 0.001% to about 0.005%, about 0.001% to about 0.01%, 0.001% to about 0.05%, about 0.001% to about 0.1%, 0.001% to about 0.5%, 0.001% to about 1%, 0.001% to about 5%, about 0.001% to about 10%, about 0.005% to about 0.01%, about 0.005% to about 0.05%, about 0.005% to about 0.1%, about 0.005% to about 0.5%, about 0.005% to about 1%, about 0.005% to about 5%, or about 0.005% to about 10%.

In aspects of this embodiment, an effective amount of a liquid composition disclosed herein has a final concentration by weight of, e.g., about 0.01% to about 0.05%, about 0.01% to about 0.1%, about 0.01% to about 0.25%, about 0.01% to about 0.5%, about 0.01% to about 0.75%, about 0.01% to about 1%, about 0.01% to about 1.5%, about 0.01% to about 2%, about 0.01% to about 2.5%, about 0.01% to about 3%, about 0.01% to about 3.5%, about 0.01% to about 4%, about 0.01% to about 4.5%, about 0.01% to about 5%, about 0.05% to about 0.1%, about 0.05% to about 0.25%, about 0.05% to about 0.5%, about 0.05% to about 0.75%, about 0.05% to about 1%, about 0.05% to about 1.5%, about 0.05% to about 2%, about 0.05% to about 2.5%, about 0.05% to about 3%, about 0.05% to about 3.5%, about 0.05% to about 4%, about 0.05% to about 4.5%, about 0.05% to about 5%, about 0.1% to about 0.25%, about 0.1% to about 0.5%, about 0.1% to about 0.75%, about 0.1% to about 1%, about 0.1% to about 1.5%, about 0.1% to about 2%, about 0.1% to about 2.5%, about 0.1% to about 3%, about 0.1% to about 3.5%, about 0.1% to about 4%, about 0.1% to about 4.5%, about 0.1% to about 5%, about 0.25% to about 0.5%, about 0.25% to about 0.75%, about 0.25% to about 1%, about 0.25% to about 1.5%, about 0.25% to about 2%, about 0.25% to about 2.5%, about 0.25% to about 3%, about 0.25% to about 3.5%, about 0.25% to about 4%, about 0.25% to about 4.5%, about 0.25% to about 5%, about 0.5% to about 0.75%, about 0.5% to about 1%, about 0.5% to about 1.5%, about 0.5% to about 2%, about 0.5% to about 2.5%, about 0.5% to about 3%, about 0.5% to about 3.5%, about 0.5% to about 4%, about 0.5% to about 4.5%, about 0.5% to about 5%, about 0.75% to about 1%, about 0.75% to about 1.5%, about 0.75% to about 2%, about 0.75% to about 2.5%, about 0.75% to about 3%, about 0.75% to about 3.5%, about 0.75% to about 4%, about 0.75% to about 4.5%, about 0.75% to about 5%, about 1% to about 5%, about 1% to about 10% or about 5% to about 10%.

In aspects of this embodiment, an effective amount of a liquid composition disclosed herein has a final concentration of, e.g., 0.05 ppm, 0.10 ppm, 0.15 ppm, 0.20 ppm, 0.25 ppm, 0.30 ppm, 0.35 ppm, 0.40 ppm, 0.45 ppm, 0.50 ppm, 0.55 ppm, 0.60 ppm, 0.65 ppm, 0.70 ppm, 0.75 ppm, 0.80 ppm, 0.85 ppm, 0.90 ppm, 0.95 ppm, 1 ppm, 5 ppm, 10 ppm, 15 ppm, 20 ppm, 25 ppm, 30 ppm, 35 ppm, 40 ppm, 45 ppm, 50 ppm, 55 ppm, 60 ppm, 65 ppm, 70 ppm, 75 ppm, 80 ppm, 85 ppm, 90 ppm, 95 ppm, 100 ppm, 125 ppm, 150 ppm, 175 ppm, 200 ppm, 225 ppm, 250 ppm, 275 ppm, 300 ppm, 325 ppm, 350 ppm, 375 ppm, 400 ppm, 425 ppm, 450 ppm, 475 ppm, 500 ppm, 525 ppm, 550 ppm, 575 ppm, 600 ppm, 625 ppm, 650 ppm, 675 ppm, 700 ppm, 725 ppm, 750 ppm, 775 ppm, 800 ppm, 825 ppm, 850 ppm, 875 ppm, 900 ppm, 925 ppm, 950 ppm, 975 ppm, 1,000 ppm, 1,025 ppm, 1,050 ppm, 1075 ppm, 1,100 ppm, 1,125 ppm, 1,150 ppm, 1,175 ppm, 1,200 ppm, 1,225 ppm, 1,250 ppm, 1,275 ppm, 1,300 ppm, 1,325 ppm, 1,350 ppm, 1,375 ppm, 1,400 ppm, 1,425 ppm, 1,450 ppm, 1,475 ppm, or 1,500 ppm. In other aspects of this embodiment, an effective amount of a liquid composition disclosed herein has a final concentration of, e.g., at least 0.05 ppm, at least 0.10 ppm, at least 0.20 ppm, at least 0.30 ppm, at least 0.40 ppm, at least 0.50 ppm, at least 0.60 ppm, at least 0.70 ppm, at least 0.80 ppm, at least 0.90 ppm, at least 1 ppm, at least 5 ppm, at least 10 ppm, at least 20 ppm, at least 30 ppm, at least 40 ppm, at least 50 ppm, at least 60 ppm, at least 70 ppm, at least 80 ppm, at least 90 ppm, at least 100 ppm, at least 125 ppm, at least 150 ppm, at least 175 ppm, at least 200 ppm, at least 225 ppm, at least 250 ppm, at least 275 ppm, at least 300 ppm, at least 325 ppm, at least 350 ppm, at least 375 ppm, at least 400 ppm, at least 425 ppm, at least 450 ppm, at least 475 ppm, at least 500 ppm, at least 525 ppm, at least 550 ppm, at least 575 ppm, at least 600 ppm, at least 625 ppm, at least 650 ppm, at least 675 ppm, at least 700 ppm, at least 725 ppm, at least 750 ppm, at least 775 ppm, at least 800 ppm, at least 825 ppm, at least 850 ppm, at least 875 ppm, at least 900 ppm, at least 925 ppm, at least 950 ppm, at least 975 ppm, at least 1,000 ppm, at least 1,025 ppm, at least 1,050 ppm, at least 1075 ppm, at least 1,100 ppm, at least 1,125 ppm, at least 1,150 ppm, at least 1,175 ppm, at least 1,200 ppm, at least 1,225 ppm, at least 1,250 ppm, at least 1,275 ppm, at least 1,300 ppm, at least 1,325 ppm, at least 1,350 ppm, at least 1,375 ppm, at least 1,400 ppm, at least 1,425 ppm, at least 1,450 ppm, at least 1,475 ppm, or at least 1,500 ppm. In yet other aspects of this embodiment, an effective amount of a liquid composition disclosed herein has a final concentration of, e.g., at most 0.05 ppm, at most 0.10 ppm, at most 0.20 ppm, at most 0.30 ppm, at most 0.40 ppm, at most 0.50 ppm, at most 0.60 ppm, at most 0.70 ppm, at most 0.80 ppm, at most 0.90 ppm, at most 1 ppm, at most 5 ppm, at most 10 ppm, at most 20 ppm, at most 30 ppm, at most 40 ppm, at most 50 ppm, at most 60 ppm, at most 70 ppm, at most 80 ppm, at most 90 ppm, at most 100 ppm, at most 125 ppm, at most 150 ppm, at most 175 ppm, at most 200 ppm, at most 225 ppm, at most 250 ppm, at most 275 ppm, at most 300 ppm, at most 325 ppm, at most 350 ppm, at most 375 ppm, at most 400 ppm, at most 425 ppm, at most 450 ppm, at most 475 ppm, at most 500 ppm, at most 525 ppm, at most 550 ppm, at most 575 ppm, at most 600 ppm, at most 625 ppm, at most 650 ppm, at most 675 ppm, at most 700 ppm, at most 725 ppm, at most 750 ppm, at most 775 ppm, at most 800 ppm, at most 825 ppm, at most 850 ppm, at most 875 ppm, at most 900 ppm, at most 925 ppm, at most 950 ppm, at most 975 ppm, at most 1,000 ppm, at most 1,025 ppm, at most 1,050 ppm, at most 1075 ppm, at most 1,100 ppm, at most 1,125 ppm, at most 1,150 ppm, at most 1,175 ppm, at most 1,200 ppm, at most 1,225 ppm, at most 1,250 ppm, at most 1,275 ppm, at most 1,300 ppm, at most 1,325 ppm, at most 1,350 ppm, at most 1,375 ppm, at most 1,400 ppm, at most 1,425 ppm, at most 1,450 ppm, at most 1,475 ppm, or at most 1,500 ppm.

In still other aspects of this embodiment, an effective amount of a liquid composition disclosed herein has a final concentration of, e.g., about 0.5 ppm to about 20 ppm, about 0.5 ppm to about 25 ppm, about 0.5 ppm to about 30 ppm, about 0.5 ppm to about 35 ppm, about 0.5 ppm to about 40 ppm, about 0.5 ppm to about 45 ppm, about 0.5 ppm to about 50 ppm, about 0.5 ppm to about 55 ppm, about 0.5 ppm to about 60 ppm, about 0.5 ppm to about 65 ppm, about 0.5 ppm to about 70 ppm, about 0.5 ppm to about 75 ppm, about 0.5 ppm to about 80 ppm, about 0.5 ppm to about 85 ppm, about 0.5 ppm to about 90 ppm, about 0.5 ppm to about 95 ppm, about 0.5 ppm to about 100 ppm, about 0.75 ppm to about 20 ppm, about 0.75 ppm to about 25 ppm, about 0.75 ppm to about 30 ppm, about 0.75 ppm to about 35 ppm, about 0.75 ppm to about 40 ppm, about 0.75 ppm to about 45 ppm, about 0.75 ppm to about 50 ppm, about 0.75 ppm to about 55 ppm, about 0.75 ppm to about 60 ppm, about 0.75 ppm to about 65 ppm, about 0.75 ppm to about 70 ppm, about 0.75 ppm to about 75 ppm, about 0.75 ppm to about 80 ppm, about 0.75 ppm to about 85 ppm, about 0.75 ppm to about 90 ppm, about 0.75 ppm to about 95 ppm, about 0.75 ppm to about 100 ppm, about 1 ppm to about 5 ppm, about 1 ppm to about 10 ppm, about 1 ppm to about 15 ppm, about 1 ppm to about 20 ppm, about 1 ppm to about 25 ppm, about 1 ppm to about 30 ppm, about 1 ppm to about 35 ppm, about 1 ppm to about 40 ppm, about 1 ppm to about 45 ppm, about 1 ppm to about 50 ppm, about 1 ppm to about 55 ppm, about 1 ppm to about 60 ppm, about 1 ppm to about 65 ppm, about 1 ppm to about 70 ppm, about 1 ppm to about 75 ppm, about 1 ppm to about 80 ppm, about 1 ppm to about 85 ppm, about 1 ppm to about 90 ppm, about 1 ppm to about 95 ppm, about 1 ppm to about 100 ppm, about 5 ppm to about 10 ppm, about 5 ppm to about 15 ppm, about 5 ppm to about 20 ppm, about 5 ppm to about 25 ppm, about 5 ppm to about 30 ppm, about 5 ppm to about 35 ppm, about 5 ppm to about 40 ppm, about 5 ppm to about 45 ppm, about 5 ppm to about 50 ppm, about 5 ppm to about 55 ppm, about 5 ppm to about 60 ppm, about 5 ppm to about 65 ppm, about 5 ppm to about 70 ppm, about 5 ppm to about 75 ppm, about 5 ppm to about 80 ppm, about 5 ppm to about 85 ppm, about 5 ppm to about 90 ppm, about 5 ppm to about 95 ppm, about 5 ppm to about 100 ppm, about 10 ppm to about 20 ppm, about 10 ppm to about 25 ppm, about 10 ppm to about 30 ppm, about 10 ppm to about 35 ppm, about 10 ppm to about 40 ppm, about 10 ppm to about 45 ppm, about 10 ppm to about 50 ppm, about 10 ppm to about 55 ppm, about 10 ppm to about 60 ppm, about 10 ppm to about 65 ppm, about 10 ppm to about 70 ppm, about 10 ppm to about 75 ppm, about 10 ppm to about 80 ppm, about 10 ppm to about 85 ppm, about 10 ppm to about 90 ppm, about 10 ppm to about 95 ppm, or about 10 ppm to about 100 ppm.

In other aspects of this embodiment, an effective amount of a liquid composition disclosed herein has a final concentration of, e.g., about 1 ppm to about 25 ppm, about 1 ppm to about 50 ppm, about 1 ppm to about 75 ppm, about 1 ppm to about 100 ppm, about 1 ppm to about 125 ppm, about 1 ppm to about 150 ppm, about 1 ppm to about 175 ppm, about 1 ppm to about 200 ppm, about 1 ppm to about 225 ppm, about 1 ppm to about 250 ppm, about 1 ppm to about 275 ppm, about 1 ppm to about 300 ppm, about 1 ppm to about 325 ppm, about 1 ppm to about 350 ppm, about 1 ppm to about 375 ppm, about 1 ppm to about 400 ppm, about 10 ppm to about 25 ppm, about 10 ppm to about 50 ppm, about 10 ppm to about 75 ppm, about 10 ppm to about 100 ppm, about 10 ppm to about 125 ppm, about 10 ppm to about 150 ppm, about 10 ppm to about 175 ppm, about 10 ppm to about 200 ppm, about 10 ppm to about 225 ppm, about 10 ppm to about 250 ppm, about 10 ppm to about 275 ppm, about 10 ppm to about 300 ppm, about 10 ppm to about 325 ppm, about 10 ppm to about 350 ppm, about 10 ppm to about 375 ppm, about 10 ppm to about 400 ppm, about 25 ppm to about 50 ppm, about 25 ppm to about 75 ppm, about 25 ppm to about 100 ppm, about 25 ppm to about 125 ppm, about 25 ppm to about 150 ppm, about 25 ppm to about 175 ppm, about 25 ppm to about 200 ppm, about 25 ppm to about 225 ppm, about 25 ppm to about 250 ppm, about 25 ppm to about 275 ppm, about 25 ppm to about 300 ppm, about 25 ppm to about 325 ppm, about 25 ppm to about 350 ppm, about 25 ppm to about 375 ppm, about 25 ppm to about 400 ppm, about 50 ppm to about 75 ppm, about 50 ppm to about 100 ppm, about 50 ppm to about 125 ppm, about 50 ppm to about 150 ppm, about 50 ppm to about 175 ppm, about 50 ppm to about 200 ppm, about 50 ppm to about 225 ppm, about 50 ppm to about 250 ppm, about 50 ppm to about 275 ppm, about 50 ppm to about 300 ppm, about 50 ppm to about 325 ppm, about 50 ppm to about 350 ppm, about 50 ppm to about 375 ppm, about 50 ppm to about 400 ppm, about 75 ppm to about 100 ppm, about 75 ppm to about 125 ppm, about 75 ppm to about 150 ppm, about 75 ppm to about 175 ppm, about 75 ppm to about 200 ppm, about 75 ppm to about 225 ppm, about 75 ppm to about 250 ppm, about 75 ppm to about 275 ppm, about 75 ppm to about 300 ppm, about 75 ppm to about 325 ppm, about 75 ppm to about 350 ppm, about 75 ppm to about 375 ppm, about 75 ppm to about 400 ppm, about 100 ppm to about 125 ppm, about 100 ppm to about 150 ppm, about 100 ppm to about 175 ppm, about 100 ppm to about 200 ppm, about 100 ppm to about 225 ppm, about 100 ppm to about 250 ppm, about 100 ppm to about 275 ppm, about 100 ppm to about 300 ppm, about 100 ppm to about 325 ppm, about 100 ppm to about 350 ppm, about 100 ppm to about 375 ppm, about 100 ppm to about 400 ppm, about 150 ppm to about 175 ppm, about 150 ppm to about 200 ppm, about 150 ppm to about 225 ppm, about 150 ppm to about 250 ppm, about 150 ppm to about 275 ppm, about 150 ppm to about 300 ppm, about 150 ppm to about 325 ppm, about 150 ppm to about 350 ppm, about 150 ppm to about 375 ppm, about 150 ppm to about 400 ppm, about 200 ppm to about 225 ppm, about 200 ppm to about 250 ppm, about 200 ppm to about 275 ppm, about 200 ppm to about 300 ppm, about 200 ppm to about 325 ppm, about 200 ppm to about 350 ppm, about 200 ppm to about 375 ppm, about 200 ppm to about 400 ppm, about 250 ppm to about 275 ppm, about 250 ppm to about 300 ppm, about 250 ppm to about 325 ppm, about 250 ppm to about 350 ppm, about 250 ppm to about 375 ppm, about 250 ppm to about 400 ppm, about 300 ppm to about 325 ppm, about 300 ppm to about 350 ppm, about 300 ppm to about 375 ppm, about 300 ppm to about 400 ppm, about 350 ppm to about 375 ppm, about 350 ppm to about 400 ppm, or about 375 ppm to about 400 ppm.

In other aspects of this embodiment, an effective amount of a liquid composition disclosed herein has a final concentration of, e.g., about 400 ppm to about 500 ppm, about 400 ppm to about 600 ppm, about 400 ppm to about 700 ppm, about 400 ppm to about 800 ppm, about 400 ppm to about 900 ppm, about 400 ppm to about 1,000 ppm, about 400 ppm to about 1,100 ppm, about 400 ppm to about 1,200 ppm, about 400 ppm to about 1,300 ppm, about 400 ppm to about 1,400 ppm, about 400 ppm to about 1,500 ppm, about 500 ppm to about 600 ppm, about 500 ppm to about 700 ppm, about 500 ppm to about 800 ppm, about 500 ppm to about 900 ppm, about 500 ppm to about 1,000 ppm, about 500 ppm to about 1,100 ppm, about 500 ppm to about 1,200 ppm, about 500 ppm to about 1,300 ppm, about 500 ppm to about 1,400 ppm, about 500 ppm to about 1,500 ppm, about 600 ppm to about 700 ppm, about 600 ppm to about 800 ppm, about 600 ppm to about 900 ppm, about 600 ppm to about 1,000 ppm, about 600 ppm to about 1,100 ppm, about 600 ppm to about 1,200 ppm, about 600 ppm to about 1,300 ppm, about 600 ppm to about 1,400 ppm, about 600 ppm to about 1,500 ppm, about 700 ppm to about 800 ppm, about 700 ppm to about 900 ppm, about 700 ppm to about 1,000 ppm, about 700 ppm to about 1,100 ppm, about 700 ppm to about 1,200 ppm, about 700 ppm to about 1,300 ppm, about 700 ppm to about 1,400 ppm, about 700 ppm to about 1,500 ppm, about 800 ppm to about 900 ppm, about 800 ppm to about 1,000 ppm, about 800 ppm to about 1,100 ppm, about 800 ppm to about 1,200 ppm, about 800 ppm to about 1,300 ppm, about 800 ppm to about 1,400 ppm, about 800 ppm to about 1,500 ppm, about 900 ppm to about 1,000 ppm, about 900 ppm to about 1,100 ppm, about 900 ppm to about 1,200 ppm, about 900 ppm to about 1,300 ppm, about 900 ppm to about 1,400 ppm, about 900 ppm to about 1,500 ppm, about 1,000 ppm to about 1,100 ppm, about 1,000 ppm to about 1,200 ppm, about 1,000 ppm to about 1,300 ppm, about 1,000 ppm to about 1,400 ppm, about 1,000 ppm to about 1,500 ppm, about 1,100 ppm to about 1,200 ppm, about 1,100 ppm to about 1,300 ppm, about 1,100 ppm to about 1,400 ppm, about 1,100 ppm to about 1,500 ppm, about 1,200 ppm to about 1,300 ppm, about 1,200 ppm to about 1,400 ppm, about 1,200 ppm to about 1,500 ppm, about 1,300 ppm to about 1,400 ppm, about 1,300 ppm to about 1,500 ppm, or about 1,400 ppm to about 1,500 ppm.

In one embodiment, an effective amount of a dry powdered composition disclosed herein is a dry powdered composition (g) to area size (m$^2$) ratio of, e.g., about 1:1 to about 1:10000. An area size is the surface area that a dry powdered composition disclosed herein is applied to achieve the desired effect of a method or use disclosed herein. An area includes without limitation, an area containing the one or more plants, one or more locations or one or more pipes in a pipeline network of the irrigation system to which a dry powdered composition disclosed herein is applied. The dry powdered composition to area size ratios are typically amounts that are an effective amount for the disclosed methods and uses of controlling a causal agent of a plant disease and for the disclosed methods and uses of increasing plant growth and/or crop production and uses of maintaining or improving the efficiency of an irrigation system.

In aspects of this embodiments, an effective amount of a dry powdered composition disclosed herein is a dry powdered composition (g) to area size (m$^2$) ratio of, e.g., about 1:10, about 1:25, about 1:50, about 1:75, about 1:100, about 1:125, about 1:150, about 1:175, about 1:200, about 1:225, about 1:250, about 1:275, about 1:300, about 1:325, about 1:350, about 1:375, about 1:400, about 1:425, about 1:450, about 1:475, about 1:500, about 1:525, about 1:550, about 1:575, about 1:600, about 1:700, about 1:800, about 1:900, about 1:1000, about 1:2000, about 1:3000, about 1:4000, about 1:5000, about 1:6000, about 1:7000, about 1:8000, about 1:9000, or about 1:10000. In other aspects of this embodiment, an effective amount of a dry powdered composition disclosed herein is a dry powdered composition (g) to area size (m$^2$) ratio of, e.g., at least 1:10, at least 1:25, at least 1:50, at least 1:75, at least 1:100, at least 1:125, at least 1:150, at least 1:175, at least 1:200, at least 1:225, at least 1:250, at least 1:275, at least 1:300, at least 1:325, at least 1:350, at least 1:375, at least 1:400, at least 1:425, at least 1:450, at least 1:475, at least 1:500, at least 1:525, at least 1:550, at least 1:575, at least 1:600, at least 1:700, at least 1:800, at least 1:900, at least 1:1000, at least 1:2000, at least 1:3000, at least 1:4000, at least 1:5000, at least 1:6000, at least 1:7000, at least 1:8000, at least 1:9000, or at least 1:10000. In yet other aspects of this embodiment, an effective amount of a dry powdered composition disclosed herein is a dry powdered composition (g) to area size (m$^2$) ratio of, e.g., at most 1:10, at most 1:25, at most 1:50, at most 1:75, at most 1:100, at most 1:125, at most 1:150, at most 1:175, at most 1:200, at most 1:225, at most 1:250, at most 1:275, at most 1:300, at most 1:325, at most 1:350, at most 1:375, at most 1:400, at most 1:425, at most 1:450, at most 1:475, at most 1:500, at most 1:525, at most 1:550, at most 1:575, at most 1:600, at most 1:700, at most 1:800, at most 1:900, at most 1:1000, at most 1:2000, at most 1:3000, at most 1:4000, at most 1:5000, at most 1:6000, at most 1:7000, at most 1:8000, at most 1:9000, or at most 1:10000.

In still other aspects of this embodiment, an effective amount of a dry powdered composition disclosed herein is a dry powdered composition (g) to area size (m$^2$) ratio of, e.g., about 1:1 to about 1:10, about 1:1 to about 1:25, about 1:1 to about 1:50, about 1:1 to about 1:75, about 1:1 to about 1:100, about 1:2 to about 1:10, about 1:2 to about 1:25, about 1:2 to about 1:50, about 1:2 to about 1:75, about 1:2 to about 1:100, about 1:10 to about 1:25, about 1:10 to about 1:50, about 1:10 to about 1:75, about 1:10 to about 1:100, about 1:10 to about 1:125, about 1:10 to about 1:150, about 1:10 to about 1:175, about 1:10 to about 1:200, about 1:10 to about 1:225, about 1:10 to about 1:250, about 1:50 to about 1:100, about 1:50 to about 1:200, about 1:50 to about 1:300, about 1:50 to about 1:400, about 1:50 to about 1:500, about 1:50 to about 1:600, about 1:50 to about 1:700, about 1:50 to about 1:800, about 1:50 to about 1:900, about 1:50 to about 1:1000, about 1:100 to about 1:200, about 1:100 to about 1:300, about 1:100 to about 1:400, about 1:100 to about 1:500, about 1:100 to about 1:600, about 1:100 to about 1:700, about 1:100 to about 1:800, about 1:100 to about 1:900, about 1:100 to about 1:1000, about 1:500 to about 1:1000, about 1:500 to about 1:2000, about 1:500 to about 1:3000, about 1:500 to about 1:4000, about 1:500 to about 1:5000, about 1:500 to about 1:6000, about 1:500 to about 1:7000, about 1:500 to about 1:8000, about 1:500 to about 1:9000, about 1:500 to about 1:10000, about 1:1000 to about 1:2000, about 1:1000 to about 1:3000, about 1:1000 to about 1:4000, about 1:1000 to about 1:5000, about 1:1000 to about 1:6000, about 1:1000 to about 1:7000, about 1:1000 to about 1:8000, about 1:1000 to about 1:9000, about 1:1000 to about 1:10000, about 1:2000 to about 1:3000, about 1:2000 to about 1:4000, about 1:2000 to about 1:5000, about 1:2000 to about 1:6000, about 1:2000 to about 1:7000, about 1:2000 to about 1:8000, about 1:2000 to about 1:9000, about 1:2000 to about 1:10000, about 1:3000 to about 1:4000, about 1:3000 to about 1:5000, about 1:3000 to about 1:6000, about 1:3000 to about 1:7000, about 1:3000 to about 1:8000, about 1:3000 to about 1:9000, about 1:3000 to about 1:10000, about 1:4000 to about 1:5000, about 1:4000 to about 1:6000, about 1:4000 to about 1:7000, about 1:4000 to about 1:8000, about 1:4000 to about 1:9000, about 1:4000 to about 1:10000, about 1:5000 to about 1:6000, about 1:5000 to about 1:7000, about 1:5000 to about 1:8000, about 1:5000 to about 1:9000, about 1:5000 to about 1:10000, about 1:6000 to about 1:7000, about 1:6000 to about 1:8000, about 1:6000 to about 1:9000, about 1:6000 to about 1:10000, about 1:7000 to about 1:8000, about 1:7000 to about 1:9000, about 1:7000 to about 1:10000, about 1:8000 to about 1:9000, about 1:8000 to about 1:10000 or about 1:9000 to about 1:10000.

The efficacy of a dry powdered composition or a liquid composition disclosed herein may be monitored by determining the adverse effect, mortality, reduced causal agent population, reduced entering or infestation of one or more locations, or any other assessment of damage to a causal agent population, including, without limitation, inhibition, arrestment, or retardation of causal agent growth, inhibition, arrestment, or retardation of causal agent reproduction or inhibition, arrestment, or retardation of causal agent development, all of which are encompassed by the term "controlling". Efficacy is also monitored by phytotoxicity to a plants that are infested with a causal agent population, tissue damage to the host plant infected with a causal agent population and any adverse effects that might be experienced by a human who is applying a disclosed dry powdered composition or liquid composition to an infested plant, or otherwise exposed to such compositions. Accordingly, the amount of a dry powdered composition or a liquid composition disclosed herein used in the disclosed methods or uses, meets the effective amount criteria above, and preferably has minimal or no adverse effect on ornamental and agricultural plants (such as phytotoxicity), wildlife and humans that may come into contact with such compositions.

Application of a dry powdered composition or a liquid composition disclosed herein can be achieved by any process that effectively creates microbubbles as disclosed herein and effectively exposes a causal agent sought to be controlled. For example, any method that can introduce large concentrations of a gas into a composition disclosed herein, such as a diluted dry powdered composition during application is suitable because such gas introduction enables the spontaneous formation of microbubbles. Suitable application processes include, without limitation, spraying, fogging, atomizing, vaporizing, scattering, watering, squirting, sprinkling and the like. One preferred method of application is by a manual or mechanical application by irrigation, spraying, fogging, atomizing or vaporizing. Such applications provide formation of finely divided mist with sufficient aeration during the application process to create microbubbles as disclosed herein. Microbubbles exposed to a dispersion of gas in a liquid show colloidal properties and are referred to as colloidal gas aphrons (CGA). CGA differ from ordinary gas bubbles in that they contain a distinctive shell layer containing a low concentration of a surfactant.

The microbubbles formed with a liquid composition disclosed herein appear to increase the mass transfer of oxygen in liquids. Without being bound by scientific theory, there are several possible explanations for this difference. First, the surfactants present in or a dry powdered composition disclosed herein include nonionic surfactants and/or biosurfactants which when present in an aqueous environment including a solvent disclosed herein significantly alter the properties of bubble behavior. Second, upon formation of a liquid composition disclosed herein, the liquid composition requires a much lower concentration of surfactants for microbubble formation. It has been suggested that surfactant concentrations must approach the critical micelles concentration (CMS) of a surfactant system. In a composition disclosed herein, microbubbles are formed below estimated CMCs for the surfactants used. This suggests that the microbubbles are the result of aggregates of surfactant molecules with a loose molecular packing more favorable to gas mass transfer characteristics. A surface containing fewer surfactant molecules would be more gas permeable than a well-organized micelle containing gas. Regardless of the mechanism, the tendency of a liquid composition disclosed herein to organizes into clusters, aggregates, or gas-filled bubbles provides a platform for reactions to occur by increasing localized concentrations of reactants, lowering the transition of energy required for a catalytic reaction to occur, or some other mechanism which has not yet been described.

In aspects of this embodiment, a microbubbles disclosed herein have a mean diameter of, e.g., about 5 μm, about 10 μm, about 15 μm, about 20 μm, about 25 μm, about 30 μm, about 40 μm, about 50 μm, about 75 μm, about 100 μm, about 150 μm, about 200 μm, about 250 μm, about 300 μm, about 350 μm, about 400 μm, about 450 μm, about 500 μm, about 550 μm, about 600 μm, about 650 μm, about 700 μm, about 750 μm, about 800 μm, about 850 μm, about 900 μm, about 950 μm or about 1000 μm. In other aspects of this embodiment, a microbubbles disclosed herein have a mean diameter of, e.g., at least 5 μm, at least 10 μm, at least 15 μm, at least 20 μm, at least 25 μm, at least 30 μm, at least 40 μm, at least 50 μm, at least 100 μm, at least 150 μm, at least 200 μm, at least 250 μm, at least 300 μm, at least 350 μm, at least 400 μm, at least 450 μm, at least 500 μm, at least 550 μm, at least 600 μm, at least 650 μm, at least 700 μm, at least 750 μm, at least 800 μm, at least 850 μm, at least 900 μm, at least 950 μm or at least 1000 μm. In other aspects of this embodiment, a microbubbles disclosed herein have a mean diameter of, e.g., at most 5 μm, at most 10 μm, at most 15 μm, at most 20 μm, at most 25 μm, at most 30 μm, at most 40 μm, at most 50 μm, at most 100 μm, at most 150 μm, at most 200 μm, at most 250 μm, at most 300 μm, at most 350 μm, at most 400 μm, at most 450 μm, at most 500 μm, at most 550 μm, at most 600 μm, at most 650 μm, at most 700 μm, at most 750 μm, at most 800 μm, at most 850 μm, at most 900 μm, at most 950 μm or at most 1000 μm.

In aspects of this embodiment, a microbubbles disclosed herein have a mean diameter of, e.g., about 5 μm to about 10 μm, about 5 μm to about 15 μm, about 5 μm to about 20 μm, about 5 μm to about 25 μm, about 5 μm to about 30 μm, about 5 μm to about 40 μm, about 5 μm to about 50 μm, about 5 μm to about 75 μm, about 5 μm to about 100 μm, about 10 μm to about 15 μm, about 10 μm to about 20 μm, about 10 μm to about 25 μm, about 10 μm to about 30 μm, about 10 μm to about 40 μm, about 10 μm to about 50 μm, about 10 μm to about 75 μm, about 10 μm to about 100 μm, about 15 μm to about 20 μm, about 15 μm to about 25 μm, about 15 μm to about 30 μm, about 15 μm to about 40 μm, about 15 μm to about 50 μm, about 15 μm to about 75 μm, about 15 μm to about 100 μm, about 20 μm to about 25 μm, about 20 μm to about 30 μm, about 20 μm to about 40 μm, about 20 μm to about 50 μm, about 20 μm to about 75 μm, about 20 μm to about 100 μm, about 25 μm to about 30 μm, about 25 μm to about 40 μm, about 25 μm to about 50 μm, about 25 μm to about 75 μm, about 25 μm to about 100 μm, about 30 μm to about 40 μm, about 30 μm to about 50 μm, about 30 μm to about 75 μm, about 30 μm to about 100 μm, about 40 μm to about 50 μm, about 40 μm to about 75 μm, about 40 μm to about 100 μm, about 50 μm to about 75 μm, about 50 μm to about 100 μm, about 50 μm to about 150 μm, about 50 μm to about 200 μm, about 50 μm to about 250 μm, about 50 μm to about 300 μm, about 50 μm to about 350 μm, about 50 μm to about 400 μm, about 50 μm to about 450 μm, about 50 μm to about 500 μm, about 50 μm to about 550 μm, about 50 μm to about 600 μm, about 50 μm to about 650 μm, about 50 μm to about 700 μm, about 50 μm to about 750 μm, about 50 μm to about 800 μm, about 50 μm to about 850 μm, about 50 μm to about 900 μm, about 50 μm to about 950 μm, about 50 μm to about 1000 μm, about 100 μm to about 150 μm, about 100 μm to about 200 μm, about 100 μm to about 250 μm, about 100 μm to about 300 μm, about 100 μm to about 350 μm, about 100 μm to about 400 μm, about 100 μm to about 450 μm, about 100 μm to about 500 μm, about 100 μm to about 550 μm, about 100 μm to about 600 μm, about 100 μm to about 650 μm, about 100 μm to about 700 μm, about 100 μm to about 750 μm, about 100 μm to about 800 μm, about 100 μm to about 850 μm, about 100 μm to about 900 μm, about 100 μm to about 950 μm, about 100 μm to about 1000 μm, about 150 μm to about 200 μm, about 150 μm to about 250 μm, about 150 μm to about 300 μm, about 150 μm to about 350 μm, about 150 μm to about 400 μm, about 150 μm to about 450 μm, about 150 μm to about 500 μm, about 150 μm to about 550 μm, about 150 μm to about 600 μm, about 150 μm to about 650 μm, about 150 μm to about 700 μm, about 150 μm to about 750 μm, about 150 μm to about 800 μm, about 150 μm to about 850 μm, about 150 μm to about 900 μm, about 150 μm to about 950 μm, about 150 μm to about 1000 μm, about 200 μm to about 250 μm, about 200 μm to about 300 μm, about 200 μm to about 350 μm, about 200 μm to about 400 μm, about 200 μm to about 450 μm, about 200 μm to about 500 μm, about 200 μm to about 550 μm, about 200 μm to about 600 μm, about 200 μm to about 650 μm, about 200 μm to about 700 μm, about 200 μm to about 750 μm, about 200 μm to about 800 μm, about 200 μm to about 850 μm, about 200 μm to about 900 μm, about 200 μm to about 950 μm, about 200 μm to about 1000 μm, about 250 μm to about 300 μm, about 250 μm to about 350 μm, about 250 μm to about 400 μm, about 250 μm to about 450 μm, about 250 μm to about 500 μm, about 250 μm to about 550 μm, about 250 μm to about 600 μm, about 250 μm to about 650 μm, about 250 μm to about 700 μm, about 250 μm to about 750 μm, about 250 μm to about 800 μm, about 250 μm to about 850 μm, about 250 μm to about 900 μm, about 250 μm to about 950 μm, about 250 μm to about 1000 μm, about 300 μm to about 350 μm, about 300 μm to about 400 μm, about 300 μm to about 450 μm, about 300 μm to about 500 μm, about 300 μm to about 550 μm, about 300 μm to about 600 μm, about 300 μm to about 650 μm, about 300 μm to about 700 μm, about 300 μm to about 750 μm, about 300 μm to about 800 μm, about 300 μm to about 850 μm, about 300 μm to about 900 μm, about 300 μm to about 950 μm, about 300 μm to about 1000 μm, about 350 μm to about 400 μm, about 350 μm to about 450 μm, about 350 μm to about 500 μm, about 350 μm to about 550 μm, about 350 μm to about 600 μm, about 350 μm to about 650 μm, about 350 μm to about 700 μm, about 350 μm to about 750 μm, about 350 μm to about 800 μm, about 350 μm to about 850 μm, about 350 μm to about 900 μm, about 350 μm to about 950 μm, about 350 μm to about 1000 μm, about 400 μm to about 450 μm, about 400 μm to about 500 μm, about 400 μm to about 550 μm, about 400 μm to about 600 μm, about 400 μm to about 650 μm, about 400 μm to about 700 μm, about 400 μm to about 750 μm, about 400 μm to about 800 μm, about 400 μm to about 850 μm, about 400 μm to about 900 μm, about 400 μm to about 950 μm, about 400 μm to about 1000 μm, about 450 μm to about 500 μm, about 450 μm to about 550 μm, about 450 μm to about 600 μm, about 450 μm to about 650 μm, about 450 μm to about 700 μm, about 450 μm to about 750 μm, about 450 μm to about 800 μm, about 450 μm to about 850 μm, about 450 μm to about 900 μm, about 450 μm to about 950 μm, about 450 μm to about 1000 μm, about 500 μm to about 550 μm, about 500 μm to about 600 μm, about 500 μm to about 650 μm, about 500 μm to about 700 μm, about 500 μm to about 750 μm, about 500 μm to about 800 μm, about 500 μm to about 850 μm, about 500 μm to about 900 μm, about 500 μm to about 950 μm, about 500 μm to about 1000 μm, about 550 μm to about 600 μm, about 550 μm to about 650 μm, about 550 μm to about 700 μm, about 550 μm to about 750 μm, about 550 μm to about 800 μm, about 550 μm to about 850 μm, about 550 μm to about 900 μm, about 550 μm to about 950 μm, about 550 μm to about 1000 μm, about 600 μm to about 650 μm, about 600 μm to about 700 μm, about 600 μm to about 750 μm, about 600 μm to about 800 μm, about 600 μm to about 850 μm, about 600 μm to about 900 μm, about 600 μm to about 950 μm, about 600 μm to about 1000 μm, about 650 μm to about 700 μm, about 650 μm to about 750 μm, about 650 μm to about 800 μm, about 650 μm to about 850 μm, about 650 μm to about 900 μm, about 650 μm to about 950 μm, about 650 μm to about 1000 μm, about 700 μm to about 750 μm, about 700 μm to about 800 μm, about 700 μm to about 850 μm, about 700 μm to about 900 μm, about 700 μm to about 950 μm, about 700 μm to about 1000 μm, about 750 μm to about 800 μm, about 750 μm to about 850 μm, about 750 μm to about 900 μm, about 750 μm to about 950 μm, about 750 μm to about 1000 μm, about 800 μm to about 850 μm, about 800 μm to about 900 μm, about 800 μm to about 950 μm, about 800 μm to about 1000 μm, about 850 μm to about 900 μm, about 850 μm to about 950 μm, about 850 μm to about 1000 μm, about 900 μm to about 950 μm, about 900 μm to about 1000 μm or about 950 μm to about 1000 μm.

Aspects of the present specification disclose, in part, a plant. A plant includes, by way of example, a plant or group of plants or a part of a plant. As used herein, the term "plant" refers to any living organism belonging to the Kingdom Plantae that form the clade Viridiplantae. Non-limiting examples the flowering plants, conifers and other gymnosperms, ferns, clubmosses, hornworts, liverworts, mosses and the green algae, but exclude the red and brown algae, the fungi, archaea, bacteria and animals. A vascular plant include the clubmosses, horsetails, ferns, gymnosperms (including conifers) and angiosperms (flowering plants). The scientific names for this group include Tracheophyta and Tracheobionta. As used herein, the term "flower" is synonymous with "bloom" or "blossom" and refers the reproductive structure found in angiosperms. As used herein, the term "crop plant" refers to a plant that produces a crop. Non-limiting examples include are plants that produce fruits, seeds, nuts, grains, oil, wood, and fibers. As used herein, the term "crop" refers to a plant product which is of economic value. Non-limiting examples include are fruits, seeds, nuts, grains, oil, wood, and fibers.

Aspects of the present specification disclose, in part, a location. A location is a physical structure or place in an environment. Non-limiting examples of a location include a residential building, a commercial building, an industrial building, a seedling box, a greenhouse, a nursery, a silo, an agricultural storage site, a water irrigation system, a particular area of land like a lawn, a garden, a farm, or an agricultural field or a particular natural body of water like a stream, river, lake, sea or ocean. As such, a dry powdered composition and liquid composition disclosed herein is advantageously employed in a wide variety of applications, including without limitation, household applications, lawn and garden applications, agriculture applications, organic farming applications, greenhouse and nursery applications, stored product applications, professional plant agent applications, foliage applications, underwater or submerged applications, soil incorporation applications, seedling box treatment applications, stalk injection and planting treatment applications.

Plant disease that can be treated by dry powdered composition, a liquid composition, a method and/or use described herein include, without limitation, an anthracnose, a blight, a canker, a club root, a damping off, a gall, a leaf blister, a leaf spot, a mildew, a mold, a mosaic virus disease, a rot, a rust, a scab, a smut and a wilt. Anthracnose, or bird's-eye spot, refers to a group of plant diseases caused by numerous species of fungi from the genera *Colletotrichum, Gloeosporium, Glomerella* and *Elsinoe* symptomatically characterized by small sunken dead spots or lesions with a raised border of various colors in leaves, stems, fruits, or flowers, and some infections form cankers on twigs and branches. Blight refers to a group of plant diseases caused by numerous species of fungi and bacteria symptomatically characterized by a rapid and severe chlorosis, yellowing, browning, spotting, withering and then death of plant tissues such as leaves, branches, twigs, or floral organs. Canker refers to a group of common and widespread plant diseases cause by numerous species of fungi and bacteria symptomatically characterized by round-to-irregular, sunken, swollen, flattened, or cracked, discolored, and dieback, dead areas on the stem (cane), twig, limb, or trunk. Club root refers to a group of plant diseases affecting members of the cabbage family that is caused by the soil-borne fungus, *Plasmodiophora brassicae* and is symptomatically characterized by misshapen and deformed (clubbed) roots which often cracking and rotting. Damping off refers to a group of plant diseases affecting seeds and new seedlings and is caused by several fungi including species of *Fusarium, Phytophthora, Pythium* and *Rhizoctonia* including *R. solani,* and is symptomatically characterized by rotting of stem and root tissues at and below the soil surface. Galls refers to a group of plant diseases caused by fungi, bacteria, viruses, and nematodes as well as certain insects symptomatically characterized by an abnormal, localized outgrowth or swelling of plant tissue. Leaf blister, also called leaf curl, refers to a group of plant diseases of many woody plants and ferns worldwide and is caused by fungi of the genus *Taphrina*, and is symptomatically characterized by distorted, curled leaves. Leaf Spots refers to a group of plant diseases caused by a vast number of fungi and bacteria symptomatically characterized by spots on the leaves of plants. Mildew refers to a group of plant diseases caused by numerous fungi symptomatically characterized by white, gray, bluish, or violet powdery growth, usually on the upper or lower surfaces of leaves. Mold refers to a group of plant diseases caused by several fungi symptomatically characterized by a powdery or woolly appearance on the surface of the infected plant part. Mosaic virus disease refers to a group of plant diseases caused by plant viruses and is symptomatically characterized by the appearance of having several nutrient deficiencies. Rot, also called decay, refers to a group of plant diseases caused by any of hundreds of species of soil-borne fungi and bacteria symptomatically characterized by plant decomposition and putrefaction. Rust refers to a group of plant diseases caused by more than 5,000 species of fungi symptomatically characterized by yellow, orange, red, rust, brown, or black powdery pustules which appears as a coating on leaves, young shoots, and fruits of thousands of economically important plants. Scab refers to a group of plant diseases caused by several fungi and bacteria symptomatically characterized by hardened, overgrown, and sometimes cracked tissue (crustaceous lesions) on fruit, tuber, leaf, or stem. Smuts refers to a group of plant diseases caused by fungi symptomatically characterized by fungal spores that accumulate in soot-like masses called sori, which are formed within blisters in seeds, leaves, stems, flower parts, and bulbs. Wilt refers to a group of plant diseases caused by numerous fungi and bacteria and is symptomatically characterized by permanent stunting, wilting, and withering, often followed by the death of all or part of the plant.

Causal agents whose population can be controlled by a dry powdered composition, a liquid composition, a method and/or use described herein include, without limitation, viruses, bacteria, fungi and nematodes. In addition, all stages of development can be controlled by a method and/or use disclosed herein include, without limitation, egg, larval, nymphal, juvenile, pupal and adult.

A dry powdered composition, a liquid composition, a method and/or use described herein will most likely not harm mammals or the environment and are non-phytotoxic and can be safely applied to economically valuable plants or crops. Furthermore, a dry powdered composition, a liquid composition, a method and/or use described herein can be used indoors and outdoors and will not soften, dissolve, or otherwise adversely affect treated surfaces. Lastly, a causal agent will not build resistance to the compositions, method and uses described herein.

A dry powdered composition and a liquid composition disclosed herein has minimal adverse effects on humans, mammals including domestic animals, plant life and the environment. In an aspect of this embodiment, a dry powdered composition and a liquid composition disclosed herein is substantially non-toxic to humans, mammals, plants and the environment. In other aspects of this embodiment, a dry powdered composition and a liquid composition disclosed herein is essentially non-toxic to humans, mammals, plants and the environment.

Aspects of the present specification disclose, in part, a liquid composition that is biodegradable. A biodegradable liquid composition disclosed herein is one that is prone to degrading, eroding, resorbing, decomposing, or breaking down to a substantial or significant degree once applied according to the methods and uses disclosed herein. In aspects of this embodiment, at least 75%, at least 80%, at least 85%, at least 90%, at least 95%, at least 99% of a liquid composition disclosed herein biodegrades in, e.g., about 1 day, about 2 days, about 3 days, about 4 days, about 5 days, about 6 days or about 7 days. In other aspects of this embodiment, at least 75%, at least 80%, at least 85%, at least 90%, at least 95%, at least 99% of a liquid composition disclosed herein biodegrades in, e.g., about 1 to about 2 days, about 1 to about 3 days, about 1 to about 4 days, about 1 to about 5 days, about 1 to about 6 days, about 1 to about 7 days, about 2 to about 3 days, about 2 to about 4 days, about 2 to about 5 days, about 2 to about 6 days, about 2 to about 7 days, about 3 to about 4 days, about 3 to about 5 days, about 3 to about 6 days, about 3 to about 7 days, about 4 to about 5 days, about 4 to about 6 days, about 4 to about 7 days, about 5 to about 6 days, about 5 to about 7 days or about 6 to about 7 days.

In aspects of this embodiment, at least 75%, at least 80%, at least 85%, at least 90%, at least 95%, at least 99% of a liquid composition disclosed herein biodegrades in, e.g., about 7 day, about 8 days, about 9 days, about 10 days, about 11 days, about 12 days, about 13 days or about 14 days. In other aspects of this embodiment, at least 75%, at least 80%, at least 85%, at least 90%, at least 95%, at least 99% of a liquid composition disclosed herein biodegrades in, e.g., about 7 to about 8 days, about 7 to about 9 days, about 7 to about 10 days, about 7 to about 11 days, about 7 to about 12 days, about 7 to about 13 days, about 7 to about 14 days, about 8 to about 9 days, about 8 to about 10 days, about 8 to about 11 days, about 8 to about 12 days, about 8 to about 13 days, about 8 to about 14 days, about 9 to about 10 days, about 9 to about 11 days, about 9 to about 12 days, about 9 to about 13 days, about 9 to about 14 days, about 9 to about 11 days, about 9 to about 12 days, about 9 to about 13 days, about 9 to about 14 days, about 10 to about 11 days, about 10 to about 12 days, about 10 to about 13 days, about 10 to about 14 days, about 11 to about 12 days, about 11 to about 13 days, about 11 to about 14 days, about 12 to about 13 days, about 12 to about 14 days or about 13 to about 14 days.

In aspects of this embodiment, at least 75%, at least 80%, at least 85%, at least 90%, at least 95%, at least 99% of a liquid composition disclosed herein biodegrades in, e.g., about 15 day, about 16 days, about 17 days, about 18 days, about 19 days, about 20 days or about 21 days. In other aspects of this embodiment, at least 75%, at least 80%, at least 85%, at least 90%, at least 95%, at least 99% of a liquid composition disclosed herein biodegrades in, e.g., about 15 to about 16 days, about 15 to about 17 days, about 15 to about 18 days, about 15 to about 19 days, about 15 to about 20 days, about 15 to about 21 days, about 16 to about 17 days, about 16 to about 18 days, about 16 to about 19 days, about 16 to about 20 days, about 16 to about 21 days, about 17 to about 18 days, about 17 to about 19 days, about 17 to about 20 days, about 17 to about 21 days, about 18 to about 19 days, about 18 to about 20 days, about 18 to about 21 days, about 19 to about 20 days, about 19 to about 21 days or about 20 to about 21 days.

Aspects of the present specification can also be described by the following embodiments:
1. A dry powdered composition comprising, consisting essentially of, or consisting of: about 5% to about 15% by weight of a dried treated, fermented microbial supernatant including bio-nutrients, minerals, and amino acids, and about 75% to about 95% by weight of one or more nonionic biosurfactants, wherein the composition lacks any active enzymes, activatable pro-enzymes, or any enzymatic activity.
2. The dry powdered composition according to embodiment 1, comprising, consisting essentially of, or consisting of about 7% to about 12% by weight of the dried treated, fermented microbial supernatant.
3. The dry powdered composition according to embodiment 1 or 2, comprising, consisting essentially of, or consisting of about 8% to about 10% by weight of the dried treated, fermented microbial supernatant.
4. The dry powdered composition according to any one of embodiments 1-3, wherein the treated, fermented microbial supernatant is a treated, fermented yeast supernatant, a treated, fermented bacterial supernatant, a treated, fermented mold supernatant, or any combination thereof.
5. The dry powdered composition according to embodiment 4, wherein the fermented yeast supernatant is produced from a culture containing yeast belonging to the genera *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Pediococcus, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces* or *Zygotorulaspora*.
6. The dry powdered composition according to embodiment 5, wherein the fermented yeast supernatant is produced from a culture containing *Saccharomyces cerevisiae*.
7. The dry powdered composition according to embodiment 4, wherein the fermented bacterial supernatant is from a culture containing bacteria belonging to the genera *Acetobacter, Arthrobacter, Aerococcus, Bacillus, Bifidobacterium, Brachybacterium, Brevibacterium, Barnobacterium, Carnobacterium, Corynebacterium, Enterococcus, Escherichia, Gluconacetobacter, Gluconobacter, Hafnia, Halomonas, Kocuria, Lactobacillus, Lactococcus, Leuconostoc, Macrococcus, Microbacterium, Micrococcus, Neisseria, Oenococcus, Pediococcus, Propionibacterium, Proteus, Pseudomonas, Psychrobacter, Salmonella, Sporolactobacillus, Staphylococcus, Streptococcus, Streptomyces, Tetragenococcus, Vagococcus, Weissells* or *Zymomonas*.
8. The dry powdered composition according to any one of embodiments 1-7, comprising, consisting essentially of, or consisting of about 80% to about 95% by weight of one or more nonionic biosurfactants.
9. The dry powdered composition according to embodiment 8, comprising, consisting essentially of, or consisting of about 85% to about 95% by weight of one or more nonionic biosurfactants.
10. The dry powdered composition according to embodiment 8, comprising, consisting essentially of, or consisting of about 80% to about 90% by weight of one or more nonionic biosurfactants.
11. The dry powdered composition according to any one of embodiments 1-7, comprising, consisting essentially of, or consisting of about 6% to about 14% by weight of the dried treated, fermented microbial supernatant and about 80% to about 95% by weight of one or more nonionic biosurfactants.
12. The dry powdered composition according to embodiment 11, comprising, consisting essentially of, or consisting of about 6% to about 12% by weight of the dried treated, fermented microbial supernatant and about 85% to about 95% by weight of one or more nonionic biosurfactants.
13. The dry powdered composition according to embodiment 12, comprising, consisting essentially of, or consisting of about 7% to about 11% by weight of the dried treated, fermented microbial supernatant and about 87% to about 93% by weight of one or more nonionic biosurfactants.
14. The dry powdered composition according to embodiment 13, comprising, consisting essentially of, or consisting of about 8% to about 10% by weight of the dried treated, fermented microbial supernatant and about 89% to about 91% by weight of one or more nonionic biosurfactants.
15. The dry powdered composition according to any one of embodiments 1-14, wherein the one or more nonionic biosurfactants comprising, consisting essentially of, or consisting of at least two nonionic biosurfactants.
16. The dry powdered composition according to embodiment 15, wherein the at least two nonionic biosurfactants include about 5% to about 15% of a first dried nonionic biosurfactant and about 70% to about 90% of a second dried nonionic biosurfactant or about 75% to about 85% of a second dried nonionic biosurfactant.
17. The dry powdered composition according to embodiment 15, wherein the at least two nonionic biosurfactants include about 6% to about 12% of a first dried nonionic biosurfactant and about 73% to about 89% of a second dried nonionic biosurfactant or about 78% to about 84% of a second dried nonionic biosurfactant.
18. The dry powdered composition according to embodiment 15, wherein the at least two nonionic biosurfactants include about 7% to about 11% of a first dried nonionic biosurfactant and about 74% to about 88% of a second dried nonionic biosurfactant or about 79% to about 83% of a second dried nonionic biosurfactant.
19. The dry powdered composition according to embodiment 15, wherein the at least two nonionic biosurfactants include about 8% to about 10% of a first dried nonionic biosurfactant and about 75% to about 87% of a second dried nonionic biosurfactant or about 80% to about 82% of a second dried nonionic biosurfactant.
20. The dry powdered composition according to embodiment 15, comprising, consisting essentially of, or consisting of about 5% to about 15% by weight of the dried treated, fermented microbial supernatant, about 5% to about 15% of a first dried nonionic biosurfactant and about 70% to about 90% of a second dried nonionic biosurfactant.
21. The dry powdered composition according to embodiment 15, comprising, consisting essentially of, or consisting of about 6% to about 14% by weight of the dried treated, fermented microbial supernatant, about 6% to about 14% of a first dried nonionic biosurfactant and about 72% to about 88% of a second dried nonionic biosurfactant.
22. The dry powdered composition according to embodiment 21, comprising, consisting essentially of, or consisting of about 6% to about 12% by weight of the dried treated, fermented microbial supernatant, about 6% to about 12% of a first dried nonionic biosurfactant and about 74% to about 88% of a second dried nonionic biosurfactant.
23. The dry powdered composition according to embodiment 22, comprising, consisting essentially of, or consisting of about 7% to about 11% by weight of the dried treated, fermented microbial supernatant, about 7% to about 11% of a first dried nonionic biosurfactant and about 76% to about 86% of a second dried nonionic biosurfactant.
24. The dry powdered composition according to embodiment 23, comprising, consisting essentially of, or consisting of about 8% to about 10% by weight of the dried treated, fermented microbial supernatant, about 8% to about 10% of a first dried nonionic biosurfactant and about 78% to about 84% of a second dried nonionic biosurfactant.
25. A dry powdered composition comprising, consisting essentially of, or consisting of: about 5% to about 15% by weight of a dried treated, fermented yeast supernatant including bio-nutrients, minerals, and amino acids, and about 75% to about 95% by weight of one or more nonionic biosurfactants, wherein the composition lacks any active enzymes, activatable pro-enzymes, or any enzymatic activity.
26. The dry powdered composition according to embodiment 25, comprising, consisting essentially of, or consisting of about 7% to about 12% by weight of the dried treated, fermented yeast supernatant.
27. The dry powdered composition according to embodiment 25 or 26, comprising, consisting essentially of, or consisting of about 8% to about 10% by weight of the dried treated, fermented yeast supernatant.
28. The dry powdered composition according to any one of embodiments 25-27, wherein the dried treated fermented yeast supernatant is produced from a culture containing yeast belonging to the genus *Brettanomyces, Candida, Cyberlindnera, Cystofilobasidium, Debaryomyces, Dekkera, Fusarium, Geotrichum, Issatchenkia, Kazachstania, Kloeckera, Kluyveromyces, Lecanicillium, Mucor, Neurospora, Penicillium, Pichia, Rhizopus, Rhodosporidium, Rhodotorula, Saccharomyces, Schizosaccharomyces, Thrichosporon, Torulaspora, Torulopsis, Verticillium, Yarrowia, Zygosaccharomyces,* or *Zygotorulaspora*.
29. The dry powdered composition according to embodiment 28, wherein the fermented yeast supernatant is produced from a culture containing *Saccharomyces cerevisiae*.
30. The dry powdered composition according to any one of embodiments 25-29, comprising, consisting essentially of, or consisting of about 80% to about 95% by weight of one or more nonionic biosurfactants.
31. The dry powdered composition according to embodiment 30, comprising, consisting essentially of, or consisting of about 85% to about 95% by weight of one or more nonionic biosurfactants.
32. The dry powdered composition according to embodiment 30, comprising, consisting essentially of, or consisting of about 80% to about 90% by weight of one or more nonionic biosurfactants.
33. The dry powdered composition according to any one of embodiments 25-29, comprising, consisting essentially of, or consisting of about 6% to about 14% by weight of the dried treated, fermented yeast supernatant and about 80% to about 95% by weight of one or more nonionic biosurfactants.
34. The dry powdered composition according to embodiment 33, comprising, consisting essentially of, or consisting of about 6% to about 12% by weight of the dried treated, fermented yeast supernatant and about 85% to about 95% by weight of one or more nonionic biosurfactants.
35. The dry powdered composition according to embodiment 34, comprising, consisting essentially of, or consisting of about 7% to about 11% by weight of the dried treated, fermented yeast supernatant and about 87% to about 93% by weight of one or more nonionic biosurfactants.
36. The dry powdered composition according to embodiment 35, comprising, consisting essentially of, or consisting of about 8% to about 10% by weight of the dried treated, fermented yeast supernatant and about 89% to about 91% by weight of one or more nonionic biosurfactants.

37. The dry powdered composition according to any one of embodiments 25-36, wherein the one or more nonionic biosurfactants comprising, consisting essentially of, or consisting of at least two nonionic biosurfactants.
38. The dry powdered composition according to embodiment 37, wherein the at least two nonionic biosurfactants include about 5% to about 15% of a first dried nonionic biosurfactant and about 70% to about 90% of a second dried nonionic biosurfactant or about 75% to about 85% of a second dried nonionic biosurfactant.
39. The dry powdered composition according to embodiment 37, wherein the at least two nonionic biosurfactants include about 6% to about 12% of a first dried nonionic biosurfactant and about 73% to about 89% of a second dried nonionic biosurfactant or about 78% to about 84% of a second dried nonionic biosurfactant.
40. The dry powdered composition according to embodiment 37, wherein the at least two nonionic biosurfactants include about 7% to about 11% of a first dried nonionic biosurfactant and about 74% to about 88% of a second dried nonionic biosurfactant or about 79% to about 83% of a second dried nonionic biosurfactant.
41. The dry powdered composition according to embodiment 37, wherein the at least two nonionic biosurfactants include about 8% to about 10% of a first dried nonionic biosurfactant and about 75% to about 87% of a second dried nonionic biosurfactant or about 80% to about 82% of a second dried nonionic biosurfactant.
42. The dry powdered composition according to embodiment 37, comprising, consisting essentially of, or consisting of about 5% to about 15% by weight of the dried treated, fermented yeast supernatant, about 5% to about 15% of a first dried nonionic biosurfactant and about 70% to about 90% of a second dried nonionic biosurfactant.
43. The dry powdered composition according to embodiment 42, comprising, consisting essentially of, or consisting of about 6% to about 14% by weight of the dried treated, fermented yeast supernatant, about 6% to about 14% of a first dried nonionic biosurfactant and about 72% to about 88% of a second dried nonionic biosurfactant.
44. The dry powdered composition according to embodiment 43, comprising, consisting essentially of, or consisting of about 6% to about 12% by weight of the dried treated, fermented yeast supernatant, about 6% to about 12% of a first dried nonionic biosurfactant and about 74% to about 88% of a second dried nonionic biosurfactant.
45. The dry powdered composition according to embodiment 44, comprising, consisting essentially of, or consisting of about 7% to about 11% by weight of the dried treated, fermented yeast supernatant, about 7% to about 11% of a first dried nonionic biosurfactant and about 76% to about 86% of a second dried nonionic biosurfactant.
46. The dry powdered composition according to embodiment 45, comprising, consisting essentially of, or consisting of about 8% to about 10% by weight of the dried treated, fermented yeast supernatant, about 8% to about 10% of a first dried nonionic biosurfactant and about 78% to about 84% of a second dried nonionic biosurfactant.
47. The dry powdered composition according to any one of embodiments 1-14 or 25-36, wherein the one or more nonionic biosurfactants include one or more nonionic saponins
48. The dry powdered composition according to embodiment 47, wherein the one or more nonionic saponins include one or more triterpenoid saponins, one or more steroidal saponins, or a combination thereof.
49. The dry powdered composition according to embodiment 15 or 37, wherein the at least two nonionic biosurfactants include at least two nonionic saponins.
50. The dry powdered composition according to embodiment 50, wherein the at least two nonionic saponins include one or more triterpenoid saponins, one or more steroidal saponins, or a combination thereof.
51. The dry powdered composition according to embodiment 48 or 50, wherein the one or more triterpenoid saponins comprise a tetracyclic triterpenoid saponin, a pentacyclic triterpenoid saponin, or a combination thereof.
52. The dry powdered composition according to embodiment 51, wherein the tetracyclic triterpenoid saponin includes a cucurbitane, a cycloartane, a cycloartenol, a dammarane, a euphane, a lanostane, or a tirucallane.
53. The dry powdered composition according to embodiment 51, wherein the pentacyclic triterpenoid saponin includes an enoxolone, a hederagenin, a hopane, a lupane, a maslinic acid, an oleanane, an ursane, or a taraxasterane.
54. The dry powdered composition according to embodiment 48 or 50, wherein the one or more steroidal saponins comprise a diosgenin, an eleutheroside, a ginsenoside, a sarsasapogenin, a yamogenin, or any combination thereof.
55. The dry powdered composition according to any one of embodiments 16-23 or 38-46, wherein the first dried nonionic biosurfactant includes a first dried nonionic saponin and the second dried nonionic biosurfactant includes a second dried nonionic saponin.
56. The dry powdered composition according to embodiment 55, wherein the first dried and/or second dried nonionic saponins include a triterpenoid saponin, a steroidal saponin, or a combination thereof.
57. The dry powdered composition according to embodiment 56, wherein the triterpenoid saponin comprises a tetracyclic triterpenoid saponin, a pentacyclic triterpenoid saponin, or a combination thereof.
58. The dry powdered composition according to embodiment 57, wherein the tetracyclic triterpenoid saponin includes a cucurbitane, a cycloartane, a cycloartenol, a dammarane, a euphane, a lanostane, or a tirucallane.
59. The dry powdered composition according to embodiment 57, wherein the pentacyclic triterpenoid saponin includes an enoxolone, a hederagenin, a hopane, a lupane, a maslinic acid, an oleanane, an ursane, or a taraxasterane.
60. The dry powdered composition according to embodiment 52, wherein the steroidal saponin comprises a diosgenin, an eleutheroside, a ginsenoside, a sarsasapogenin, a yamogenin, or any combination thereof.
67. A dry powdered composition comprising, consisting essentially of, or consisting of: about 5% to about 15% by weight of a dried treated, fermented yeast supernatant including bio-nutrients, minerals, and amino acids, about 5% to about 15% by weight of a first dried nonionic biosurfactant, and about 70% to about 90% by weight of a second dried nonionic biosurfactant, wherein the composition lacks any active enzymes, activatable pro-enzymes, or any enzymatic activity.
68. The dry powdered composition according to embodiment 67, comprising, consisting essentially of, or consisting of about 6% to about 12% of a first dried nonionic biosurfactant and about 73% to about 89% of a second dried nonionic biosurfactant or about 78% to about 84% of a second dried nonionic biosurfactant.
69. The dry powdered composition according to embodiment 67, comprising, consisting essentially of, or consisting of about 7% to about 11% of a first dried nonionic biosurfactant and about 74% to about 88% of a second dried nonionic biosurfactant or about 79% to about 83% of a second dried nonionic biosurfactant.
70. The dry powdered composition according to embodiment 67, comprising, consisting essentially of, or consisting of about 8% to about 10% of a first dried nonionic biosurfactant and about 75% to about 87% of a second dried nonionic biosurfactant or about 80% to about 82% of a second dried nonionic biosurfactant.
71. The dry powdered composition according to embodiment 67, comprising, consisting essentially of, or consisting of about 6% to about 14% by weight of the dried treated, fermented yeast supernatant, about 6% to about 14% of a first dried nonionic biosurfactant and about 72% to about 88% of a second dried nonionic biosurfactant.
72. The dry powdered composition according to embodiment 71, comprising, consisting essentially of, or consisting of about 6% to about 12% by weight of the dried treated, fermented yeast supernatant, about 6% to about 12% of a first dried nonionic biosurfactant and about 74% to about 88% of a second dried nonionic biosurfactant.
73. The dry powdered composition according to embodiment 72, comprising, consisting essentially of, or consisting of about 7% to about 11% by weight of the dried treated, fermented yeast supernatant, about 7% to about 11% of a first dried nonionic biosurfactant and about 76% to about 86% of a second dried nonionic biosurfactant.
74. The dry powdered composition according to embodiment 73, comprising, consisting essentially of, or consisting of about 8% to about 10% by weight of the dried treated, fermented yeast supernatant, about 8% to about 10% of a first dried nonionic biosurfactant and about 78% to about 84% of a second dried nonionic biosurfactant.
75. A dry powdered composition comprising, consisting essentially of, or consisting of: about 5% to about 15% by weight of a dried treated, fermented yeast supernatant including bio-nutrients, minerals, and amino acids, about 5% to about 15% by weight of a first dried nonionic saponin, and about 70% to about 90% by weight of a second dried nonionic saponin, wherein the composition lacks any active enzymes, activatable pro-enzymes, or any enzymatic activity.
76. The dry powdered composition according to embodiment 67, comprising, consisting essentially of, or consisting of about 6% to about 12% of a first dried nonionic saponin and about 73% to about 89% of a second dried nonionic biosurfactant or about 78% to about 84% of a second dried nonionic saponin.
77. The dry powdered composition according to embodiment 67, comprising, consisting essentially of, or consisting of about 7% to about 11% of a first dried nonionic saponin and about 74% to about 88% of a second dried nonionic biosurfactant or about 79% to about 83% of a second dried nonionic saponin.
78. The dry powdered composition according to embodiment 67, comprising, consisting essentially of, or consisting of about 8% to about 10% of a first dried nonionic saponin and about 75% to about 87% of a second dried nonionic biosurfactant or about 80% to about 82% of a second dried nonionic saponin.
79. The dry powdered composition according to embodiment 67, comprising, consisting essentially of, or consisting of about 6% to about 14% by weight of the dried treated, fermented yeast supernatant, about 6% to about 14% of a first dried nonionic saponin and about 72% to about 88% of a second dried nonionic saponin.
80. The dry powdered composition according to embodiment 71, comprising, consisting essentially of, or consisting of about 6% to about 12% by weight of the dried treated, fermented yeast supernatant, about 6% to about 12% of a first dried nonionic saponin and about 74% to about 88% of a second dried nonionic saponin.
81. The dry powdered composition according to embodiment 72, comprising, consisting essentially of, or consisting of about 7% to about 11% by weight of the dried treated, fermented yeast supernatant, about 7% to about 11% of a first dried nonionic saponin and about 76% to about 86% of a second dried nonionic saponin.
82. The dry powdered composition according to embodiment 73, comprising, consisting essentially of, or consisting of about 8% to about 10% by weight of the dried treated, fermented yeast supernatant, about 8% to about 10% of a first dried nonionic saponin and about 78% to about 84% of a second dried nonionic saponin.
83. The dry powdered composition according to any one of embodiments 75-82, wherein the first dried and/or second dried nonionic saponins include a triterpenoid saponin, a steroidal saponin, or a combination thereof.
84. The dry powdered composition according to embodiment 83, wherein the triterpenoid saponin comprises a tetracyclic triterpenoid saponin, a pentacyclic triterpenoid saponin, or a combination thereof.
85. The dry powdered composition according to embodiment 84, wherein the tetracyclic triterpenoid saponin includes a cucurbitane, a cycloartane, a cycloartenol, a dammarane, a euphane, a lanostane, or a tirucallane.
86. The dry powdered composition according to embodiment 84, wherein the pentacyclic triterpenoid saponin includes an enoxolone, a hederagenin, a hopane, a lupane, a maslinic acid, an oleanane, an ursane, or a taraxasterane.
87. The dry powdered composition according to embodiment 83, wherein the steroidal saponin comprises a diosgenin, an eleutheroside, a ginsenoside, a sarsasapogenin, a yamogenin, or any combination thereof.
88. The dry powdered composition according to any one of embodiments 1-87 further comprising, consisting essentially of, or consisting of citric acid.
89. The dry powdered composition according to embodiment 88, comprising, consisting essentially of, or consisting of about 0.5% to about 1.5% by weight citric acid.
90. The dry powdered composition according to any one of embodiments 1-89, further comprising, consisting essentially of, or consisting of at least one preservative.
91. The dry powdered composition according to embodiment 90, comprising, consisting essentially of, or consisting of about 0.01% to about 2% by weight of the at least one preservative.
92. The dry powdered composition according to embodiment 90 or 91, wherein the at least one preservative includes sodium benzoate, imidazolidinyl urea, diazolidinyl urea, weight calcium chloride, citric acid, ascorbic acid or tartaric acid, or any combination thereof.
93. The dry powdered composition according to any one of embodiments 1-92, further comprising, consisting essentially of, or consisting of an antimicrobial.
94. A kit comprising, consisting essentially of, or consisting of a dry powdered composition as defined in any one of embodiments 1-93.
95. The kit according to embodiment 94, further comprising, consisting essentially of, or consisting of one or more solvents.
96. The kit according to embodiment 94 or 95, further comprising, consisting essentially of, or consisting of one or more diluents, one or more thickening agents, one or more dispersing agents, one or more binding agents, one or more foaming agents, one or more stabilizing agents, one or more film forming agents, and/or one or more preservatives.

97. The kit according to any one of embodiments 94-96, further comprising, consisting essentially of, or consisting of one or more delivery or application systems, and/or instructions, and/or an enclosed carrier.

98. A method of controlling a causal agent of a plant disease, the method comprising, consisting essentially of, or consisting of: dissolving a dry powdered composition as defined in any one of embodiments 1-97 with a solvent, thereby forming a liquid composition; and applying an effective amount of the liquid composition to one or more plants infested with a causal agent and/or applying an effective amount of the liquid composition to one or more locations in a manner where the causal agent will be exposed to the liquid composition, wherein application of the liquid composition results in an adverse effect on the causal agent sought to be controlled.

99. A method of increasing plant growth and/or crop production, the method comprising, consisting essentially of, or consisting of: dissolving a dry powdered composition as defined in any one of embodiments 1-97 with a solvent, thereby forming a liquid composition; and applying an effective amount of the liquid composition to one or more plants and/or applying an effective amount of the liquid composition to one or more locations where the liquid composition will be exposed to the one or more plants, wherein application of the liquid composition results an increase in plant growth and/or an increase in crop production.

100. A method of maintaining or improving the efficiency of an irrigation system, the method comprising, consisting essentially of, or consisting of: dissolving a dry powdered composition as defined in any one of embodiments 1-97 with a solvent, thereby forming a liquid composition; and applying an effective amount of the liquid composition to one or more pipes in a pipeline network of the irrigation system, wherein application of the liquid composition dissolves, disperses or otherwise removes biofilm blocking one or more pipes in the pipeline networks of an irrigation system.

101. Use of a dry powdered composition as defined in any one of embodiments 1-97 for controlling a plant disease, wherein the dry powdered composition is dissolved with a solvent thereby forming a liquid composition and an effective amount of the liquid composition is applied to one or more plants infested with a causal agent and/or applying an effective amount of the liquid composition to one or more locations in a manner where the causal agent will be exposed to the liquid composition, wherein application of the liquid composition results in an adverse effect on the causal agent sought to be controlled.

102. Use of a dry powdered composition as defined in any one of embodiments 1-97 for increasing plant growth and/or crop production, wherein the dry powdered composition is dissolved with a solvent, thereby forming a liquid composition and an effective amount of the liquid composition is applied to one or more plants and/or applying an effective amount of the liquid composition to one or more locations where the liquid composition will be exposed to the one or more plants, wherein application of the liquid composition results an increase in plant growth and/or an increase in crop production.

103. Use of a dry powdered composition as defined in any one of embodiments 1-97 for maintaining or improving the efficiency of an irrigation system, wherein the dry powdered composition is dissolved with a solvent, thereby forming a liquid composition and an effective amount of the liquid composition is applied to one or more pipes in a pipeline network of the irrigation system, wherein application of the liquid composition dissolves, disperses or otherwise removes biofilm blocking one or more pipes in the pipeline networks of an irrigation system.

104. A dry powdered composition as defined in any one of embodiments 1-97 for use in controlling a plant disease, wherein the dry powdered composition is dissolved with a solvent, thereby forming a liquid composition and an effective amount of the liquid composition is applied to one or more plants infested with a causal agent and/or applying an effective amount of the liquid composition to one or more locations in a manner where the causal agent will be exposed to the liquid composition, wherein application of the liquid composition results in an adverse effect on the causal agent sought to be controlled.

105. A dry powdered composition as defined in any one of embodiments 1-97 for use in increasing plant growth and/or crop production, wherein the dry powdered composition is dissolved with a solvent, thereby forming a liquid composition and an effective amount of the liquid composition is applied to one or more plants and/or applying an effective amount of the liquid composition to one or more locations where the liquid composition will be exposed to the one or more plants, wherein application of the liquid composition results an increase in plant growth and/or an increase in crop production.

106. A dry powdered composition as defined in any one of embodiments 1-97 for use in maintaining or improving the efficiency of an irrigation system, wherein the dry powdered composition is dissolved with a solvent, thereby forming a liquid composition and an effective amount of the liquid composition is applied to one or more pipes in a pipeline network of the irrigation system, wherein application of the liquid composition dissolves, disperses or otherwise removes biofilm blocking one or more pipes in the pipeline networks of an irrigation system.

107. The method of embodiments 98-100 or the use of embodiments 101-106, wherein a ratio of about 1:1 to about 1:500 of the dry powdered composition to the solvent is used to dissolve the dry powdered composition to form the liquid composition.

108. The method of embodiments 98-100 or 107 or the use of embodiments 101-107, wherein a ratio of about 1:10 to about 1:50 of the dry powdered composition to the solvent is used to dissolve the dry powdered composition to form the liquid composition.

109. The method of embodiments 98-100, 107 or 108 or the use of embodiments 101-108, wherein a ratio of about 1:25 to about 1:35 of the dry powdered composition to the solvent is used to dissolve the dry powdered composition to form the liquid composition.

110. The method of embodiments 98-100 or 107-109 or the use of embodiments 101-109, wherein the effective amount of the liquid composition has a final concentration of about 0.0001% to about 10%.

111. The method of embodiments 98-100 or 107-110 or the use of embodiments 101-110, wherein the effective amount of the liquid composition has a final concentration of about 0.01% to about 1%.

112. The method of embodiments 98-100 or 107-111 or the use of embodiments 101-111, wherein the effective amount of the liquid composition has a final concentration of about 0.1% to about 0.5%.
113. The method of embodiments 98-100 or 107-109 or the use of embodiments 101-109, wherein the effective amount of the liquid composition has a final concentration of about 0.05 ppm to about 1,500 ppm.
114. The method of embodiments 98-100, 107-109 or 113 or the use of embodiments 101-109 or 113, wherein the effective amount of the liquid composition has a final concentration of about 0.5 ppm to about 500 ppm.
115. The method of embodiments 98-100, 107-109, 113 or 114 or the use of embodiments 101-109, 113 or 114, wherein the effective amount of the liquid composition has a final concentration of about 0.5 ppm to about 50 ppm.
116. The method of embodiments 98-100, 107-109, or 113-115 or the use of embodiments 101-109 or 113-115, wherein the effective amount of the liquid composition has a final concentration of about 1 ppm to about 10 ppm.

EXAMPLES

The following non-limiting examples are provided for illustrative purposes only in order to facilitate a more complete understanding of representative embodiments now contemplated. These examples should not be construed to limit any of the embodiments described in the present specification, including those pertaining to the compositions, or methods or uses disclosed herein.

Example 1

Preparation of Dry Powdered Composition

This example shows exemplary formulations of dry powdered compositions disclosed herein.

To manufacture an exemplary batch size of 1000 kg of a dry powdered composition, a powder blender such as a rotor stator or rotary drum mixer is pre-treated by spraying internal surfaces with a 1% bleach solution, incubating for 10 minutes and then wiping surfaces dry. Next, 60 kg to 200 kg of a dried biosurfactant comprising saponins extracted from *Quillaja saponaria* (final concentration 6% to 20%) 60 kg to 150 kg of a dried treated fermented microbial supernatant (final concentration 6% to 15%), and 5 kg to 15 kg of Citric Acid (final concentration 0.5% to 1.5%) were added to the powder blender (see Tables 1-9) and the components blended to achieve a uniform color and appearance of the mixture. To this mixture was added 675 kg to 875 kg of a dried biosurfactant comprising saponins extracted from *Yucca schidigera* (final concentration 67.5% to 87.5%)(see Tables 1-9), and blending continued until a uniform color and appearance of the mixture was achieved. Dry powdered compositions produced according to this process were found to be nonirritating to skin tissue, nontoxic and could be stored in a cool location over periods of months without any discernible loss in effectiveness or deterioration.

As a specific example of the above, formulation PF3 was prepared by adding 90.0 kg of *Quillaja* Dry 100 (a dried biosurfactant comprising saponins extracted from *Quillaja saponaria*) (final concentration 9%), 92.0 kg of TASTONE® 154 (a dried treated fermented microbial supernatant) (final concentration 9.2%), and 10.0 kg of Citric Acid (final concentration 1%) were added to the powder blender and the components blended to achieve a uniform color and appearance of the mixture. To this mixture was added 808.0 kg of *Yucca* SD Powder (a dried biosurfactant comprising saponins extracted from *Yucca schidigera*) (final concentration 80.8%), and blending continued until a uniform color and appearance of the mixture was achieved. Dry powdered compositions of formulation PF3 produced according to this process were found to be nonirritating to skin tissue, nontoxic and could be stored in a cool location over periods of months without any discernible loss in effectiveness or deterioration.

TABLE 1

Dry Powdered Composition Formulations

| Component | PF1 | PF2 | PF3 | PF4 | PF5 | PF6 |
|---|---|---|---|---|---|---|
| Dried Fermented Supernatant[1] | 6-9% | 7-10% | 8-11% | 9-12% | 10-13% | 11-14% |
| Dried Biosurfactant[2] | 6-9% | 7-10% | 8-11% | 9-12% | 10-13% | 11-14% |
| Dried Biosurfactant[3] | 80.5-87.5% | 78.5-85.5% | 76.5-83.5% | 74.5-81.5% | 72.5-79.5% | 70.5-77.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE ® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 2

Dry Powdered Composition Formulations

| Component | PF7 | PF8 | PF9 | PF10 | PF11 | PF12 |
|---|---|---|---|---|---|---|
| Dried Fermented Supernatant[1] | 6-9% | 6-9% | 6-9% | 6-9% | 6-9% | 6-9% |
| Dried Biosurfactant[2] | 7-10% | 8-11% | 9-12% | 10-13% | 11-14% | 12-15% |
| Dried Biosurfactant[3] | 79.5-86.5% | 78.5-85.5% | 77.5-84.5% | 76.5-83.5% | 75.5-82.5% | 74.5-81.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE ® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 3

Dry Powdered Composition Formulations

| Component | PF13 | PF14 | PF15 | PF16 | PF17 | PF18 |
|---|---|---|---|---|---|---|
| Dried Fermented Supernatant[1] | 7-10% | 7-10% | 7-10% | 7-10% | 7-10% | 7-10% |
| Dried Biosurfactant[2] | 6-9% | 8-11% | 9-12% | 10-13% | 11-14% | 12-15% |
| Dried Biosurfactant[3] | 79.5-86.5% | 77.5-84.5% | 76.5-83.5% | 75.5-82.5% | 74.5-81.5% | 73.5-80.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE ® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 4

Dry Powdered Composition Formulations

| Component | PF19 | PF20 | PF21 | PF22 | PF23 | PF24 |
|---|---|---|---|---|---|---|
| Dried Fermented Supernatant[1] | 8-11% | 8-11% | 8-11% | 8-11% | 8-11% | 8-11% |
| Dried Biosurfactant[2] | 6-9% | 7-10% | 9-12% | 10-13% | 11-14% | 12-15% |
| Dried Biosurfactant[3] | 78.5-85.5% | 77.5-84.5% | 75.5-82.5% | 74.5-81.5% | 73.5-80.5% | 72.5-79.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE ® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 5

Dry Powdered Composition Formulations

| Component | PF25 | PF26 | PF27 | PF28 | PF29 | PF30 |
|---|---|---|---|---|---|---|
| Dried Fermented Supernatant[1] | 9-12% | 9-12% | 9-12% | 9-12% | 9-12% | 9-12% |
| Dried Biosurfactant[2] | 6-9% | 7-10% | 8-11% | 10-13% | 11-14% | 12-15% |
| Dried Biosurfactant[3] | 79.5-84.5% | 76.5-83.5% | 75.5-82.5% | 73.5-80.5% | 72.5-79.5% | 71.5-78.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE ® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 6

Dry Powdered Composition Formulations

| Component | PF31 | PF32 | PF33 | PF34 | PF35 | PF36 |
|---|---|---|---|---|---|---|
| Dried Fermented Supernatant[1] | 10-13% | 10-13% | 10-13% | 10-13% | 10-13% | 10-13% |
| Dried Biosurfactant[2] | 6-9% | 7-10% | 8-11% | 9-12% | 11-14% | 12-15% |
| Dried Biosurfactant[3] | 76.5-83.5% | 75.5-82.5% | 74.5-81.5% | 73.5-80.5% | 71.5-78.5% | 70.5-77.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE ® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 7

Dry Powdered Composition Formulations

| Component | PF37 | PF38 | PF39 | PF40 | PF41 | PF42 |
|---|---|---|---|---|---|---|
| Dried Fermented Supernatant[1] | 11-14% | 11-14% | 11-14% | 11-14% | 11-14% | 11-14% |
| Dried Biosurfactant[2] | 6-9% | 7-10% | 8-11% | 9-12% | 10-13% | 12-15% |
| Dried Biosurfactant[3] | 75.5-82.5% | 74.5-81.5% | 73.5-80.5% | 72.5-79.5% | 71.5-78.5% | 69.5-76.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 8

Dry Powdered Composition Formulations

| Component | PF43 | PF44 | PF45 | PF46 | PF47 | PF48 |
|---|---|---|---|---|---|---|
| Dried Fermented Supernatant[1] | 12-15% | 12-15% | 12-15% | 12-15% | 12-15% | 12-15% |
| Dried Biosurfactant[2] | 6-9% | 7-10% | 8-11% | 9-12% | 10-13% | 11-14% |
| Dried Biosurfactant[3] | 74.5-81.5% | 73.5-80.5% | 72.5-79.5% | 71.5-78.5% | 70.5-77.5% | 69.5-76.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 9

Dry Powdered Composition Formulations

| Component | PF49 | PF50 | PF51 | PF52 | PF53 | PF54 |
|---|---|---|---|---|---|---|
| Dried Fermented Supernatant[1] | 12-15% | 8-11% | 8-11% | 8-11% | 8-11% | 8-11% |
| Dried Biosurfactant[2] | 12-15% | 13-16% | 14-17% | 15-18% | 16-19% | 17-20% |
| Dried Biosurfactant[3] | 68.5-75.5% | 71.5-78.5% | 70.5-77.5% | 69.5-76.5% | 68.5-75.5% | 67.5-74.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

Example 2

Preparation of Dry Powdered Composition

This example shows exemplary formulations of dry powdered compositions disclosed herein.

To manufacture an exemplary batch size of 1000 kg of a dry powdered composition, a powder blender such as a rotor stator or rotary drum mixer is pre-treated by spraying internal surfaces with a 1% bleach solution, incubating for 10 minutes and then wiping surfaces dry. Next, 60 kg to 150 kg of a dried treated fermented microbial supernatant (final concentration 6% to 15%) and 5 kg to 15 kg of Citric Acid (final concentration 0.5% to 1.5%) were added to the powder blender (see Tables 10-11) and the components blended to achieve a uniform color and appearance of the mixture. To this mixture was added 835 kg to 935 kg of a dried biosurfactant comprising saponins extracted from *Yucca schidigera* (final concentration 83.5% to 93.5%)(see Tables 10-11), and blending continued until a uniform color and appearance of the mixture was achieved. Dry powdered compositions produced according to this process were found to be nonirritating to skin tissue, nontoxic and could be stored in a cool location over periods of months without any discernible loss in effectiveness or deterioration.

As a specific example of the above, formulation PF57 was prepared by adding 92.0 kg of TASTONE® 154 (a dried treated fermented microbial supernatant) (final concentration 9.2%), and 10.0 kg of Citric Acid (final concentration 1%) were added to the powder blender and the components blended to achieve a uniform color and appearance of the mixture. To this mixture was added 907.0 kg of *Yucca* SD Powder (a dried biosurfactant comprising saponins extracted from *Yucca schidigera*) (final concentration 90.7%), and blending continued until a uniform color and appearance of the mixture was achieved. Dry powdered compositions of formulation PF57 produced according to this process were found to be nonirritating to skin tissue, nontoxic and could be stored in a cool location over periods of months without any discernible loss in effectiveness or deterioration.

TABLE 10

Dry Powdered Composition Formulations

| Component | PF55 | PF56 | PF57 | PF58 | PF59 | PF60 |
|---|---|---|---|---|---|---|
| Dried Fermented Supernatant[1] | 6-9% | 7-10% | 8-11% | 9-12% | 10-13% | 11-14% |
| Dried Biosurfactant[3] | 89.5-93.5% | 88.5-92.5% | 87.5-91.5% | 86.5-90.5% | 85.5-89.5% | 84.5-88.5% |
| Dried Citric Acid | 0.5-1.5% | 0.5-1.5% | 0.5-1.5% | 0.5-1.5% | 0.5-1.5% | 0.5-1.5% |

[1] a dried yeast supernatant (TASTONE ® 154).
[2] a dried biosurfactant comprising saponins extracted from *Quillaja saponaria* (*Quillaja* Dry 100).
[3] a dried biosurfactant comprising saponins extracted from *Yucca schidigera* (*Yucca* SD Powder).

TABLE 11

Dry Powdered Composition Formulations

| Component | PF61 |
|---|---|
| Dried Fermented Supernatant[1] | 12-15% |
| Dried Biosurfactant[2] | 83.5-87.5% |
| Dried Citric Acid | 0.5-1.5% |

[1] a dried yeast supernatant (TASTONE ® 154).
[2] a dried biosurfactant comprising saponins extracted from *Yucca schidigera* (*Yucca* SD Powder).

Example 3

Preparation of Liquid Composition

This example shows exemplary procedures to make a liquid composition disclosed herein.

To produce 1 L of an exemplary liquid composition disclosed herein, 30 g of an exemplary dry powdered composition covered under formulation PF3 as described in Example 1 or formulation PF57 as described in Example 2 is added to 1 L of water and mixed until the dry powdered composition is dissolved completely. This makes a 3% solution of a liquid composition using a dry powdered composition. The pH of the liquid composition can be checked and the pH adjusted to 2.5 to 5.0 using any suitable acid, such as, e.g., phosphoric acid.

Similar procedures are used to manufacture a liquid composition using any of the other formulations of a dry powdered composition described in Tables 1-11. In addition, the amount of dry powdered composition added to 1 L of water can also be varied. For example, 5 g to 500 g of a dry powdered composition can be added to 1 L of water to produce a 0.5% to 50% solution of a liquid composition using a dry powdered composition.

Optionally, 2% to 8% final concentration of an anionic biosurfactant can be incorporated into a liquid composition of this example. For example, STEPONOL® AM 30-KE, an ammonium lauryl sulfate, STEPONOL® EHS, a sodium 2-ethyl hexyl sulfate, or a combination thereof can be added to the liquid composition.

Example 4

Grape Study

This example shows the effects of a composition disclosed herein on grape production in a vineyard.

Grape vines grown in a vineyard were divided into four groups: The Control Group comprised vines that were drip irrigated with water lacking a liquid composition disclosed herein (control) over the course of a season. The Treatment Groups comprised vines that were drip irrigated with water including a 3% solution of a liquid composition described herein, like the ones described in Example 3, at a final concentration of 1 ppm, 2 ppm, or 4 ppm over the course of a season. Plants were assessed on a monthly basis over the study period. Plant growth and fruit production were assessed using whole plant physiology, berry chemistry and quality perception.

The results indicated that all three Treatment Group showed significant improvement relative to Control Group. For example, Treatment Groups exhibited improved whole plant physiology based on increased stem water potential, increased gas exchange, increased foliage growth and increased berry weight. In addition, analysis of berry chemistry indicated decreased titratable acidity (below 1 g/100 mL) and increased in total sugar content (24 to 26 Brix) at the end of the season relative to berries from the Control Group. Furthermore, berries from all Treatment Groups exhibited significant increases in total anthocyanins and flavonols when measured as whole berries (2.1-2.3 mg/berry anthocyanins; 0.16-0.18 mg/berry flavonols), skin dry mass (20-25 mg/g anthocyanins; 1.6-1.9 mg/g flavonols) or berry flesh mass (1.6-2.2 mg/g anthocyanins; 0.11-0.16 mg/g flavonols). Treatment Groups also exhibited significant increases in mean berry cluster weight of 0.121 to 0.176 kg ($P<0.001$) and tons/acre weight of 5.6 to 8.5 ($P<0.001$) relative to the Control Group. Root mycorrhizal colonization percentages of 16% to 27% ($P=0.003$) were also observed in the Treatment Groups. Compositional analysis of wine produced from berries obtained from the Treatment Groups also exhibited significant improvement relative to wine produced from berries obtained from the Control Group. For example, color intensities of 7.11 to 12.79 ($P<0.001$), percent polymeric anthocyanins of 21.39 to 24.64 ($P=0.002$) and measurements of color stability like 3'5'/3' anthocyanins of 12.83 to 20.77 ($P<0.001$) and percent methylated anthocyanins of 91.87 to 94.38 ($P<0.001$) were observed in the Treatment Groups. In summary treatment of a vineyard with a liquid composition disclosed herein resulted in significantly higher yields of superior quality berries.

Similarly, experiments will be conducted as described above, only treating plants with a liquid composition described herein, like the ones described in Example 3, at a final concentration of 6 ppm, 8 ppm, and 10 ppm. It is expected that treatment of a vineyard using these final concentrations of a liquid composition disclosed herein will also result in significantly higher yields of superior quality berries.

Example 5

Flower Study

This example shows the effects of a composition disclosed herein on plant growth and flower production.

Flowering plants (*Pelargonium grandiflorum*) were grown in soil housed within greenhouses. Each plant received water containing nutrients during the experiment. The plants were divided into three groups: The Control Group comprised plants that were drip irrigated with water containing nutrients but lacking a liquid composition disclosed herein. The remaining two groups were Treatment Groups with one being plants that were drip irrigated with water containing nutrients and a 3% solution of a liquid composition described herein, like the ones described in Example 3, at a final concentration of 0.5% while the other being plants that were drip irrigated with water containing nutrients and a 3% solution of a liquid composition described herein, like the ones described in Example 3, at a final concentration of 0.25%. Plants were assessed on a monthly basis for a 6-month period of time. Plant growth and flower production were assessed.

After 50 days, it was noted that plants from the Treatment Groups significantly increased in the number and development of axillary buds (about 100% increase relative to plants from the Control Group), increased color saturation, and increased mass and development of the root system (about 100% increase relative to plants from the Control Group). In was also observed that plants from the Treatment Groups exhibited an increase resistance to adverse greenhouse conditions such as temperature, lighting, water logging, dryness and increased soil iC as well as increase resistance to disease.

Similarly, experiments will be conducted as described above, only treating plants with a liquid composition described herein, like the ones described in Example 3, at a final concentration of 0.125%, 0.75%, and 1%. It is expected that treatment of flowering plants using these final concentrations of a liquid composition disclosed herein will also result in significant increase resistance to adverse greenhouse conditions such as temperature, lighting, water logging, dryness and increased soil iC as well as increase resistance to disease.

Similarly, experiments will be conducted as described above for tomato, parsley, and eggplant, only treating plants with a liquid composition described herein, like the ones described in Example 3, at a final concentration of 4 ppm, 8 ppm, 50 ppm, 100 ppm, 500 ppm and 1,000 ppm. It is expected that treatment of flowering plants using these final concentrations of a liquid composition disclosed herein will also result in significant increase resistance to adverse greenhouse conditions such as temperature, lighting, water logging, dryness and increased soil iC as well as increase resistance to disease.

Example 6

Tomato Study

This example shows the effects of a composition disclosed herein on tomato plant growth and fruit production.

Tomato seedlings were grown in greenhouses in soil composed of 40% sand and 60% organic compost. Although no fertilizer or urea was used, cow manure was applied. The tomato seedlings were divided into three groups: The Control Group comprised seedlings that were drip irrigated with water lacking a liquid composition disclosed herein (control) each day for 6 months. The other two groups were Treatment Group comprised seedlings that were drip irrigated with water containing a 3% solution of a liquid composition, like the ones described in Examples 2 and 3 to a at a final concentration of 0.25% or 0.5%. Plants were assessed on a monthly basis for a 6-month period of time. Plant growth and fruit production were assessed.

The results indicated that both Treatment Groups showed significant improvement relative to Control Group. For example, in both Treatment Group plants were stronger and more robust than the Control Group throughout the entire 6-month period. In addition, the Control Group had a 30% mortality for this study while plants from both Treatment Groups exhibited 100% survivability rate. Furthermore, plants from both Treatment Groups were still flowering and bearing fruit for 5 months while the Control Group stopped flowering and bearing fruit after 3 months. Lastly, the final yield of the crop for both Treatment Groups was over 2 times more than the Control Group yield. For example, the Control Group yielded 720 Kg of tomatoes while the plants from either Treatment Group yielded about 1,715 Kg of tomatoes. Taken together, significant benefits were observed when tomato plants were treated with a liquid composition disclosed herein using a final concentration of either 0.25% or 0.5%.

Similarly, experiments will be conducted as described above, only treating tomato plants with a liquid composition described herein, like the ones described in Example 3, at a final concentration of 0.125%, 0.75%, and 1%. It is expected that treatment of plants using these concentrations of a liquid composition disclosed herein will also result in significant increase in yields will be observed.

Similarly, experiments will be conducted as described above, only treating tomato plants with a liquid composition described herein, like the ones described in Example 3, at a final concentration of 4 ppm, 8 ppm, 50 ppm, 100 ppm, 500 ppm and 1,000 ppm. It is expected that treatment of plants using these concentrations of a liquid composition disclosed herein will also result in significant increase in yields.

Example 7

Parsley Study

This example shows the effects of a composition disclosed herein on parsley plant growth.

Parsley seedlings were grown in greenhouses in soil composed of 40% sand and 60% organic compost. Although no fertilizer or urea was used, cow manure was applied. The parsley seedlings were divided into three groups: The Control Group comprised seedlings that were drip irrigated with water lacking a liquid composition disclosed herein (control) each day for 6 months. The other two groups were Treatment Group comprised seedlings that were drip irrigated with water containing a 3% solution of a liquid composition, like the ones described in Examples 2 and 3 to a at a final concentration of 0.25% or 0.5%. Plants were assessed on a monthly basis for a 6-month period of time. Plant growth was assessed.

The results indicated that both Treatment Groups showed significant improvement relative to Control Group. For example, in both Treatment Group plants were harvested 5 times before parsley from the control Group even reached its full height indicating that parsley from the Treatment Groups were stronger and grew more robust than the Control Group. Taken together, significant benefits were observed when parsley plants were treated with a liquid composition disclosed herein using a final concentration of either 0.25% or 0.5%.

Similarly, experiments will be conducted as described above, only treating parsley plants with a liquid composition described herein, like the ones described in Example 3, at a final concentration of 0.125%, 0.75%, and 1%. It is expected that treatment of plants using these concentrations of a liquid composition disclosed herein will also result in significant increase in yields will be observed.

Similarly, experiments will be conducted as described above, only treating parsley plants with a liquid composition described herein, like the ones described in Example 3, at a final concentration of 4 ppm, 8 ppm, 50 ppm, 100 ppm, 500 ppm and 1,000 ppm. It is expected that treatment of plants using these concentrations of a liquid composition disclosed herein will also result in significant increase in yields.

Example 8

Eggplant Study

This example shows the effects of a composition disclosed herein on eggplant growth.

Eggplant seedlings were grown in greenhouses in soil composed of 40% sand and 60% organic compost. Although no fertilizer or urea was used, cow manure was applied. The eggplant seedlings were divided into three groups: The Control Group comprised seedlings that were drip irrigated with water lacking a liquid composition disclosed herein (control) each day for 6 months. The other two groups were Treatment Group comprised seedlings that were drip irrigated with water containing a 3% solution of a liquid composition, like the ones described in Examples 2 and 3 to a at a final concentration of 0.25% or 0.5%. Plants were assessed on a monthly basis for a 6-month period of time. Plant growth was assessed.

The results indicated that both Treatment Groups showed significant improvement relative to Control Group. For example, in both Treatment Group plants 28% more eggplant could be harvested relative to the Control Group. Taken together, significant benefits were observed when eggplant plants were treated with a liquid composition disclosed herein using a final concentration of either 0.25% or 0.5%.

Similarly, experiments will be conducted as described above, only treating eggplant plants with a liquid composition described herein, like the ones described in Example 3, at a final concentration of 0.125%, 0.75%, and 1%. It is expected that treatment of plants using these concentrations of a liquid composition disclosed herein will also result in significant increase in yields will be observed.

Similarly, experiments will be conducted as described above, only treating eggplant plants with a liquid composition described herein, like the ones described in Example 3, at a final concentration of 4 ppm, 8 ppm, 50 ppm, 100 ppm, 500 ppm and 1,000 ppm. It is expected that treatment of plants using these concentrations of a liquid composition disclosed herein will also result in significant increase in yields.

Example 9

Olive Orchard Study

This example shows the effects of a composition disclosed herein on olive tree growth, water usage, fruit production, and oil quality and yields.

Olive trees grown in an orchard were divided into three groups: The Control Group comprised trees that were drip irrigated with water lacking a liquid composition disclosed herein (control) over the course of two seasons. The remaining two groups were Treatment Group that comprised trees drip irrigated with a 3% solution of a liquid composition described herein, like the ones described in Example 3, at a final concentration of 1 ppm or 10 ppm over the course of two seasons. Plants were assessed on a monthly basis over the study period. Tree growth, water usage, fruit production, and oil quality will be assessed.

The results indicated that trees from both Treatment Groups showed significant improvement relative to Control Group. For example, trees from the Treatment Groups yielded about 35% to about 40% more olives compared to the Control Group. More astonishingly, fruiting occurring every year for olive trees in the Treatment Groups as compared to the Control Group which fruited every other year. Lastly, the taste of the oil, specifically the phenols, were enhanced, and therefore taste or quality was improved in the oil from the trees in the Treatment Group relative to the Control Group.

Similarly, experiments will be conducted as described above, only treating the olive trees with a liquid composition described herein, like the ones described in Example 3, at a final concentration of 2 ppm, 4 ppm, and 8 ppm. It is expected that treatment of trees using these concentrations of a liquid composition disclosed herein will also result in significant increase in yields and oil quality.

Example 10

Walnut Orchard Study

This example shows the effects of a composition disclosed herein on walnut tree growth, water usage, nut production, and oil quality and yields.

Walnut trees grown in an orchard will be divided into seven groups: The Control Group comprised trees that will be drip irrigated with water lacking a liquid composition disclosed herein (control) over the course of a season. The remaining six groups will be Treatment Groups that comprised trees that will be drip irrigated with a 3% solution of a liquid composition described herein, like the ones described in Example 3, at a final concentration of 1 ppm, 2 ppm, 4 ppm, 6 ppm, 8 ppm, or 10 ppm over the course of a season. Plants were assessed on a monthly basis over the study period. Tree growth, water usage, nut production, and oil quality will be assessed.

It is expected that significant increases in tree growth and health, walnut and oil yields, and improved walnut oil characteristics, as well as significant decreases water usage will be observed using a 3% solution of a liquid composition relative to a Control Group treated with water lacking a liquid composition disclosed herein.

Example 11

Almond Orchard Study

This example shows the effects of a composition disclosed herein on almond tree growth, water usage, nut production, and oil quality and yields.

Almond trees grown in an orchard will be divided into seven groups: The Control Group comprised trees that will be drip irrigated with water lacking a liquid composition disclosed herein (control) over the course of a season. The remaining six groups will be Treatment Groups that comprised trees that will be drip irrigated with a 3% solution of a liquid composition described herein, like the ones described in Example 3, at a final concentration of 1 ppm, 2 ppm, 4 ppm, 6 ppm, 8 ppm, or 10 ppm over the course of a season. Plants were assessed on a monthly basis over the study period. Tree growth, water usage, nut production, and oil quality will be assessed.

It is expected that significant increases in tree growth and health, almond and oil yields, and improved almond oil characteristics, as well as significant decreases water usage will be observed using a 3% solution of a liquid composition relative to a Control Group treated with water lacking a liquid composition disclosed herein.

Example 12

Tobacco Study

This example shows the effects of a composition disclosed herein on tobacco growth and fruit production.

Tobacco seedlings were grown in field. The tobacco seedlings were divided into two groups: The Control Group comprised seedlings that were drip irrigated with distilled water (control) each day for 6 months. The Treatment Group comprised seedlings that were drip irrigated with a 3% solution of a liquid composition described herein, like the ones described in Example 3, at a final concentration of 1 ppm to 10 ppm. Plants were assessed on a monthly basis for a 6-month period of time. Plant growth and fruit production were assessed.

The results indicated that Treatment Group showed significant improvement relative to Control Group. For example, tobacco crops from the Treatment Group showed about 40% to about 50% more growth compared to the Control Group. In addition, tobacco crops from the Treatment Group exhibited larger root growth and better survival rates of seedlings.

Similar test results were observed for *Cannabis*, although the study was performed in a greenhouse.

Example 13

Plant Disease Study

This example shows the effects of a composition disclosed herein on treating a plant disease caused by a causal agent disclosed herein.

Roses with leaf spot caused by a fungal infestation were treated with 0.5% solution of a liquid composition described herein, like the ones described in Example 3, using a spray bottle. After one to two weeks the fungal infestation was gone.

Olive trees with blight caused by a fungal infestation were treated with a 3% solution of a liquid composition described herein, like the ones described in Example 3, at a final concentration of 1 ppm to 10 ppm using a drip irrigation system. Plants were assessed on a weekly basis. The fungal infestation shown signs of reduction after one week of treatment and the blight was gone after two weeks.

In a different study, olive trees with blight caused by a bacterial infestation were treated with a 3% solution of a liquid composition described herein, like the ones described in Example 3, at a final concentration of 1 ppm to 10 ppm using a drip irrigation system. Plants were assessed on a weekly basis. The bacterial infestation shown signs of reduction after one week of treatment and the blight was gone after two weeks.

Example 14

Irrigation Study

This example shows the effects of a composition disclosed herein on treating an irrigation system.

Habanero chilies were grown in soil housed within greenhouses; each greenhouse contained 340 plants that were supplied with water containing nutrients from an irrigation system. Each plant received 5 L of water a day containing 5 g of nutrients during the season. The greenhouses were divided into three groups: The Control Group was a greenhouse where the irrigation system supplied the plants with water containing nutrients but lacking a liquid composition disclosed herein. The remaining two groups were Treatment Groups with one being a greenhouse where the irrigation system supplied the plants with water containing nutrients and a 3% solution of a liquid composition described herein, like the ones described in Example 3, at a final concentration of 2 ppm while the other being a greenhouse where the irrigation system supplied the plants with water containing nutrients and a 3% solution of a liquid composition herein, like the ones described in Example 3, at a final concentration of 4 ppm. Plants were assessed on a monthly basis for a 6-month period of time. Plant growth and fruit production as well as the operation of the irrigation system were assessed.

The results indicated that the Treatment Groups showed significant improvement relative to Control Group. For example, chilies produced from the Treatment Group showed about 50% to about 60% more growth compared to the Control Group. In addition, plants from the Treatment Groups produced 100% to 140% more chilies relative to the Control Group. For example, total crop yield of plants from the two Treatment Groups produced 25.1 kg to 30.4 kg of chilies whereas the Control Group produced only 12.5 kg of chilies. Furthermore, in evaluating the irrigation systems no appreciable amounts of microalgae were present in the Treatment Groups and there was no need to purge the system. On the other hand, the irrigation system from the Control Group was saturated with microalgae requiring that the system be purged with an acid solution to clean the system.

Similarly, experiments will be conducted as described above, only treating plants with a liquid composition described herein, like the ones described in Example 3, at a final concentration of 6 ppm, 8 ppm, and 10 ppm. It is expected that treatment of a vineyard using these final concentrations of a liquid composition disclosed herein will also result in significantly higher yields of superior quality fruit and an irrigation systems lacking any appreciable amounts of microalgae.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention. As such, the specific embodiments are not intended to be exhaustive or to limit the invention to the precise forms disclosed. Therefore, it should be understood that embodiments of the disclosed subject matter are in no way limited to a particular element, compound, composition, component, article, apparatus, methodology, use, protocol, step, and/or limitation described herein, unless expressly stated as such.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims.

Furthermore, those of ordinary skill in the art will recognize that certain changes, modifications, permutations, alterations, additions, subtractions and sub-combinations thereof can be made in accordance with the teachings herein without departing from the spirit of the present invention. Furthermore, it is intended that the following appended claims and claims hereafter introduced are interpreted to include all such changes, modifications, permutations, alterations, additions, subtractions and sub-combinations as are within their true spirit and scope. Accordingly, the scope of the present invention is not to be limited to that precisely as shown and described by this specification.

Certain embodiments of the present invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps or limitations may be made for any one of the elements, steps or limitations in a claim set forth below or that a single element, step or limitation may be substituted for two or more elements, steps or limitations in such a claim. Although elements, steps or limitations may be described above as acting in certain combinations and even initially claimed as such, it is to be expressly understood that one or more elements, steps or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more or different elements, steps and/or limitations, which are disclosed in above even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a similar manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated. All methods described herein can be performed in any suitable order unless otherwise indicated herein or otherwise clearly contradicted by context. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

When used in the claims, whether as filed or added per amendment, the open-ended transitional term "comprising", variations thereof such as, e.g., "comprise" and "comprises", and equivalent open-ended transitional phrases thereof like "including," "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

Lastly, all patents, patent publications, and other references cited and identified in the present specification are individually and expressly incorporated herein by reference in their entirety for the purpose of describing and disclosing, for example, the compositions and methodologies described in such publications that might be used in connection with the present invention. These publications are provided solely for their disclosure prior to the filing date of the present application. Nothing in this regard is or should be construed as an admission that the inventors are not entitled to antedate such disclosure by virtue of prior invention or for any other reason. All statements as to the date or representation as to the contents of these documents are based on the information available to the applicant and do not constitute any admission as to the correctness of the dates or contents of these documents.

The invention claimed is:

1. A dry powdered composition comprising:
   about 5% to about 15% by weight of a dried, fermented microbial supernatant including bio-nutrients, minerals, and amino acids, and
   about 75% to about 95% by weight of one or more dried nonionic biosurfactants,
   wherein the composition lacks any active enzymes, activatable pro-enzymes, or any enzymatic activity from a microorganism.

2. The dry powdered composition according to claim 1, comprising about 7% to about 12% by weight of the dried, fermented microbial supernatant.

3. The dry powdered composition according to claim 1, comprising about 8% to about 10% by weight of the dried, fermented microbial supernatant.

4. The dry powdered composition according to claim 1, wherein the dried, fermented microbial supernatant is a dried, fermented yeast supernatant, a dried, fermented bacterial supernatant, a dried, fermented mold supernatant, or any combination thereof.

5. The dry powdered composition according to claim 1, comprising about 6% to about 14% by weight of the dried, fermented microbial supernatant and about 80% to about 95% by weight of one or more nonionic biosurfactants.

6. The dry powdered composition according to claim 1, comprising, about 6% to about 12% by weight of the dried, fermented microbial supernatant and about 85% to about 95% by weight of one or more nonionic biosurfactants.

7. The dry powdered composition according to claim 1, comprising about 7% to about 11% by weight of the dried, fermented microbial supernatant and about 87% to about 93% by weight of one or more nonionic biosurfactants.

8. The dry powdered composition according to claim 1, comprising about 8% to about 10% by weight of the dried, fermented microbial supernatant and about 89% to about 91% by weight of one or more nonionic biosurfactants.

9. A dry powdered composition comprising:
   about 5% to about 15% by weight of a dried, fermented yeast supernatant including bio-nutrients, minerals, and amino acids,
   about 5% to about 15% by weight of a first dried nonionic biosurfactant, and about 70% to about 90% by weight of a second dried nonionic biosurfactant, wherein the composition lacks any active enzymes, activatable pro-enzymes, or any enzymatic activity from a microorganism.

10. The dry powdered composition according to claim 9, comprising about 6% to about 14% by weight of the dried, fermented yeast supernatant, about 6% to about 14% of a first dried nonionic biosurfactant and about 72% to about 88% of a second dried nonionic biosurfactant.

11. The dry powdered composition according to claim 9, comprising about 6% to about 12% by weight of the dried, fermented yeast supernatant, about 6% to about 12% of a first dried nonionic biosurfactant and about 74% to about 88% of a second dried nonionic biosurfactant.

12. The dry powdered composition according to claim 9, comprising about 7% to about 11% by weight of the dried, fermented yeast supernatant, about 7% to about 11% of a first dried nonionic biosurfactant and about 76% to about 86% of a second dried nonionic biosurfactant.

13. The dry powdered composition according to claim 9, comprising about 8% to about 10% by weight of the dried, fermented yeast supernatant, about 8% to about 10% of a first dried nonionic biosurfactant and about 78% to about 84% of a second dried nonionic biosurfactant.

14. A dry powdered composition comprising:
about 5% to about 15% by weight of a dried, fermented yeast supernatant including bio-nutrients, minerals, and amino acids,
about 5% to about 15% by weight of a first dried nonionic saponin, and
about 70% to about 90% by weight of a second dried nonionic saponin, wherein the composition lacks any active enzymes, activatable pro-enzymes, or any enzymatic activity from a microorganism.

15. The dry powdered composition according to claim 14, comprising about 6% to about 14% by weight of the dried, fermented yeast supernatant, about 6% to about 14% of a first dried nonionic saponin and about 72% to about 88% of a second dried nonionic saponin.

16. The dry powdered composition according to claim 14, comprising about 6% to about 12% by weight of the dried, fermented yeast supernatant, about 6% to about 12% of a first dried nonionic saponin and about 74% to about 88% of a second dried nonionic saponin.

17. The dry powdered composition according to claim 14, comprising about 7% to about 11% by weight of the dried, fermented yeast supernatant, about 7% to about 11% of a first dried nonionic saponin and about 76% to about 86% of a second dried nonionic saponin.

18. The dry powdered composition according to claim 14, wherein the first dried and/or second dried nonionic saponins include a triterpenoid saponin, a steroidal saponin, or a combination thereof.

19. The dry powdered composition according to claim 14, further comprising citric acid.

20. The dry powdered composition according to claim 14, further comprising at least one preservative.

* * * * *